US009514103B2

(12) United States Patent
Kletter

(10) Patent No.: US 9,514,103 B2
(45) Date of Patent: Dec. 6, 2016

(54) EFFECTIVE SYSTEM AND METHOD FOR VISUAL DOCUMENT COMPARISON USING LOCALIZED TWO-DIMENSIONAL VISUAL FINGERPRINTS

(75) Inventor: Doron Kletter, San Mateo, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 397 days.

(21) Appl. No.: 12/701,127

(22) Filed: Feb. 5, 2010

(65) Prior Publication Data

US 2011/0197121 A1 Aug. 11, 2011

(51) Int. Cl.

| | |
|---|---|
| ***G06K 9/20*** | (2006.01) |
| ***G06K 9/00*** | (2006.01) |
| ***G06K 9/46*** | (2006.01) |
| ***G06F 17/30*** | (2006.01) |
| ***G06F 17/22*** | (2006.01) |
| ***G06F 17/24*** | (2006.01) |

(52) U.S. Cl.

CPC ....... *G06F 17/2211* (2013.01); *G06F 17/2288* (2013.01); *G06F 17/24* (2013.01)

(58) Field of Classification Search

CPC .. G06F 3/1297; G06F 3/1298; G06F 17/212; G06F 17/30985; G06F 17/2211; G06F 17/30247; G06F 17/30256; G06F 17/30802; G06K 2209/01; G06K 9/00221; G06K 9/00442; G06K 9/00483; G06K 9/00255; G06K 9/00261; G06K 9/6204; G06K 9/6212

USPC .................. 715/234, 255, 247, 274; 382/219

See application file for complete search history.

(56) References Cited

U.S. PATENT DOCUMENTS

| | | | |
|---|---|---|---|
| 5,465,303 A | 11/1995 | Levison et al. | |
| 5,491,760 A | 2/1996 | Withgott et al. | |
| 5,613,014 A | 3/1997 | Eshera et al. | |
| 5,850,476 A | 12/1998 | Chen et al. | |
| 6,041,133 A | 3/2000 | Califano et al. | |
| 6,324,555 B1 * | 11/2001 | Sites | 715/234 |
| 6,560,620 B1 * | 5/2003 | Ching | 715/229 |
| 7,359,532 B2 | 4/2008 | Acharya et al. | |
| 9,069,767 B1 * | 6/2015 | Hamaker | G06F 17/30011 |
| 2004/0223648 A1 * | 11/2004 | Hoene et al. | 382/218 |

(Continued)

FOREIGN PATENT DOCUMENTS

EP 2138953 A2 12/2009

OTHER PUBLICATIONS

Nuance, Comparing PDF Documents, 2002-2010 Nuance Communications, Inc., Jul. 7, 2009, pp. 1-2.*

(Continued)

*Primary Examiner* — Stephen Hong
*Assistant Examiner* — Ahamed I Nazar
(74) *Attorney, Agent, or Firm* — Fay Sharpe LLP

(57) ABSTRACT

A method and system detects and highlights changes in documents and displays those documents in a side-by-side aligned view. Aspects of a source document and a revised document are detected and compared. Similarities and/or differences between the source document and the revised document are identified and visual identifiers are introduced to maintain consistent and accurate alignment between content in the source document and content in the revised document. A merged single file is output containing the aligned side-by-side view of the source document and the revised document, with all differences between the source document and the revised document visually identified.

13 Claims, 54 Drawing Sheets

(56) References Cited

U.S. PATENT DOCUMENTS

| | | | | |
|---|---|---|---|---|
| 2005/0180649 | A1* | 8/2005 | Curry et al. | 382/243 |
| 2006/0104484 | A1 | 5/2006 | Bolle et al. | |
| 2006/0259524 | A1* | 11/2006 | Horton | 707/201 |
| 2006/0285772 | A1 | 12/2006 | Hull et al. | |
| 2007/0208998 | A1* | 9/2007 | Cicerone | G06F 17/2211 715/210 |
| 2008/0219560 | A1 | 9/2008 | Morimoto et al. | |
| 2008/0317278 | A1 | 12/2008 | Lefebvre et al. | |
| 2009/0176566 | A1 | 7/2009 | Kelly | |
| 2009/0324026 | A1 | 12/2009 | Kletter | |
| 2009/0324087 | A1 | 12/2009 | Kletter | |
| 2009/0324100 | A1 | 12/2009 | Kletter et al. | |
| 2011/0173103 | A1* | 7/2011 | Batra et al. | 705/29 |

OTHER PUBLICATIONS

Neuwirth et al. Flexible Diff-ing in a Collaborative Writing System, Carnegie Mellon University, Pittsburgh, PA 15213, CSCW 92 Procedngs November, pp. 147-154.*

Vaibhac, Compare Documents Side-By-Side in Excel and Word, Apr. 9, 2008, pp. 1-2.*

WinMerge "Overview of file comparing and merging", published Sep. 2008, pp. 1-4.*

Wang, Identifying Syntactic Differences Between Two Programs, Software—Practice and Experience, vol. 21(7), 739-755 (Jul. 1991), pp. 1-17.*

Understanding Compare Documents using Adobe Acrobat 7.0, pp. 1-4.*

"Learn Acrobat 9—Comparing two PDF documents / Adobe TV", Dec. 20, 2009, pp. 1-8, http://web.archive.org/web/20091220080445/http://tv.adobe.com/watch/learn/-acrobat-9/co . . . .

"Workshare Professional", Mar. 29, 2009, pp. 1-2, http://web.archive.org/web/20090329082245/http://www.workshare.com/products/wsprofe . . . .

"Business Collaboration", Jan. 16, 2008, pp. 1-2, http://web.archive.org/web/2008/0116032852/http://web.exostar.com/solutions/collaborati . . . .

"AJC Diff", Jun. 19, 2008, http://web.archive.org/web/20080619081259/http://www.ajcsoft.com/ProductsAJCDiff.php.

Eddins, Steve, "Intensity-Weighted Centroids", The Mathworks, Aug. 31, 2007, pp. 1-4, http://blogs.mathworks.com/steve/2007/08/31/itensity-weighted-centroids.

Lepetit et al., "Randomized Trees for Keypoint Recognition"; Proceedings IEEE Computer Society Conference on Computer Vision and Pattern Recognition CVPR05, vol. 2, pp. 775-781, 2005.

DIFF PDF, AJC Software, Jan. 24, 2006; http://www.supershareware.com/diff-pdf-free/software/.

Workshare Professional, WorkShare Inc., Apr. 15, 2005, http://web.archive.org/web/20050415102858/http://www.workshare.com/products/wsprofessional/.

Acrobat Professional, Adobe Systems Inc., Nov. 28, 2009, http://web.archive.org/web/20091128011910/http://www.adobe.com/products/acrobatpro/.

Compare PDF, AKS Labs, Oct. 12, 2004, http://web.archive.org/web/2004101204134://http://www.compare-pdf.com/.

Neuwirth et al., "Flexible Diff-ing in a Collaborative Writing System", Proceedings of the 1992 ACM Conference on Computer-Supported Cooperative Work, CSCW, '92; Jan. 1, 1992, pp. 147-154, NY, NY.

Vaibhav, "Compare Documents Side-by-Side in Excel and Word", Habitually Good, Apr. 9, 2008, Retrieved from the Internet: URL:http://blog.gadodia.net/compare-documents-side-by-side-in-excel-and-word/ [retrieved on May 8, 2012], p. 2.

N.N., "Comparing PDF Documents", community.nuance.com, Jul. 7, 2009, Retrieved from the Internet: URL:http://community.nuance.com/wikis/pdf6/comparing-pdf-documents.aspx, [retrieved on May 8, 2012], the whole document.

EP Search Report, EP Application No. 111152959.0-1527/2354966, Dated May 10, 2012, Berlin, DE, Mailed May 30, 2012.

* cited by examiner

100

Purchase Order: 123456 PO Date: Dec 11, 2008 05:00 PM PST

Party Information

Buyer
N/A 12345678-abcd-1234-efgh
THE AEROSPACE COMPANY
1234 N MAIN ST
BLDG 123 MAILSTOP 456
M789-B123
PORTLAND, USOR 98765
US

Buyer Contact
Jane Doe
BuyerNameorDepartment
TelephoneNumber: 987-654-3210
FaxNumber: 987-654-0123
EmailAddress: jane.doe@aerospace.com

Bill To
Codes assigned by the party originating the mes sage. NA
THIS PURCHASE CONTRACT IS SUBJECT TO AUTOPAY UNLESS AN AEROSPACE INVOICING LOCATION IS NOTED AT THE LINE ITEM LEVEL

Billing Contact

Ship To
Codes assigned by the party originating the mes sage. NA
SEE PURCHASE CONTRACT LINE ITEM

Shipping Contact

General Information

| | | | |
|---|---|---|---|
| **Order Date:** Dec 11, 2008 05:00 PM PST | **Order Type** StandAloneOrder | **Release Number** | **Invoice MediumType** |
| **Account Code** Aerospace.PTLD.ABC-123 | **Allow Partial Shipment** Yes | **Purpose** Original | **Requested Response** |
| Quote Reference Number | Quote Reference Date | **Language** English | **Currency** U.S. Dollar |
| **Requested Delivery Date** | **Requested Ship Date** | **Part Location** | |
| **Supplier Ref No.** | | | |
| **Release Number** | **Contract ID** | | |

Order Totals

Total Amount for the Order: 98,765.4321 U.S. Dollar

| Line Number | Part Number | Description | |
|---|---|---|---|
| 0001 | Seller:<br>Buyer: 9876543-0001<br>Manufacturer: | COMPOSITE ENGINE | |
| **Unit** Each | **Quantity** 123.0000 | **Unit Price** 12.3456 U.S. Dollar | **Amount** 9,876.5432 U.S. Dollar |

Line Item Schedule

Schedule Line ID:
1
Quantity 123.0000 UOM Each
Requested Delivery Date
Feb 20, 2009 05:00 PM PST
Notes:
Date Feb 20, 2009 05:00 PM PST Date Qualifier ContractualDeliveryDate
ABCD Rating

Product Identification

| | | |
|---|---|---|
| **Other Product Qualifier** ContractNumber | **Other Product Code** ABC-01-2345 | **Other Product Code Ext** |
| **Standard Part Number Qualifier** | **Standard Part Number** | **Standard Part Number Ext** |
| **Manufacturer Part Number**<br>**Manufacturer Name** | **Manufacturer Part Number Ext**<br>**Manufacturer ID** | |
| **Off Catalog Flag** true | | |

Page 1 of 7

FIG. 1A

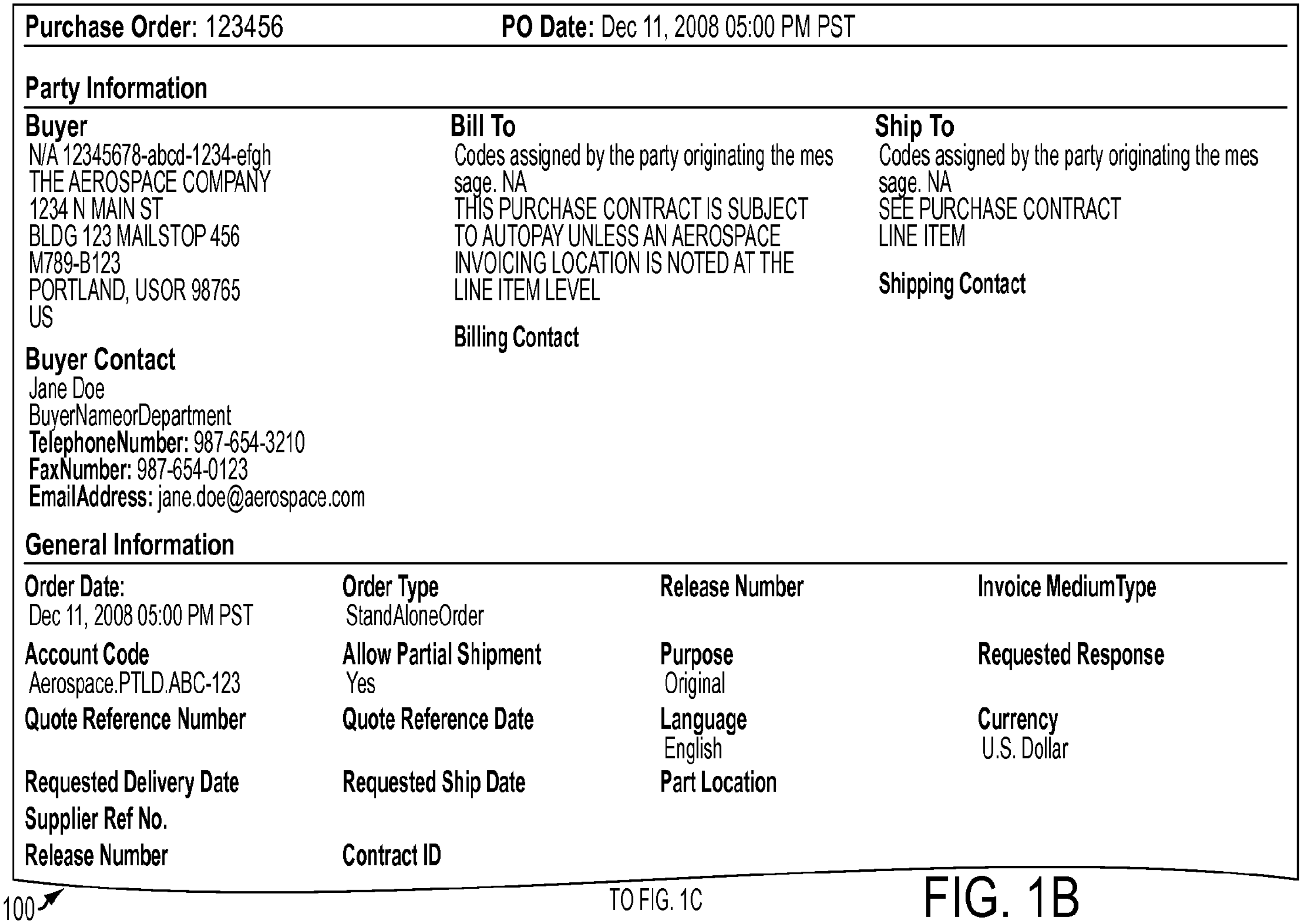

| Purchase Order: 123456 | | PO Date: Dec 11, 2008 05:00 PM PST | |
|---|---|---|---|
| **Party Information** | | | |
| **Buyer**<br>N/A 12345678-abcd-1234-efgh<br>THE AEROSPACE COMPANY<br>1234 N MAIN ST<br>BLDG 123 MAILSTOP 456<br>M789-B123<br>PORTLAND, USOR 98765<br>US | | **Bill To**<br>Codes assigned by the party originating the mes<br>sage. NA<br>THIS PURCHASE CONTRACT IS SUBJECT<br>TO AUTOPAY UNLESS AN AEROSPACE<br>INVOICING LOCATION IS NOTED AT THE<br>LINE ITEM LEVEL | **Ship To**<br>Codes assigned by the party originating the mes<br>sage. NA<br>SEE PURCHASE CONTRACT<br>LINE ITEM |
| **Buyer Contact**<br>Jane Doe<br>BuyerNameorDepartment<br>TelephoneNumber: 987-654-3210<br>FaxNumber: 987-654-0123<br>EmailAddress: jane.doe@aerospace.com | | **Billing Contact** | **Shipping Contact** |
| **General Information** | | | |
| **Order Date:**<br>Dec 11, 2008 05:00 PM PST | **Order Type**<br>StandAloneOrder | **Release Number** | **Invoice MediumType** |
| **Account Code**<br>Aerospace.PTLD.ABC-123 | **Allow Partial Shipment**<br>Yes | **Purpose**<br>Original | **Requested Response** |
| **Quote Reference Number** | **Quote Reference Date** | **Language**<br>English | **Currency**<br>U.S. Dollar |
| **Requested Delivery Date** | **Requested Ship Date** | **Part Location** | |
| **Supplier Ref No.** | **Contract ID** | | |
| **Release Number** | | | |

100

Figure 1C:
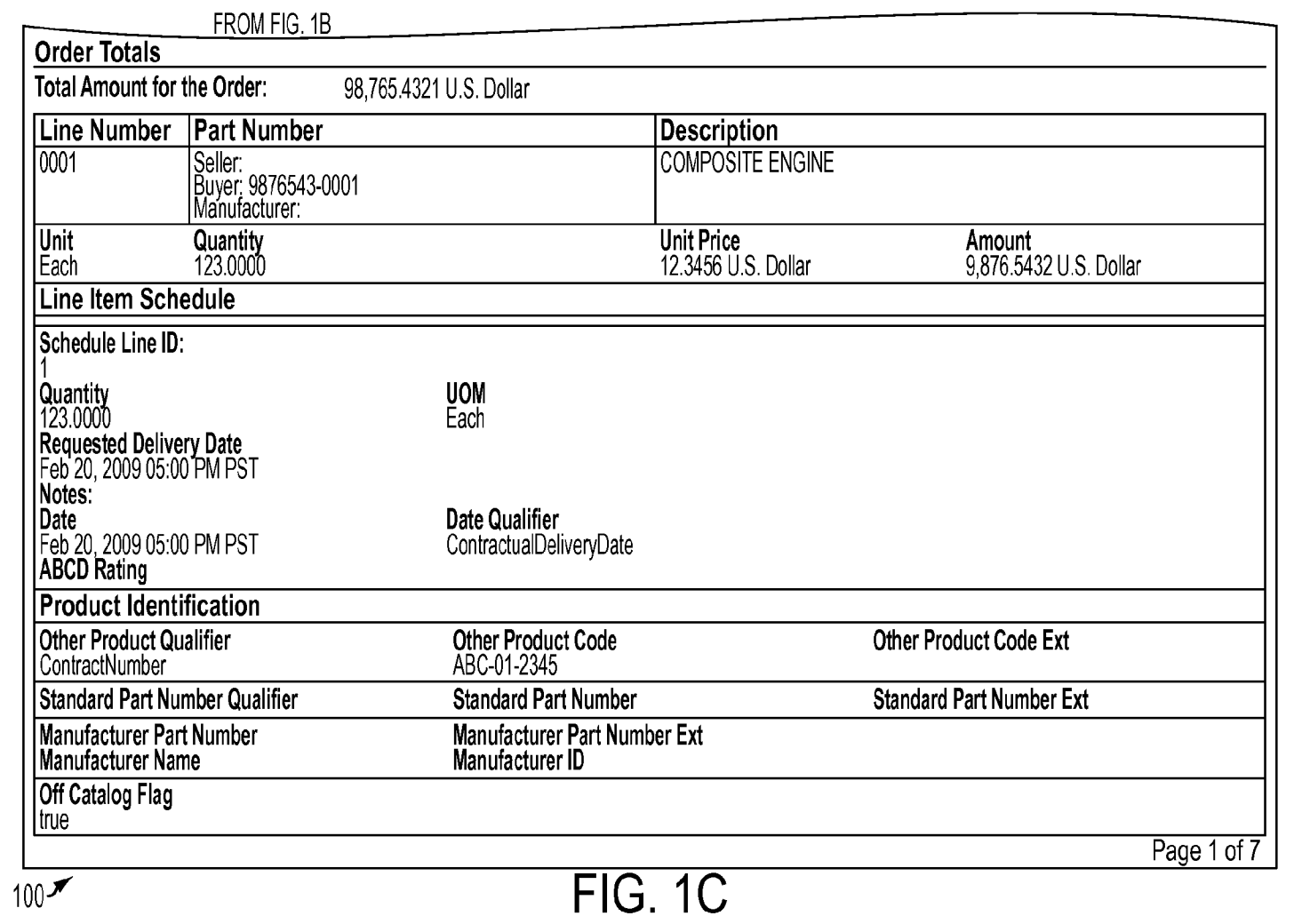

FROM FIG. 1B

Order Totals

Total Amount for the Order: 98,765.4321 U.S. Dollar

| Line Number | Part Number | Description | |
|---|---|---|---|
| 0001 | Seller:<br>Buyer: 9876543-0001<br>Manufacturer: | COMPOSITE ENGINE | |
| **Unit**<br>Each | **Quantity**<br>123.0000 | **Unit Price**<br>12.3456 U.S. Dollar | **Amount**<br>9,876.5432 U.S. Dollar |

Line Item Schedule

| | |
|---|---|
| **Schedule Line ID:**<br>1 | |
| **Quantity**<br>123.0000 | **UOM**<br>Each |
| **Requested Delivery Date**<br>Feb 20, 2009 05:00 PM PST | |
| **Notes:** | |
| **Date**<br>Feb 20, 2009 05:00 PM PST | **Date Qualifier**<br>ContractualDeliveryDate |
| **ABCD Rating** | |

Product Identification

| | | |
|---|---|---|
| **Other Product Qualifier**<br>ContractNumber | **Other Product Code**<br>ABC-01-2345 | **Other Product Code Ext** |
| **Standard Part Number Qualifier** | **Standard Part Number** | **Standard Part Number Ext** |
| **Manufacturer Part Number**<br>**Manufacturer Name** | **Manufacturer Part Number Ext**<br>**Manufacturer ID** | |
| **Off Catalog Flag**<br>true | | |

Page 1 of 7

Change Order: 123456 CO Date: Dec 15, 2008 05:00 PM PST CO Sequence: 002

Party Information

Buyer
N/A 12345678-abcd-1234-efgh
THE AEROSPACE COMPANY
1234 N MAIN ST
BLDG 123 MAILSTOP 456
M789-B123
PORTLAND, USOR 98765
US

Buyer Contact
Jane Doe
BuyerNameorDepartment
TelephoneNumber: 987-654-3210
FaxNumber: 987-654-0123
EmailAddress: jane.doe@aerospace.com

Bill To
Codes assigned by the party originating the mes sage. NA
THIS PURCHASE CONTRACT IS SUBJECT TO AUTOPAY UNLESS AN AEROSPACE INVOICING LOCATION IS NOTED AT THE LINE ITEM LEVEL

Billing Contact

Ship To
Codes assigned by the party originating the mes sage. NA
SEE PURCHASE CONTRACT LINE ITEM

Shipping Contact

General Information

| | | | |
|---|---|---|---|
| **Purchase Order Number:** 123456 | **Purchase Order Date:** Dec 11, 2008 05:00 PM PST | | |
| **Change Order Date:** Dec 15, 2008 05:00 PM PST | **Order Type** ChangeToPurchaseOrder | **Release Number** | **Invoice MediumType** |
| **Account Code** Aerospace.PTLD.ABC-123 | **Allow Partial Shipment** Yes | **Purpose** Change | **Requested Response** |
| **Quote Reference Number** | **Quote Reference Date** | **Language** English | **Currency** U.S. Dollar |
| **Requested Delivery Date** | **Requested Ship Date** | **Part Location** | |
| **Supplier Ref No.** | | | |
| **Release Number** | **Contract ID** | | |

Order Totals

Total Amount for the Order: 98,765.4321 U.S. Dollar

| Line Number | Part Number | Description |
|---|---|---|
| 0001 | Seller:<br>Buyer: 9876543-0001<br>Manufacturer: | COMPOSITE ENGINE |

| **Unit** | **Quantity** | **Unit Price** | **Amount** |
|---|---|---|---|
| Each | 123.0000 | 12.3456 U.S. Dollar | 9,876.5432 U.S. Dollar |

Change Type
ChangesToLineItems

Line Item Schedule

Schedule Line ID:
1
Quantity 123.0000 UOM Each
* Requested Delivery Date
Jun 13, 2009 05:00 PM PST
Notes:
* Date Jun 13, 2009 05:00 PM PST Date Qualifier ContractualDeliveryDate
ABCD Rating

Product Identification

| Other Product Qualifier | Other Product Code | Other Product Code Ext |
|---|---|---|
| ContractNumber | ABC-01-2345 | |

| Standard Part Number Qualifier | Standard Part Number | Standard Part Number Ext |
|---|---|---|

Page 1 of 7

FIG. 2A

Change Order: 123456 CO Date: Dec 15, 2008 05:00 PM PST CO Sequence: 002

Party Information

Buyer
N/A 12345678-abcd-1234-efgh
THE AEROSPACE COMPANY
1234 N MAIN ST
BLDG 123 MAILSTOP 456
M789-B123
PORTLAND, USOR 98765
US

Bill To
Codes assigned by the party originating the mes sage. NA
THIS PURCHASE CONTRACT IS SUBJECT TO AUTOPAY UNLESS AN AEROSPACE INVOICING LOCATION IS NOTED AT THE LINE ITEM LEVEL

Billing Contact

Ship To
Codes assigned by the party originating the mes sage. NA
SEE PURCHASE CONTRACT LINE ITEM

Shipping Contact

Buyer Contact
Jane Doe
BuyerNameorDepartment
TelephoneNumber: 987-654-3210
FaxNumber: 987-654-0123
EmailAddress: jane.doe@aerospace.com

General Information

| | | | |
|---|---|---|---|
| **Purchase Order Number:** 123456 | **Purchase Order Date:** Dec 11, 2008 05:00 PM PST | | |
| **Change Order Date:** Dec 15, 2008 05:00 PM PST | **Order Type** ChangeToPurchaseOrder | **Release Number** | **Invoice MediumType** |
| **Account Code** Aerospace.PTLD.ABC-123 | **Allow Partial Shipment** Yes | **Purpose** Change | **Requested Response** |
| **Quote Reference Number** | **Quote Reference Date** | **Language** English | **Currency** U.S. Dollar |
| **Requested Delivery Date** | **Requested Ship Date** | **Part Location** | |
| **Supplier Ref No.** | | | |

FROM FIG. 2B

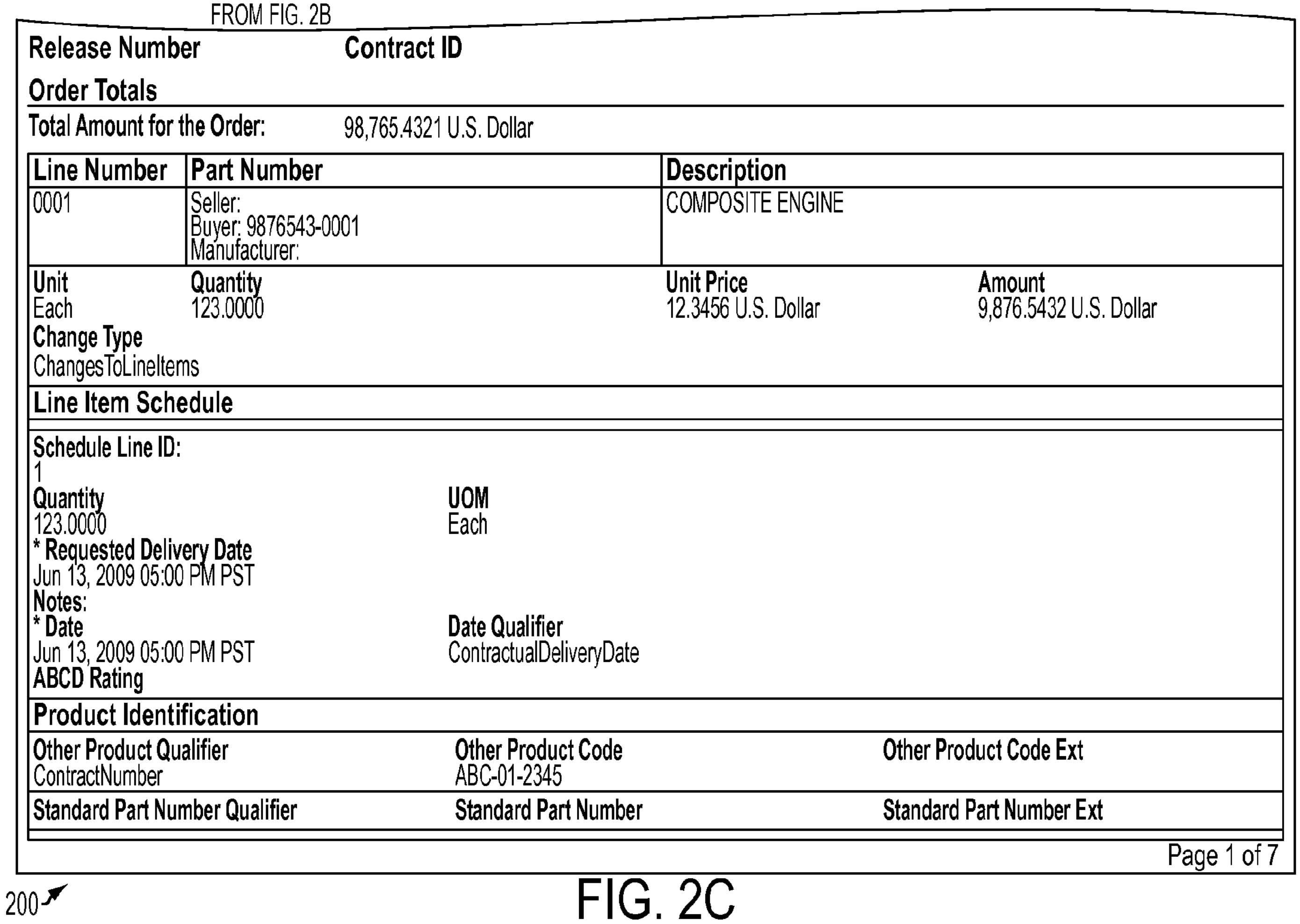

FIG. 2C

FROM FIG. 2B

| Release Number | Contract ID | |
|---|---|---|
| **Order Totals** | | |
| Total Amount for the Order: | 98,765.4321 U.S. Dollar | |

| Line Number | Part Number | Description | |
|---|---|---|---|
| 0001 | Seller:<br>Buyer: 9876543-0001<br>Manufacturer: | COMPOSITE ENGINE | |

| Unit<br>Each | Quantity<br>123.0000 | | Unit Price<br>12.3456 U.S. Dollar | Amount<br>9,876.5432 U.S. Dollar |
|---|---|---|---|---|

Change Type
ChangesToLineItems

Line Item Schedule

Schedule Line ID:
1

| Quantity<br>123.0000 | UOM<br>Each | |
|---|---|---|
| *Requested Delivery Date<br>Jun 13, 2009 05:00 PM PST | | |

Notes:
*Date
Jun 13, 2009 05:00 PM PST     Date Qualifier
ABCD Rating                    ContractualDeliveryDate

Product Identification

| Other Product Qualifier<br>ContractNumber | Other Product Code<br>ABC-01-2345 | Other Product Code Ext |
|---|---|---|
| Standard Part Number Qualifier | Standard Part Number | Standard Part Number Ext |

Page 1 of 7

200

Purchase Order: 123456 — 302

PO Date: Dec 1, 2008 05:00 PM PST — 306

Party Information

Buyer
N/A 12345678-abcd-1234-efgh
THE AEROSPACE COMPANY
1234 N MAIN ST
BLDG 123 MAILSTOP 456
M789-B123
PORTLAND, US OR 98765
US

Buyer Contact
Jane Doe
BuyerNameorDepartment
TelephoneNumber: 987-654-3210
FaxNumber: 987-654-0123
EmailAddress: jane.doe@aerospace.com

Bill To
Codes assigned by the party originating the message. NA
THIS PURCHASE CONTRACT IS SUBJECT TO AUTOPAY UNLESS AN AEROSPACE INVOICING LOCATION IS NOTED AT THE LINE ITEM LEVEL

Billing Contact

Ship To
Codes assigned by the party originating the message. NA
SEE PURCHASE CONTRACT LINE ITEM

Shipping Contact

General Information — 304

Order Date:
Dec 1, 2008 05:00 PM PST

Account Code
Aerospace.PTLD.ABC-123

Quote Reference Number

Requested Delivery Date

Supplier Ref No.

Order Type
StandAloneOrder

Allow Partial Shipment
Yes

Quote Reference Date

Requested Ship Date

Release Number

Purpose
Original

Language
English

Part Location

Invoice MediumType

Requested Response

Currency
U.S. Dollar

300

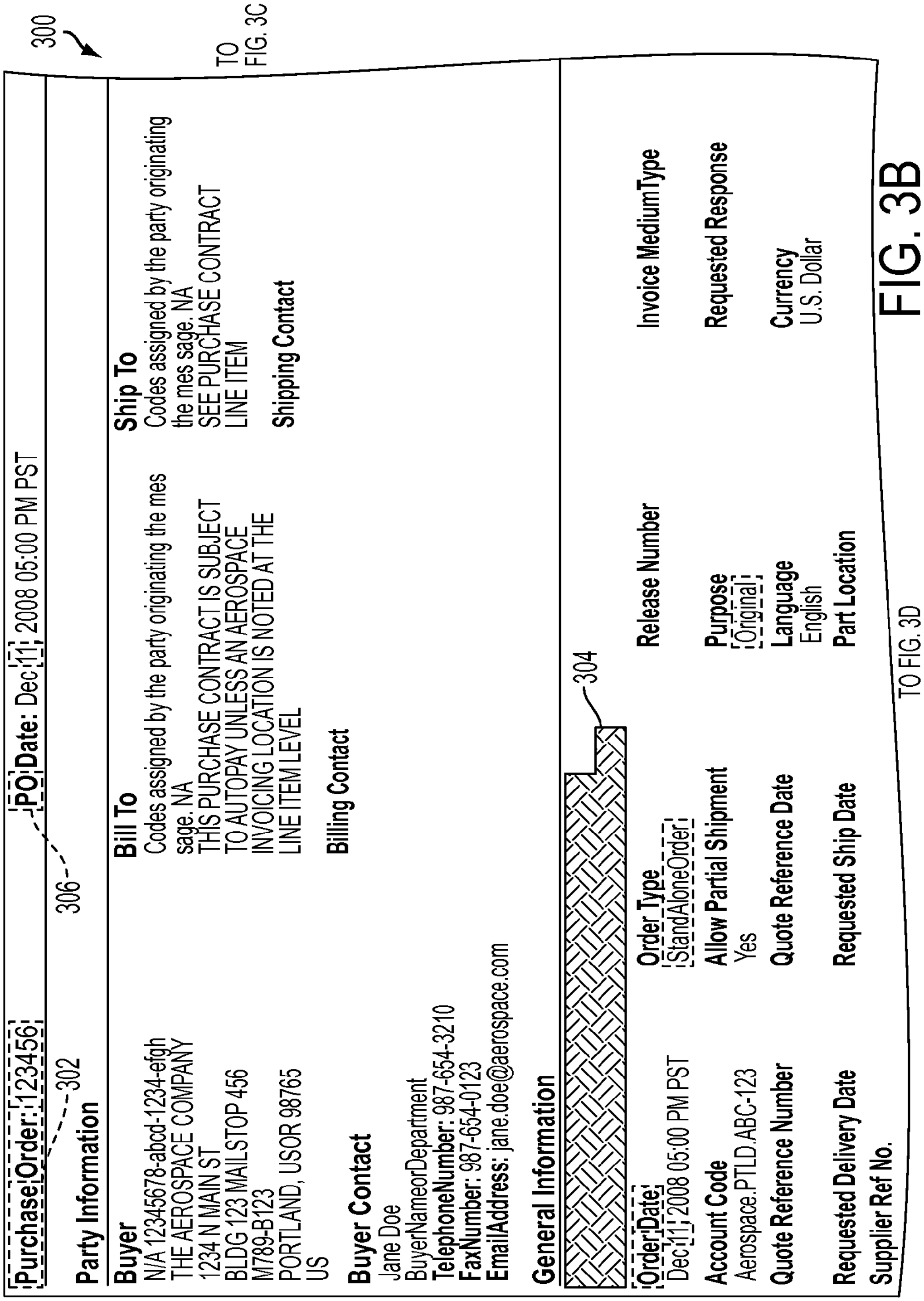

FIG. 3B

ChangeOrder: 123456     CO Date: Dec 15, 2008 05:00 PM PST     CO Sequence: 002

Party Information — 302a     306a

Buyer
N/A 12345678-abcd-1234-efgh
THE AEROSPACE COMPANY
1234 N MAIN ST
BLDG 123 MAILSTOP 456
M789-B123
PORTLAND, USOR 98765
US

Buyer Contact
Jane Doe
BuyerNameorDepartment
TelephoneNumber: 987-654-3210
FaxNumber: 987-654-0123
EmailAddress: jane.doe@aerospace.com

Bill To
Codes assigned by the party originating the mes
sage. NA
THIS PURCHASE CONTRACT IS SUBJECT
TO AUTOPAY UNLESS AN AEROSPACE
INVOICING LOCATION IS NOTED AT THE
LINE ITEM LEVEL

Billing Contact

Ship To
Codes assigned by the party originating
the message. NA
SEE PURCHASE CONTRACT
LINE ITEM

Shipping Contact

General Information

Purchase Order Number:     Purchase Order Date:
123456                         Dec 11, 2008 05:00 PM PST

Change Order Date:         Order Type
Dec 15, 2008 05:00 PM PST      ChangeToPurchaseOrder

Account Code               Allow Partial Shipment     Release Number     Purpose            Invoice MediumType
Aerospace.PTLD.ABC-123         Yes                                                   Change

Quote Reference Number     Quote Reference Date                                Language           Requested Response
                                                                                      English

Requested Delivery Date    Requested Ship Date                                 Part Location      Currency
                                                                                                             U.S. Dollar

Supplier Ref No.

FROM FIG. 3B
304a
300

TO FIG. 3E

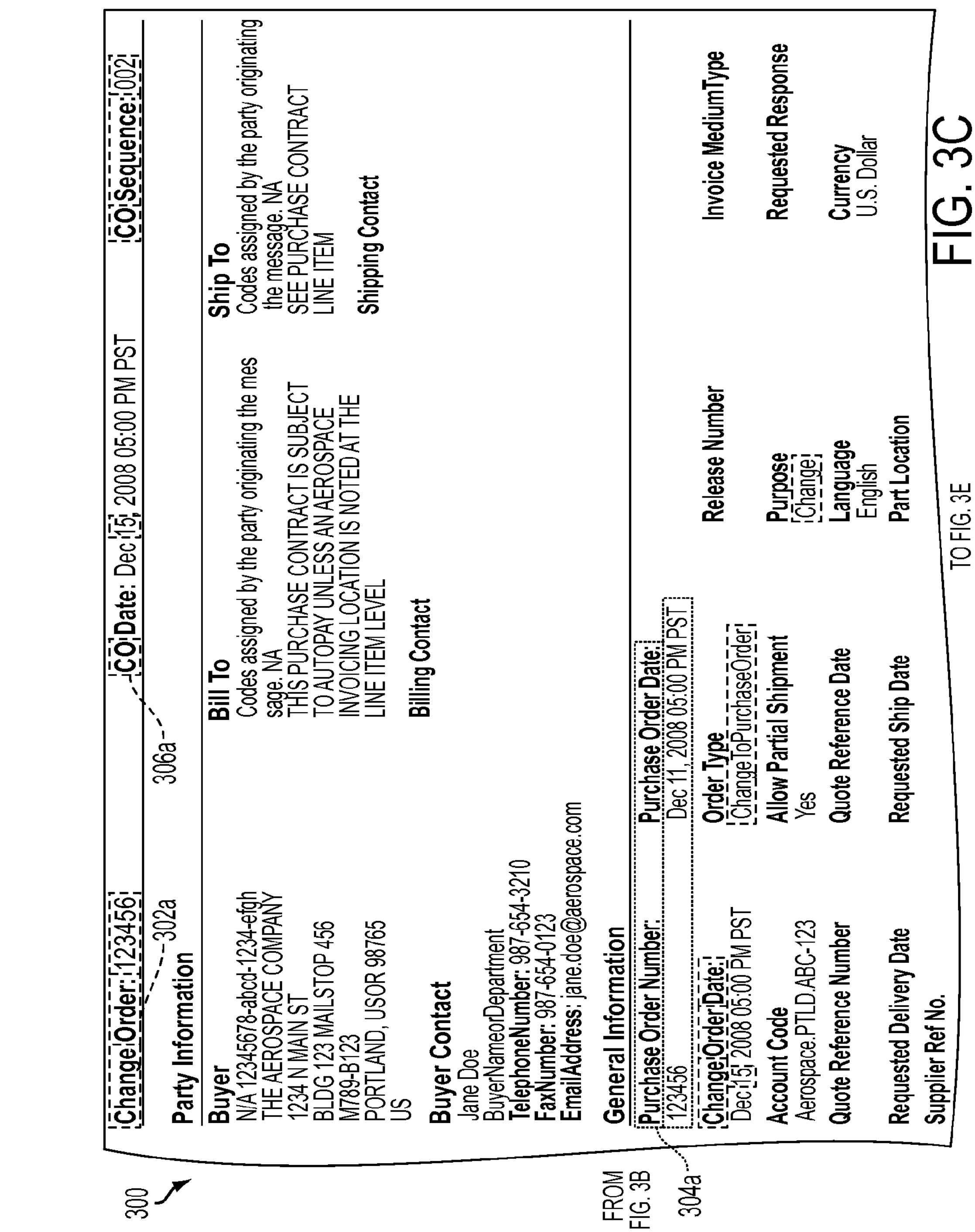

FIG. 3C

FROM FIG. 3B

| Release Number | Contract ID | | |
|---|---|---|---|
| **Order Totals** | | | |
| Total Amount for the Order: | 98,765.4321 U.S. Dollar | | |

| Line Number | Part Number | Description | |
|---|---|---|---|
| 0001 | Seller:<br>Buyer: 9876543-0001<br>Manufacturer: | COMPOSITE ENGINE | |
| Unit<br>Each | Quantity<br>123.0000 | Unit Price<br>12.3456 U.S. Dollar | Amount<br>9,876.5432 U.S. Dollar |

Line Item Schedule

Schedule Line ID
1
Quantity                          UOM
123.0000                          Each
Requested Delivery Date
Feb 20, 2009 05:00 PM PST
Notes:
Date:                             Date Qualifier
Feb 20, 2009 05:00 PM PST         ContractualDeliveryDate
ABCD Rating

Product Identification

| Other Product Qualifier | Other Product Code | Other Product Code Ext |
|---|---|---|
| ContractNumber | ABC-01-2345 | |
| Standard Part Number Qualifier | Standard Part Number | Standard Part Number Ext |

TO FIG. 3E

Page 1 of 7

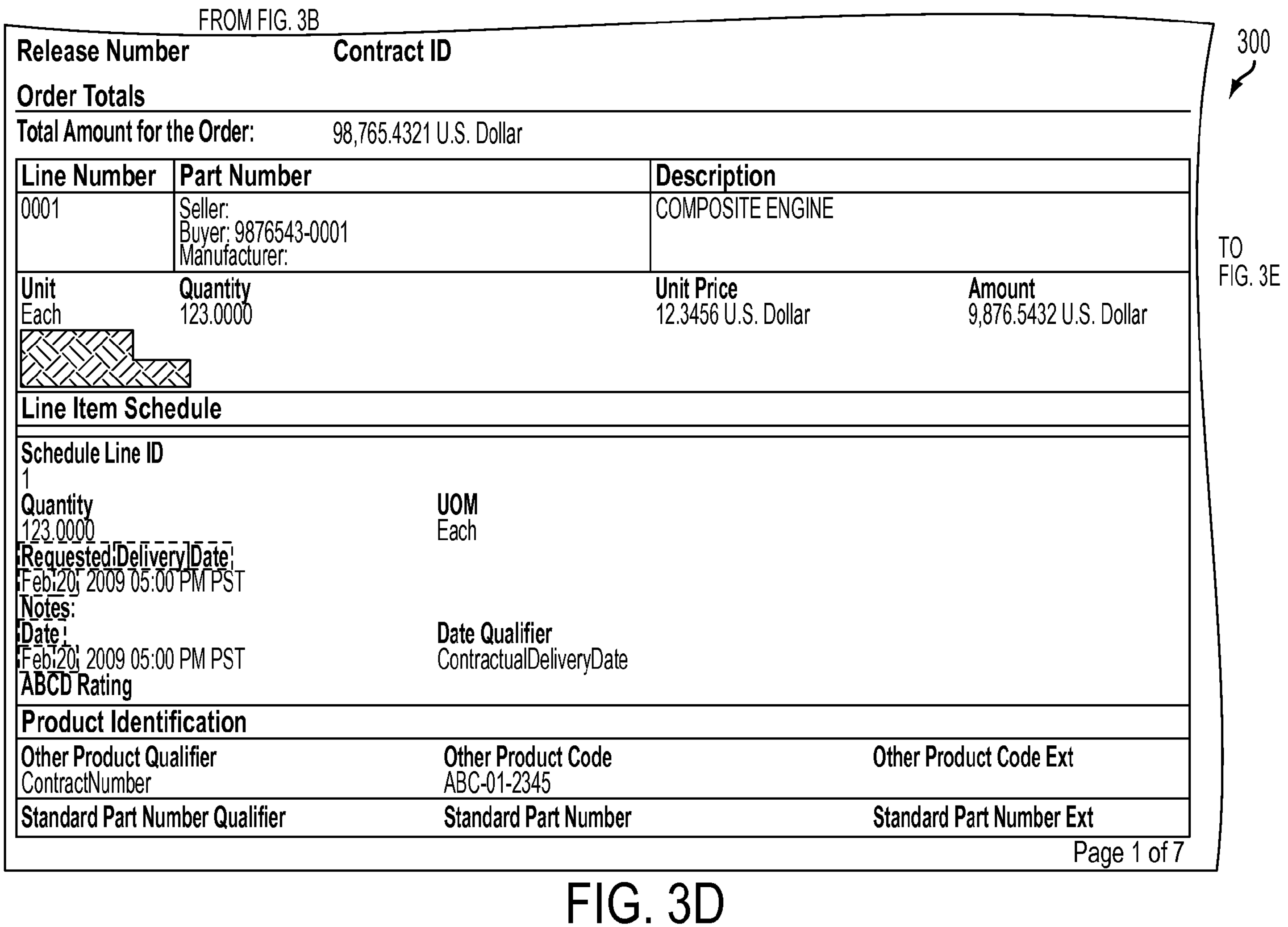

FIG. 3D

FROM FIG. 3C

Release Number | Contract ID

Order Totals

Total Amount for the Order: 98,765.4321 U.S. Dollar

| Line Number | Part Number | Description |
|---|---|---|
| 0001 | Seller:<br>Buyer: 9876543-0001<br>Manufacturer: | COMPOSITE ENGINE |

| Unit | Quantity | Unit Price | Amount |
|---|---|---|---|
| Each | 123.0000 | 12.3456 U.S. Dollar | 9,876.5432 U.S. Dollar |

Change Type:
Changes ToLineItems:

Line Item Schedule

Schedule Line ID
1

Quantity          UOM
123.0000          Each

RequestedDeliveryDate:          Date Qualifier
Jun 13, 2009 05:00 PM PST       ContractualDeliveryDate Notes:
Date:
Jun 13, 2009 05:00 PM PST
ABCD Rating

Product Identification

| Other Product Qualifier | Other Product Code | Other Product Code Ext |
|---|---|---|
| ContractNumber | ABC-01-2345 | |
| Standard Part Number Qualifier | Standard Part Number | Standard Part Number Ext |

FROM FIG. 3D

Page 1 of 7

300

FIG. 3E

Purchase Order: 123456    PO Date: Dec 11, 2008 05:00 PM PST

Party Information

Buyer
N/A 12345678-abcd-1234-efgh
THE AEROSPACE COMPANY
1234 N MAIN ST
BLDG 123 MAILSTOP 456
M789-B123
PORTLAND, USOR 98765
US

Bill To
Codes assigned by the party originating the message. NA
THIS PURCHASE CONTRACT IS SUBJECT TO AUTOPAY UNLESS AN AEROSPACE INVOICING LOCATION IS NOTED AT THE LINE ITEM LEVEL

Ship To
Codes assigned by the party originating the message. NA
SEE PURCHASE CONTRACT LINE ITEM

Buyer Contact
Jane Doe
BuyerNameorDepartment
TelephoneNumber: 987-654-3210
FaxNumber: 987-654-0123
EmailAddress: jane.doe@aerospace.com

Billing Contact

Shipping Contact

General Information

| Order Date: | Order Type | Allow Partial Shipment | Release Number | Invoice MediumType |
| --- | --- | --- | --- | --- |
| Dec 11, 2008 05:00 PM PST | StandAloneOrder | Yes | | |
| Account Code | Quote Reference Date | Purpose | Requested Response |
| Aerospace.PTLD.ABC-123 | | Original | |
| Quote Reference Number | Requested Ship Date | Language | Currency |
| | | English | U.S. Dollar |
| Requested Delivery Date | | Part Location | |
| Supplier Ref No. | | | |

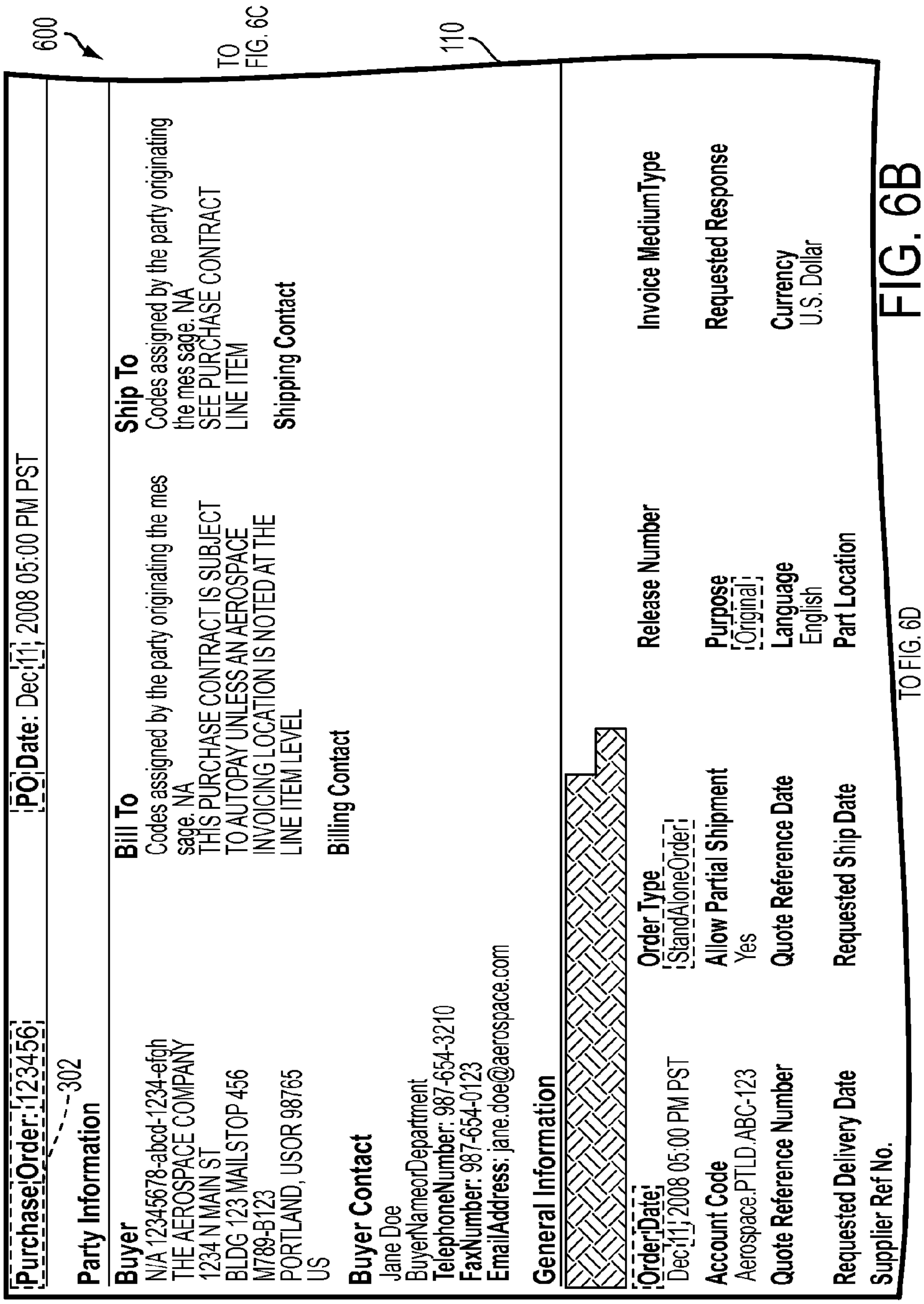

FIG. 6B

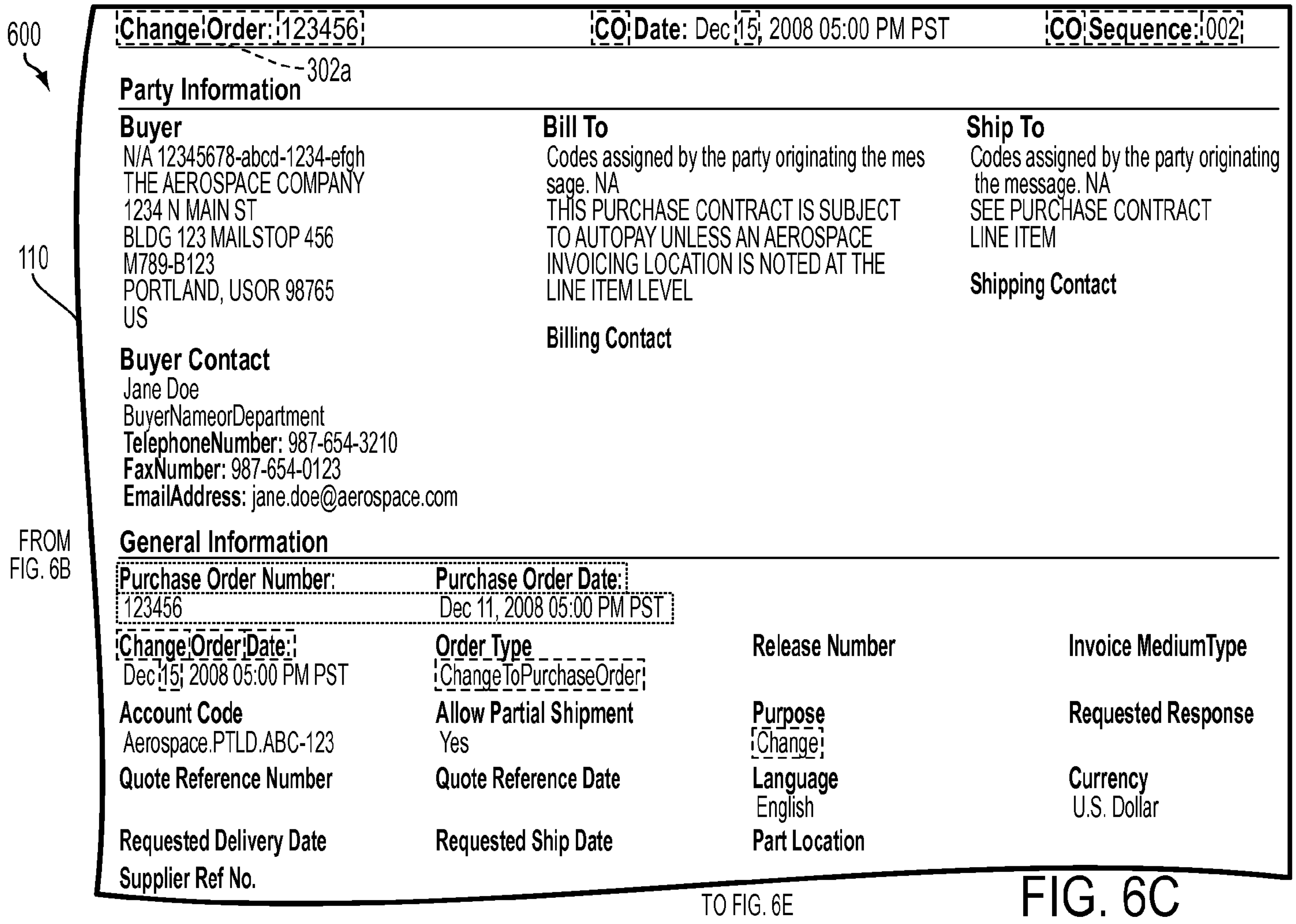

ChangeOrder: 123456    CO Date: Dec 15, 2008 05:00 PM PST    CO Sequence: 002

302a

Party Information

Buyer
N/A 12345678-abcd-1234-efgh
THE AEROSPACE COMPANY
1234 N MAIN ST
BLDG 123 MAILSTOP 456
M789-B123
PORTLAND, USOR 98765
US

Buyer Contact
Jane Doe
BuyerNameorDepartment
TelephoneNumber: 987-654-3210
FaxNumber: 987-654-0123
EmailAddress: jane.doe@aerospace.com

Bill To
Codes assigned by the party originating the message. NA
THIS PURCHASE CONTRACT IS SUBJECT TO AUTOPAY UNLESS AN AEROSPACE INVOICING LOCATION IS NOTED AT THE LINE ITEM LEVEL Billing Contact

Ship To
Codes assigned by the party originating the message. NA
SEE PURCHASE CONTRACT LINE ITEM Shipping Contact

General Information

| | | | |
|---|---|---|---|
| Purchase Order Number: 123456 | Purchase Order Date: Dec 11, 2008 05:00 PM PST | Release Number | Invoice MediumType |
| Change Order Date: Dec 15, 2008 05:00 PM PST | Order Type: Change To Purchase Order | Purpose: Change | Requested Response |
| Account Code Aerospace.PTLD.ABC-123 | Allow Partial Shipment Yes | Language English | Currency U.S. Dollar |
| Quote Reference Number | Quote Reference Date | Part Location | |
| Requested Delivery Date | Requested Ship Date | | |
| Supplier Ref No. | | | |

FROM FIG. 6B          TO FIG. 6E

110

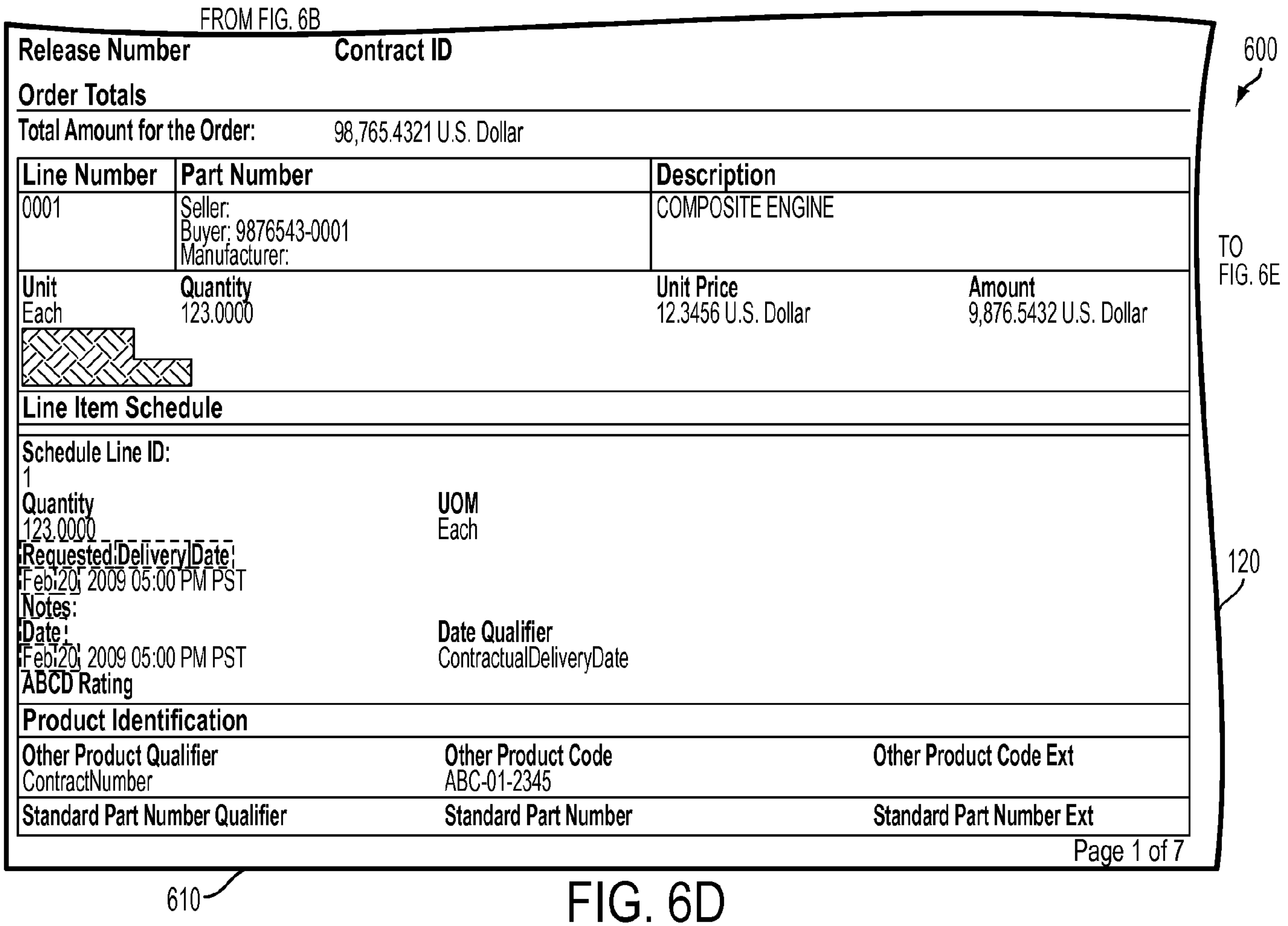

FROM FIG. 6B

| Release Number | Contract ID | | |
|---|---|---|---|
| **Order Totals** | | | |
| Total Amount for the Order: | 98,765.4321 U.S. Dollar | | |
| Line Number | Part Number | Description | |
| 0001 | Seller:<br>Buyer: 9876543-0001<br>Manufacturer: | COMPOSITE ENGINE | |
| Quantity<br>123.0000 | Unit Price<br>12.3456 U.S. Dollar | Amount<br>9,876.5432 U.S. Dollar | |
| Unit<br>Each | | | |

Line Item Schedule

Schedule Line ID:
1

Quantity
123.0000

UOM
Each

Requested Delivery Date:
Feb 20, 2009 05:00 PM PST

Notes:

Date:
Feb 20, 2009 05:00 PM PST

Date Qualifier
ContractualDeliveryDate

ABCD Rating

Product Identification

| Other Product Qualifier | Other Product Code | Other Product Code Ext |
|---|---|---|
| ContractNumber | ABC-01-2345 | |
| Standard Part Number Qualifier | Standard Part Number | Standard Part Number Ext |

TO FIG. 6E

Page 1 of 7

FROM FIG. 6C

| Release Number | Contract ID | | |
|---|---|---|---|
| **Order Totals** | | | |
| Total Amount for the Order: | 98,765.4321 U.S. Dollar | | |

| Line Number | Part Number | Description | |
|---|---|---|---|
| 0001 | Seller:<br>Buyer: 9876543-0001<br>Manufacturer: | COMPOSITE ENGINE | |
| Unit<br>Each | Quantity<br>123.0000 | Unit Price<br>12.3456 U.S. Dollar | Amount<br>9,876.5432 U.S. Dollar |
| Change Type<br>Changes To Line Items: | | | |

Line Item Schedule

Schedule Line ID:
1

| Quantity | UOM |
|---|---|
| 123.0000 | Each |

*Requested Delivery Date*
Jun 13, 2009 05:00 PM PST

Notes:
*Date*
Jun 13, 2009 05:00 PM PST

| | Date Qualifier |
|---|---|
| | ContractualDeliveryDate |

ABCD Rating

Product Identification

| Other Product Qualifier | Other Product Code | Other Product Code Ext |
|---|---|---|
| ContractNumber | ABC-01-2345 | |
| Standard Part Number Qualifier | Standard Part Number | Standard Part Number Ext |

Page 1 of 7

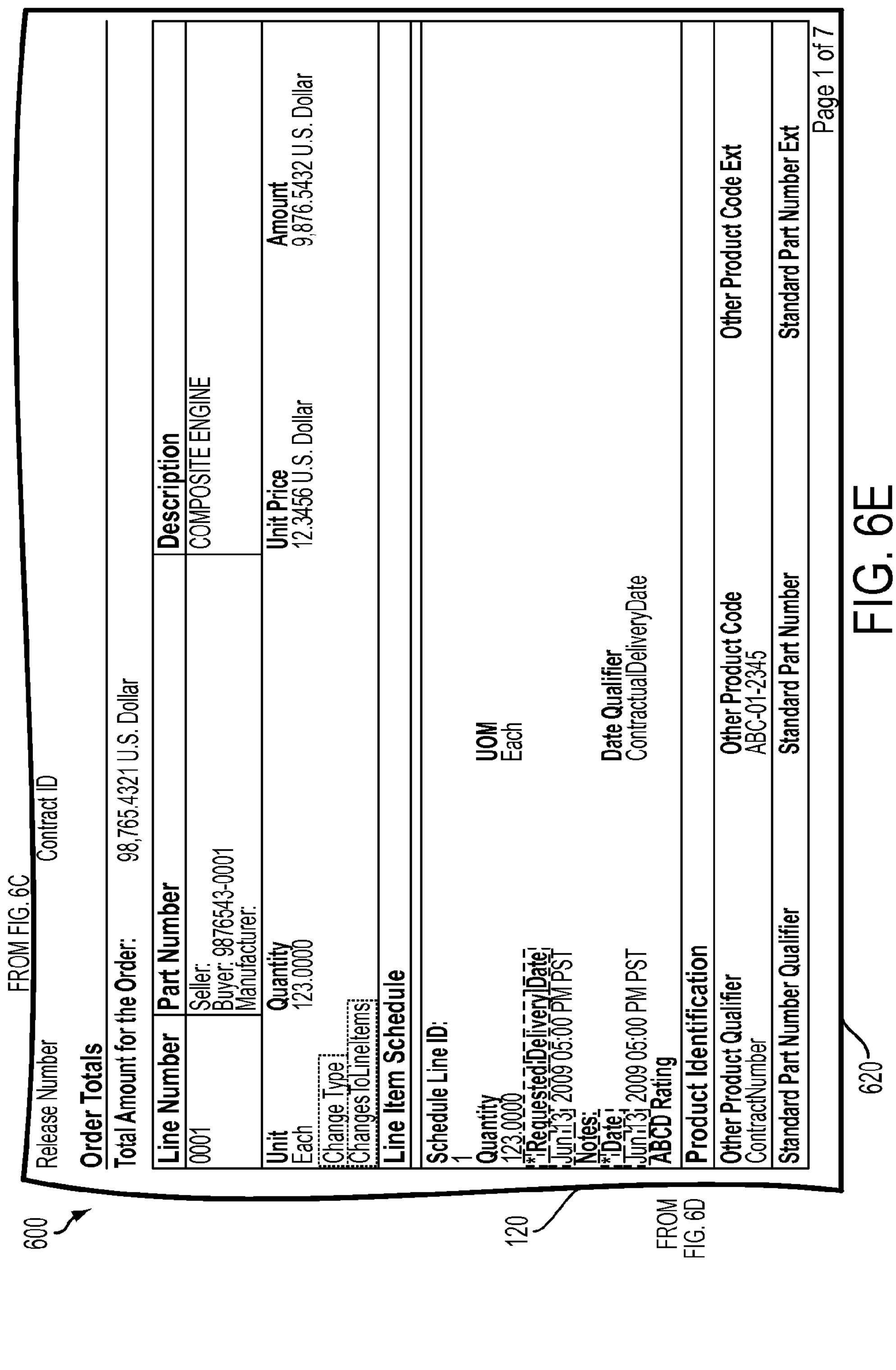

FIG. 6E

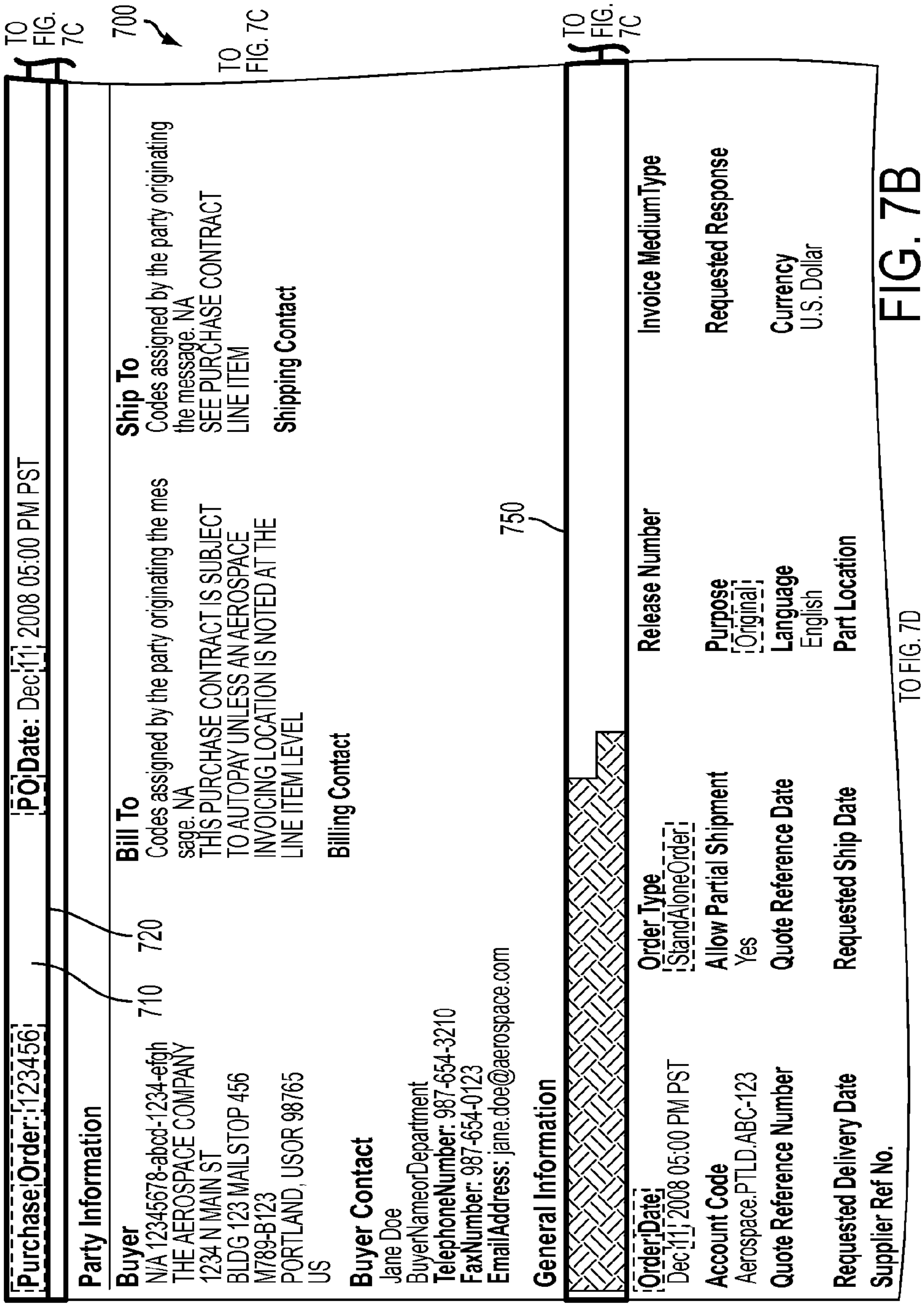

FIG. 7B

Purchase Order: 123456    PO Date: Dec 11, 2008 05:00 PM PST

Party Information

Buyer — 710
N/A12345678-abcd-1234-efgh
THE AEROSPACE COMPANY
1234 N MAIN ST
BLDG 123 MAILSTOP 456
M789-B123
PORTLAND, US OR 98765
US

Bill To — 720
Codes assigned by the party originating the message. NA
THIS PURCHASE CONTRACT IS SUBJECT TO AUTOPAY UNLESS AN AEROSPACE INVOICING LOCATION IS NOTED AT THE LINE ITEM LEVEL Billing Contact

Ship To
Codes assigned by the party originating the message. NA
SEE PURCHASE CONTRACT LINE ITEM Shipping Contact

Buyer Contact
Jane Doe
BuyerNameorDepartment
TelephoneNumber: 987-654-3210
FaxNumber: 987-654-0123
EmailAddress: jane.doe@aerospace.com

General Information    750

| Order Date: Dec 11, 2008 05:00 PM PST | Order Type: StandAloneOrder | Release Number | Invoice MediumType |
| Account Code: Aerospace.PTLD.ABC-123 | Allow Partial Shipment: Yes | Purpose: Original | Requested Response |
| Quote Reference Number | Quote Reference Date | Language: English | Currency: U.S. Dollar |
| Requested Delivery Date | Requested Ship Date | Part Location | |
| Supplier Ref No. | | | |

700

Change Order: 123456 | CO Date: Dec 15, 2008 05:00 PM PST | CO Sequence: 002

Party Information

Buyer
N/A 12345678-abcd-1234-efgh
THE AEROSPACE COMPANY
1234 N MAIN ST
BLDG 123 MAILSTOP 456
M789-B123
PORTLAND, USOR 98765
US

Buyer Contact
Jane Doe
BuyerNameorDepartment
TelephoneNumber: 987-654-3210
FaxNumber: 987-654-0123
EmailAddress: jane.doe@aerospace.com

Bill To
Codes assigned by the party originating the message. NA
THIS PURCHASE CONTRACT IS SUBJECT TO AUTOPAY UNLESS AN AEROSPACE INVOICING LOCATION IS NOTED AT THE LINE ITEM LEVEL Billing Contact

Ship To
Codes assigned by the party originating the message. NA
SEE PURCHASE CONTRACT LINE ITEM Shipping Contact

General Information

Purchase Order Number: 123456
Purchase Order Date: Dec 11, 2008 05:00 PM PST
Change Order Date: Dec 15, 2008 05:00 PM PST

| | | | |
|---|---|---|---|
| **Order Type** ChangeToPurchaseOrder | **Release Number** | **Purpose** Change | **Invoice MediumType** |
| **Account Code** Aerospace.PTLD.ABC-123 | **Allow Partial Shipment** Yes | | **Language** English | **Requested Response** |
| **Quote Reference Number** | **Quote Reference Date** | | **Currency** U.S. Dollar |
| **Requested Delivery Date** | **Requested Ship Date** | **Part Location** | |
| **Supplier Ref No.** | | | |

760

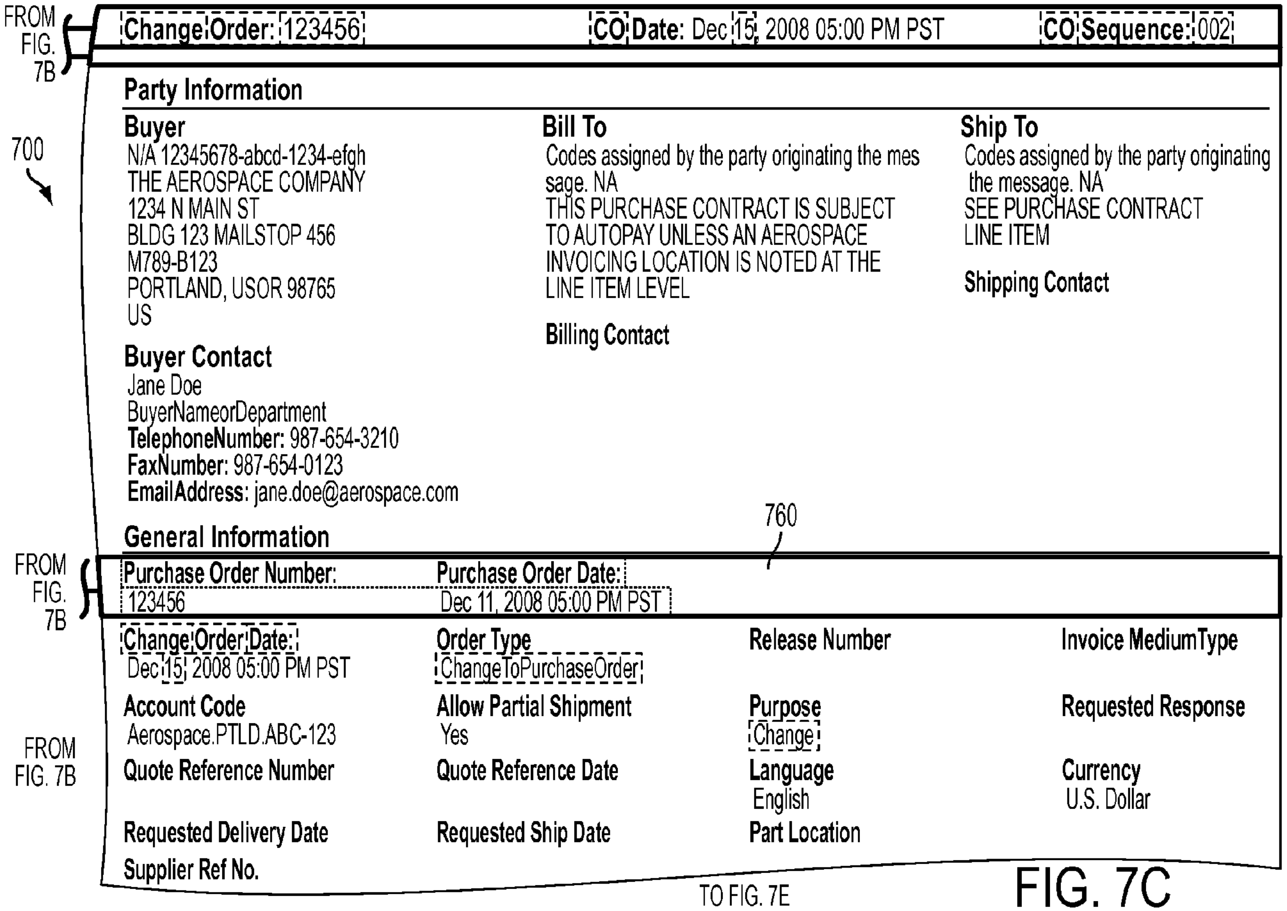

FIG. 7C

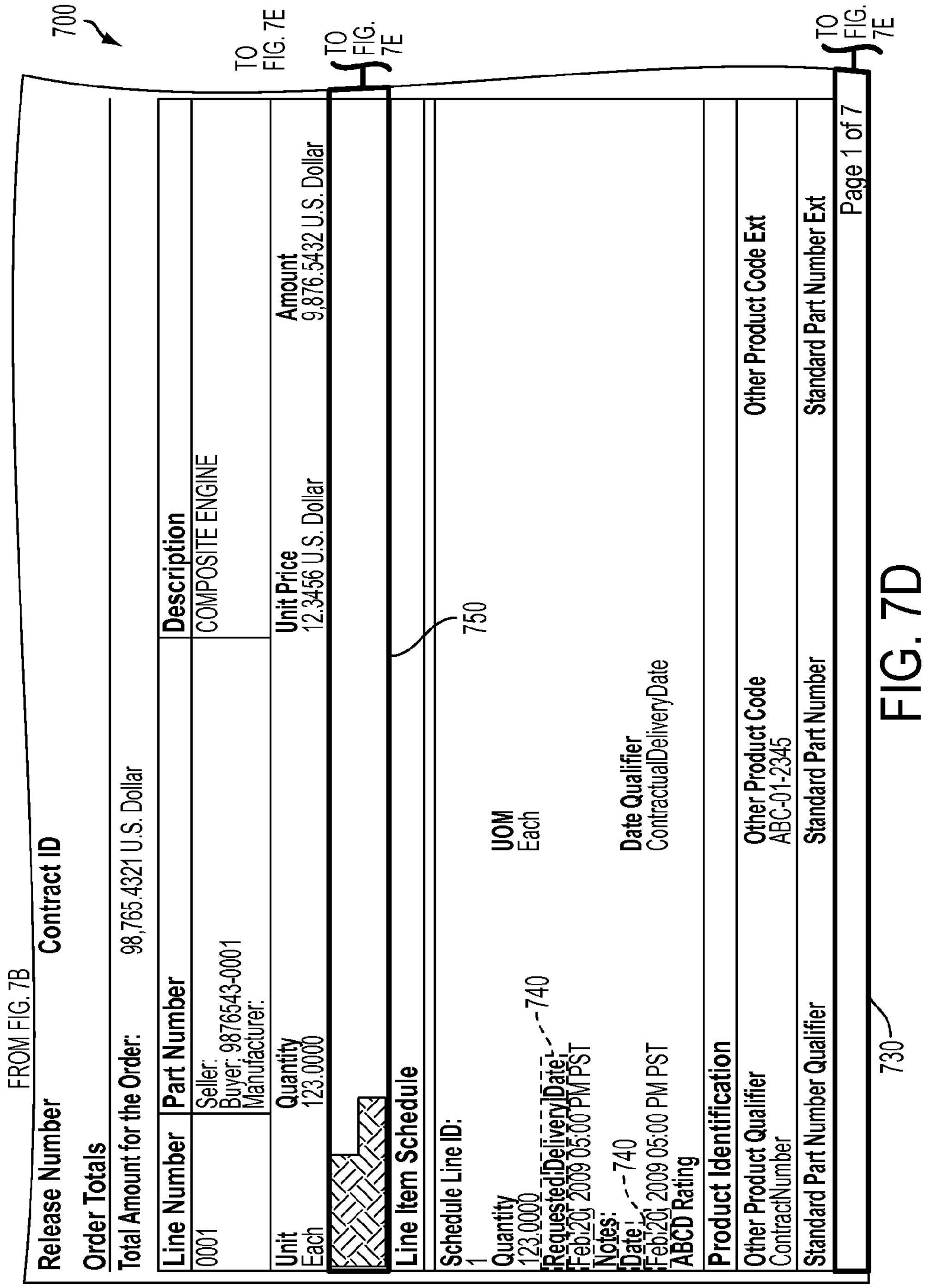

FIG. 7D

| Release Number | Contract ID | | |
|---|---|---|---|
| Order Totals | | | |
| Total Amount for the Order: | 98,765.4321 U.S. Dollar | | |
| Line Number | Part Number | Description | |
| 0001 | Seller:<br>Buyer: 9876543-0001<br>Manufacturer: | COMPOSITE ENGINE | |
| Unit<br>Each | Quantity<br>123.0000 | Unit Price<br>12.3456 U.S. Dollar | Amount<br>9,876.5432 U.S. Dollar |

Line Item Schedule
Schedule Line ID:
1
Quantity
123.0000
Requested Delivery Date:
Feb 20, 2009 05:00 PM PST
Notes:
Date:
Feb 20, 2009 05:00 PM PST
ABCD Rating UOM
Each Date Qualifier
ContractualDeliveryDate Product Identification

| Other Product Qualifier<br>ContractNumber | Other Product Code<br>ABC-01-2345 | Other Product Code Ext |
|---|---|---|
| Standard Part Number Qualifier | Standard Part Number | Standard Part Number Ext |

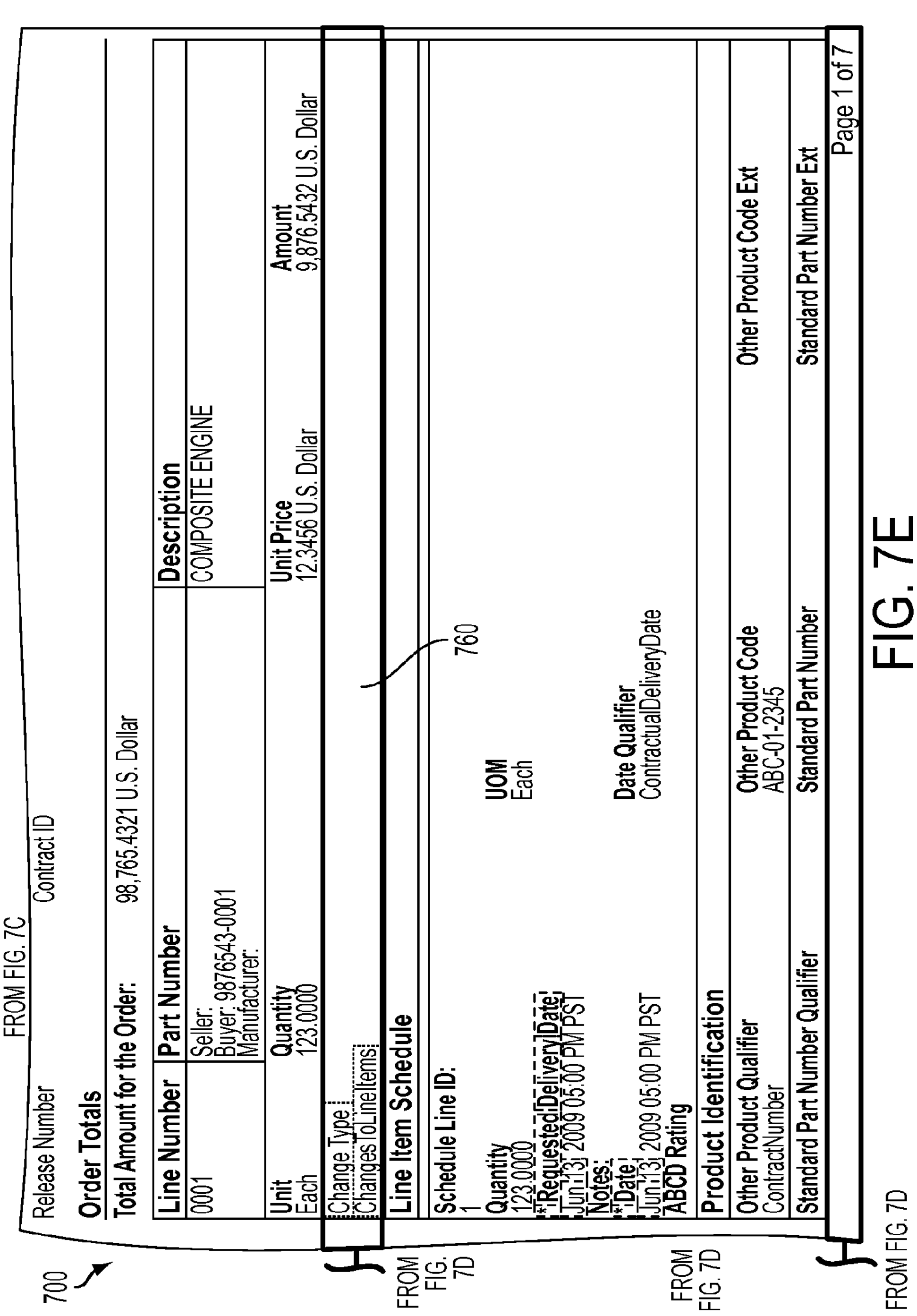

FIG. 7E

Release Number | FROM FIG. 7C | Contract ID

Order Totals
Total Amount for the Order: 98,765.4321 U.S. Dollar

| Line Number | Part Number | | Description | |
|---|---|---|---|---|
| 0001 | Seller:<br>Buyer: 9876543-0001<br>Manufacturer: | | COMPOSITE ENGINE | |
| Unit<br>Each | Quantity<br>123.0000 | | Unit Price<br>12.3456 U.S. Dollar | Amount<br>9,876.5432 U.S. Dollar |

Change Type:
ChangesToLineItems:

Line Item Schedule

Schedule Line ID:
1

Quantity          UOM
123.0000          Each

*RequestedDeliveryDate:
Jun 13, 2009 05:00 PM PST
Notes:
*Date:                          Date Qualifier
Jun 13, 2009 05:00 PM PST       ContractualDeliveryDate
ABCD Rating

Product Identification

| Other Product Qualifier | Other Product Code | Other Product Code Ext |
|---|---|---|
| ContractNumber | ABC-01-2345 | |
| Standard Part Number Qualifier | Standard Part Number | Standard Part Number Ext |

Page 1 of 7

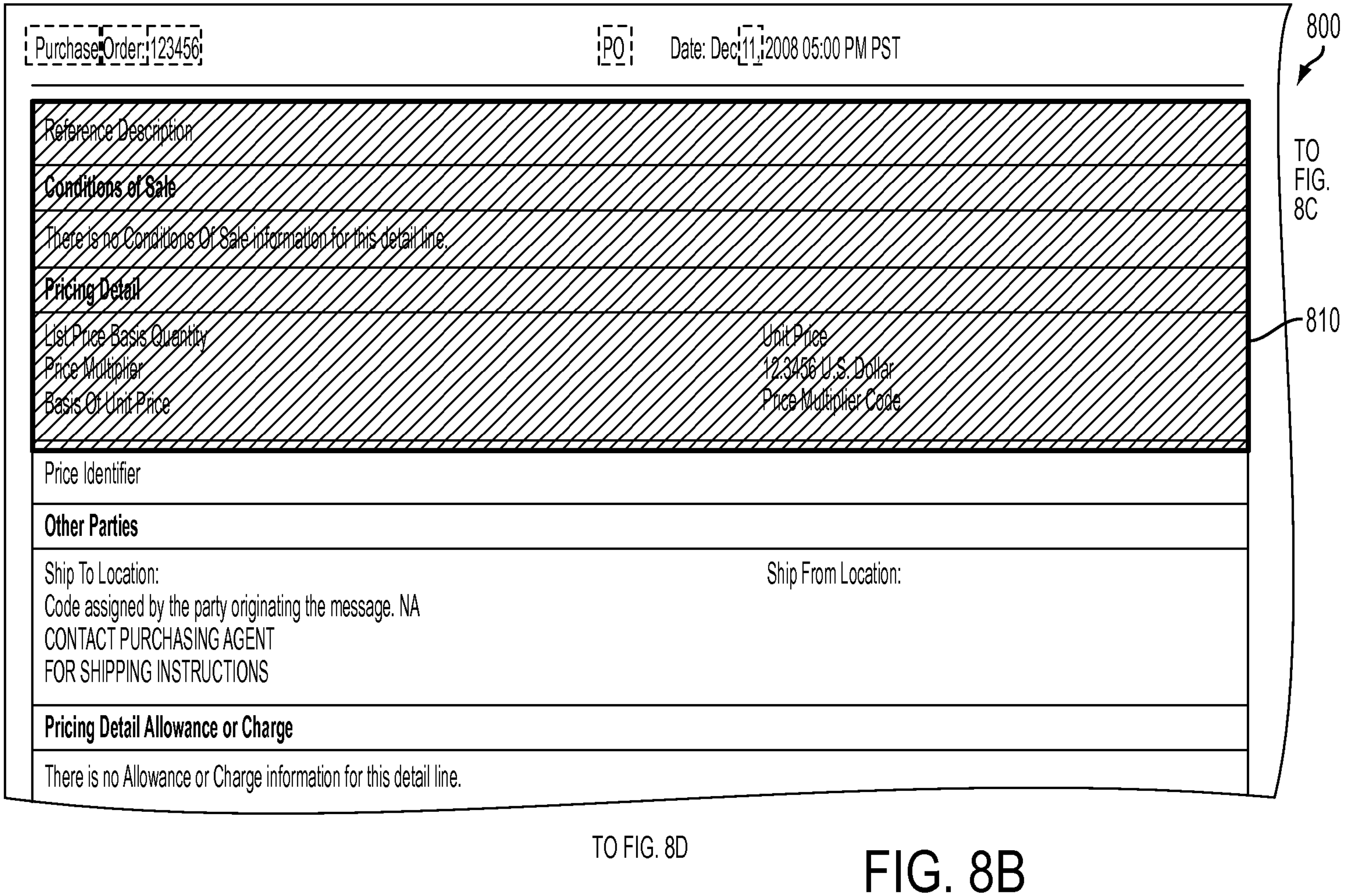

FIG. 8B

Purchase Order: 123456  PO  Date: Dec 11, 2008 05:00 PM PST

Reference Description
Conditions of Sale
There is no Conditions Of Sale information for this detail line.
Pricing Detail
List Price Basis Quantity
Price Multiplier
Basis Of Unit Price Unit Price
12,346 U.S. Dollar
Price Multiplier Code Price Identifier

Other Parties
Ship To Location:
Code assigned by the party originating the message. NA
CONTACT PURCHASING AGENT
FOR SHIPPING INSTRUCTIONS Ship From Location:

Pricing Detail Allowance or Charge
There is no Allowance or Charge information for this detail line.

FROM FIG. 8B

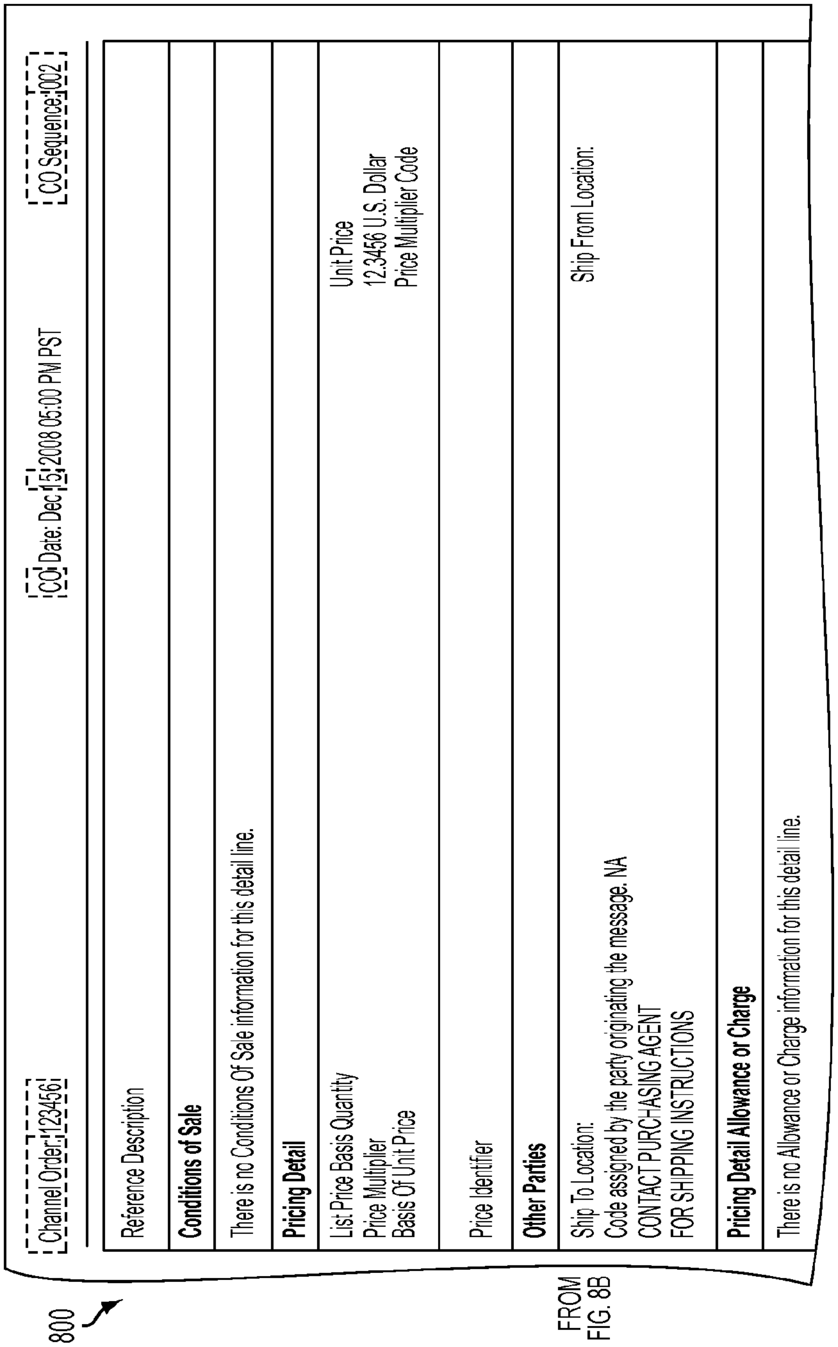

| Channel Order: 123456 | CO Date: Dec 15, 2008 05:00 PM PST | CO Sequence: 1002 |
|---|---|---|
| Reference Description | | |
| **Conditions of Sale** | | |
| There is no Conditions Of Sale information for this detail line. | | |
| **Pricing Detail** | | |
| List Price Basis Quantity<br>Price Multiplier<br>Basis Of Unit Price | | Unit Price<br>12.3456 U.S. Dollar<br>Price Multiplier Code |
| Price Identifier | | |
| **Other Parties** | | |
| Ship To Location:<br>Code assigned by the party originating the message. NA<br>CONTACT PURCHASING AGENT<br>FOR SHIPPING INSTRUCTIONS | | Ship From Location: |
| **Pricing Detail Allowance or Charge** | | |
| There is no Allowance or Charge information for this detail line. | | |

800

FROM FIG. 8B

FROM FIG. 8B

Notes
There is no Note information for this detail line.

Terms of Delivery
There is no Terms of Delivery information for this detail line.

Dimensions
There is no Dimension information for this detail line.

Other Parties

Seller Party    Ship From
N/A 12345678-abcd-134-efgh
ABC INC

Shipping Contact
Tom Smith
SupplierContact

Manufacturer    Remit To
Contracts

Order References

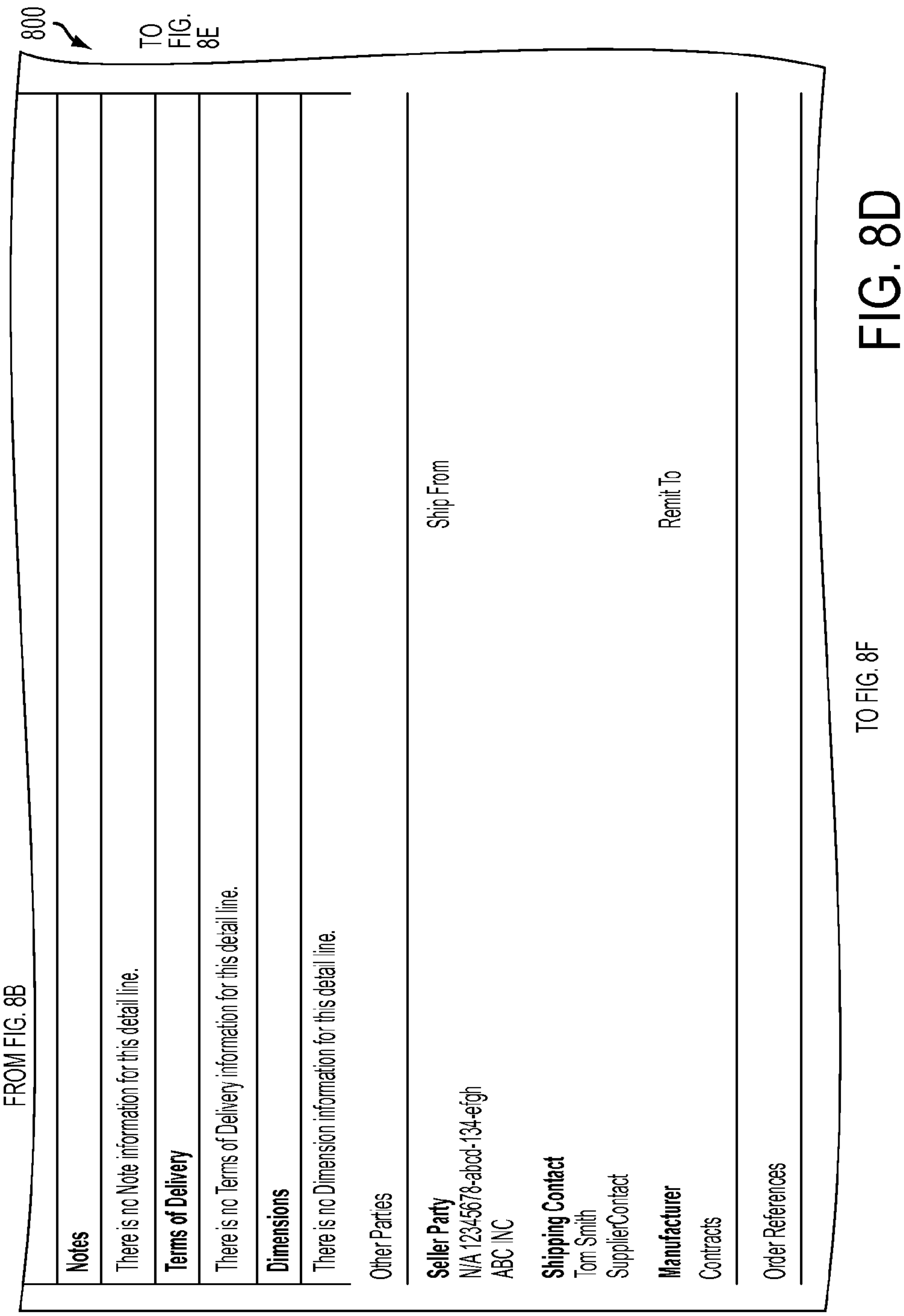

FIG. 8D

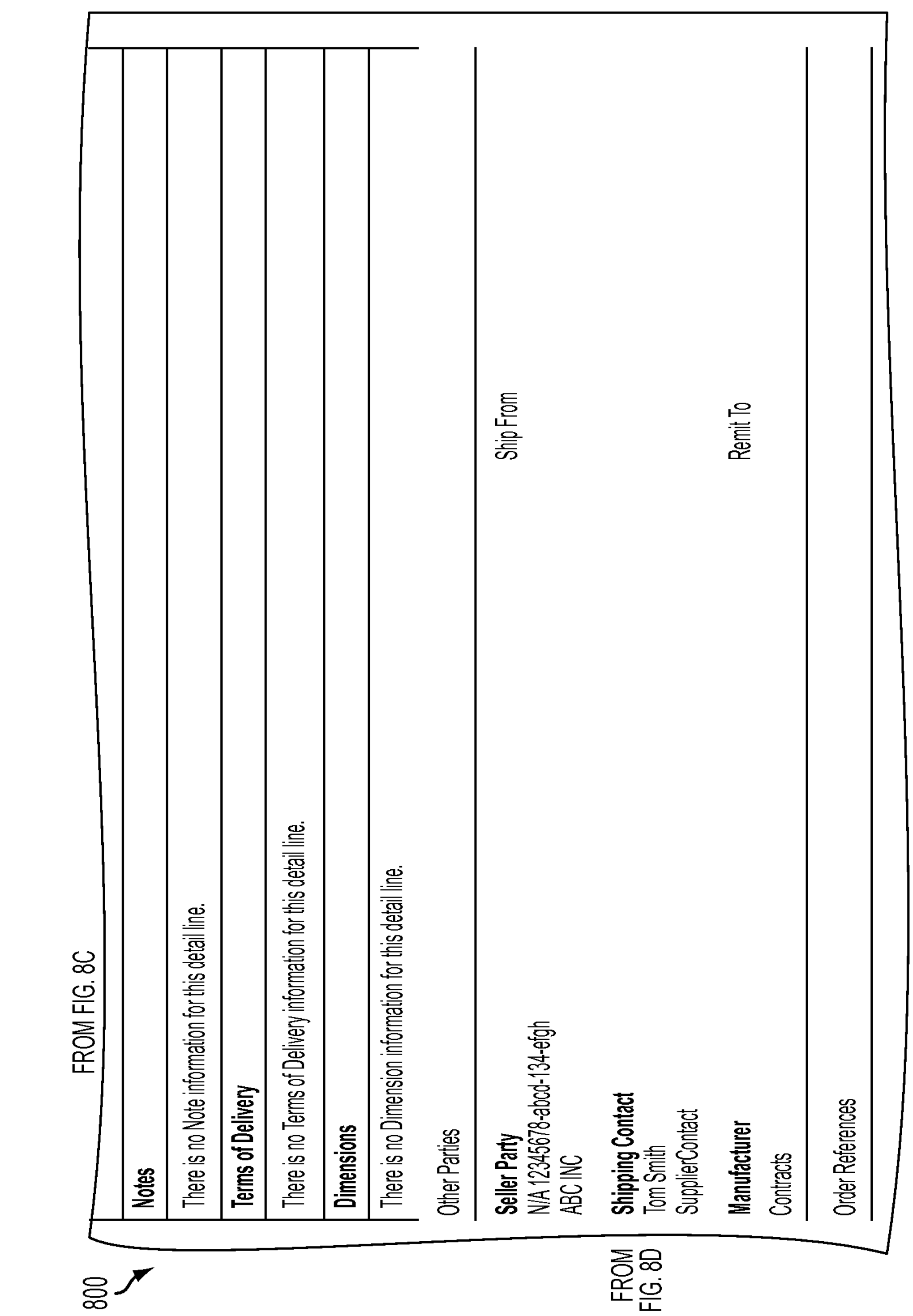

FIG. 8E (rotated content, page shows a form rotated 90°)

FROM FIG. 8C

Notes
There is no Note information for this detail line.

Terms of Delivery
There is no Terms of Delivery information for this detail line.

Dimensions
There is no Dimension information for this detail line.

Other Parties

Seller Party
N/A 12345678-abcd-134-efgh
ABC INC

Shipping Contact
Tom Smith
SupplierContact

Manufacturer
Contracts

Order References

Ship From

Remit To

FROM FIG. 8D

800

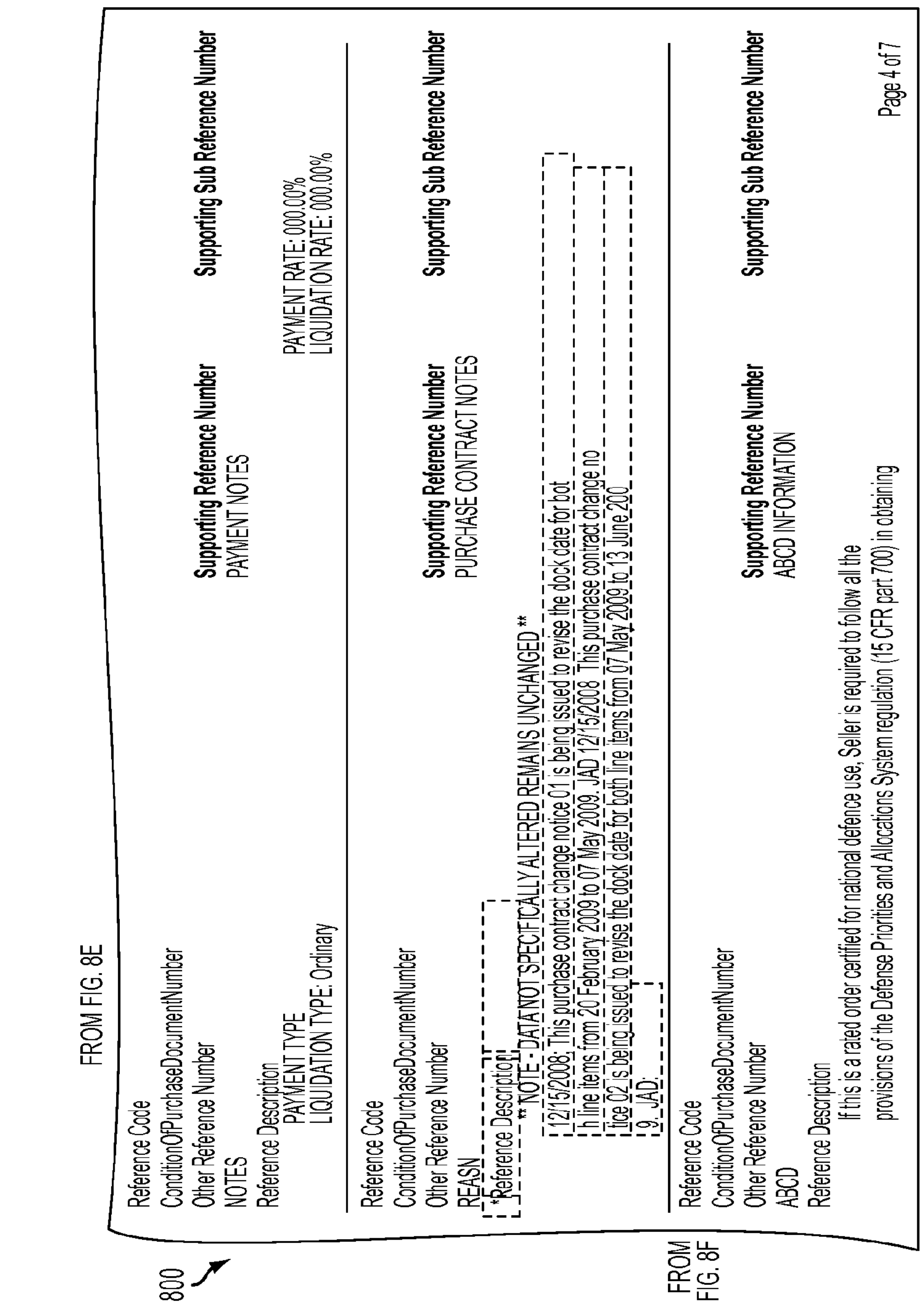

FIG. 8G

FROM FIG. 8E

800

Reference Code
ConditionOfPurchaseDocumentNumber
Other Reference Number          Supporting Reference Number          Supporting Sub Reference Number
NOTES                           PAYMENT NOTES
Reference Description
  PAYMENT TYPE                                    PAYMENT RATE: 000.00%
  LIQUIDATION TYPE: Ordinary                      LIQUIDATION RATE: 000.00%

Reference Code
ConditionOfPurchaseDocumentNumber
Other Reference Number          Supporting Reference Number          Supporting Sub Reference Number
REASN                           PURCHASE CONTRACT NOTES
 *Reference Description:
    NOTE - DATA NOT SPECIFICALLY ALTERED REMAINS UNCHANGED 
   12/15/2008: This purchase contract change notice 01 is being issued to revise the dock date for tot
   h line items from 20 February 2009 to 07 May 2009. JAD 12/15/2008  This purchase contract change no
   tice 02 is being issued to revise the dock date for both line items from 07 May 2009 to 13 June 200
   9. JAD:

FROM

Reference Code
ConditionOfPurchaseDocumentNumber
Other Reference Number          Supporting Reference Number          Supporting Sub Reference Number
ABCD                            ABCD INFORMATION
Reference Description
  If this is a rated order certified for national defence use, Seller is required to follow all the
  provisions of the Defense Priorities and Allocations System regulation (15 CFR part 700) in obtaining Page 4 of 7

| Purchase Order: K01234 | PO Date: Oct 12, 2008 05:00 PM MST | |
|---|---|---|
| 9.0000<br>Requested Delivery Date<br>Jan 01, 2009 05:00 PM MST<br>Notes:<br>DPAS Rating | Each | |
| Schedule Line ID:<br>5<br>Quantity<br>8.0000<br>Requested Delivery Date<br>Jan 15, 2009 05:00 PM MST<br>Notes:<br>DPAS Rating | UOM<br>Each | |
| Schedule Line ID:<br>6<br>Quantity<br>7.0000<br>Requested Delivery Date<br>Feb 21, 2009 05:00 PM MST<br>Notes:<br>DPAS Rating | UOM<br>Each | |
| Schedule Line ID:<br>7<br>Quantity<br>6.0000<br>Requested Delivery Date<br>Mar 01, 2009 05:00 PM MST<br>Notes:<br>DPAS Rating | UOM<br>Each | |
| **Product Identification** | | |
| Other Product Qualifier<br>DrawingRevisionNumber | Other Product Code<br>C | Other Product Code Ext |
| Other Product Qualifier<br>BuyersEngineeringChangeLevelNumber | Other Product Code<br>02 | Other Product Code Ext |
| Standard Part Number Qualifier | Standard Part Number | Standard Part Number Ext |
| Manufacturer Part Number<br>Manufacturer Name | Manufacturer Part Number Ext<br>Manufacturer ID | |
| Off Catalog Flag<br>true | | |
| **Final Recipient** | | |
| There is no Final Recipient information for this detail line. | | |
| **Tax** | | |
| Taxable Amount<br><br>Tax ID<br>98-7654321B<br>Reason Tax Exempt<br>Yes-TaxExempt | Tax Amount<br><br>Percentage<br>Tax Location Qualifier<br><br>Tax Type<br>Other: | Tax Category<br>Standard Rate<br>Tax Location Agency<br>Tax Location |
| **Notes** | | |
| There is no Note information for this detail line. | | |
| **Supporting References** | | |
| Reference Code<br>DefensePrioritiesAllocationSystemPriorityRating<br>Primary Reference Number<br>AB-CD<br>Reference Description | Supporting Reference Number | Supporting Sub Reference Number |
| Reference Code<br>ConditionOfPurchaseDocumentNumber<br>Primary Reference Number<br>9002<br>Reference Description | Supporting Reference Number | Supporting Sub Reference Number |
| Reference Code | | |

| Purchase Order: K01234 | | PO Date: Oct 12, 2008 05:00 PM MST | |
|---|---|---|---|
| 9.0000<br>Requested Delivery Date<br>Jan 01, 2009 05:00 PM MST<br>Notes:<br>DPAS Rating | Each | | |
| Schedule Line ID:<br>5<br>Quantity<br>8.0000<br>Requested Delivery Date<br>Jan 15, 2009 05:00 PM MST<br>Notes:<br>DPAS Rating | UOM<br>Each | | |
| Schedule Line ID:<br>6<br>Quantity<br>7.0000<br>Requested Delivery Date<br>Feb 21, 2009 05:00 PM MST<br>Notes:<br>DPAS Rating | UOM<br>Each | | |

900

FROM FIG. 9B

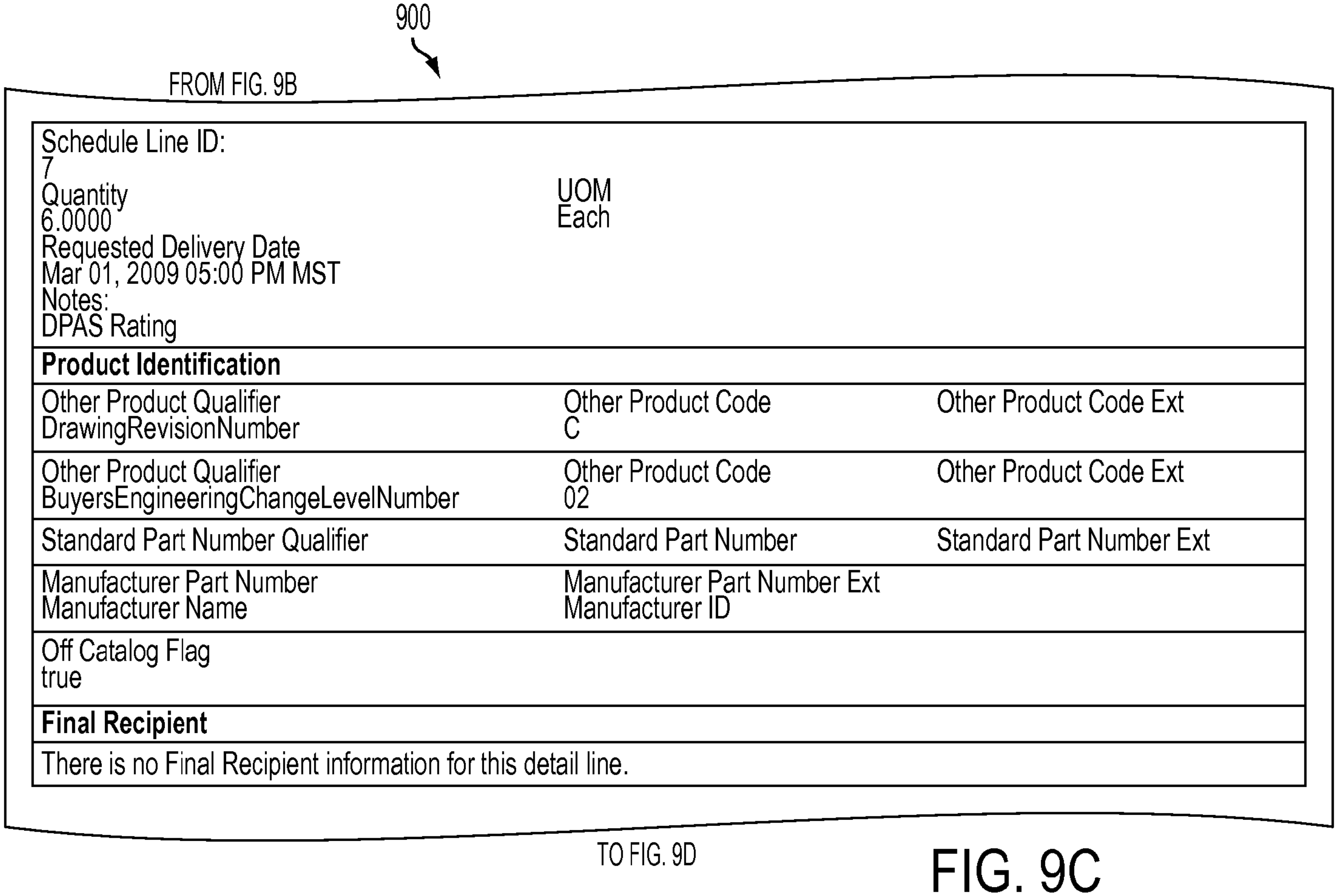

FROM FIG. 9B

900

| Schedule Line ID: | | | |
|---|---|---|---|
| 7 | | | |
| Quantity | UOM | | |
| 6.0000 | Each | | |
| Requested Delivery Date | | | |
| Mar 01, 2009 05:00 PM MST | | | |
| Notes: | | | |
| DPAS Rating | | | |
| **Product Identification** | | | |
| Other Product Qualifier | Other Product Code | Other Product Code Ext | |
| DrawingRevisionNumber | C | | |
| Other Product Qualifier | Other Product Code | Other Product Code Ext | |
| BuyersEngineeringChangeLevelNumber | 02 | | |
| Standard Part Number Qualifier | Standard Part Number | Standard Part Number Ext | |
| Manufacturer Part Number | Manufacturer Part Number Ext | | |
| Manufacturer ID | Manufacturer Name | | |
| Off Catalog Flag | | | |
| true | | | |
| **Final Recipient** | | | |
| There is no Final Recipient information for this detail line. | | | |

FROM FIG. 9C

900

Tax

| Taxable Amount | Tax Amount | Tax Category |
| --- | --- | --- |
| | | Standard Rate |
| Tax ID | Percentage | Tax Location Agency |
| 98-7654321B | Tax Location Qualifier | Tax Location |
| Reason Tax Exempt | Tax Type | |
| Yes-TaxExempt | Other: | |

Notes

There is no Note information for this detail line.

Supporting References

| Reference Code | | |
| --- | --- | --- |
| DefensePrioritiesAllocationSystemPriorityRating | Supporting Reference Number | Supporting Sub Reference Number |
| Primary Reference Number | | |
| AB-CD | | |
| Reference Description | | |
| Reference Code | | |
| ConditionOfPurchaseDocumentNumber | Supporting Reference Number | Supporting Sub Reference Number |
| Primary Reference Number | | |
| 9002 | | |
| Reference Description | | |
| Reference Code | | |

Page 2 of 7

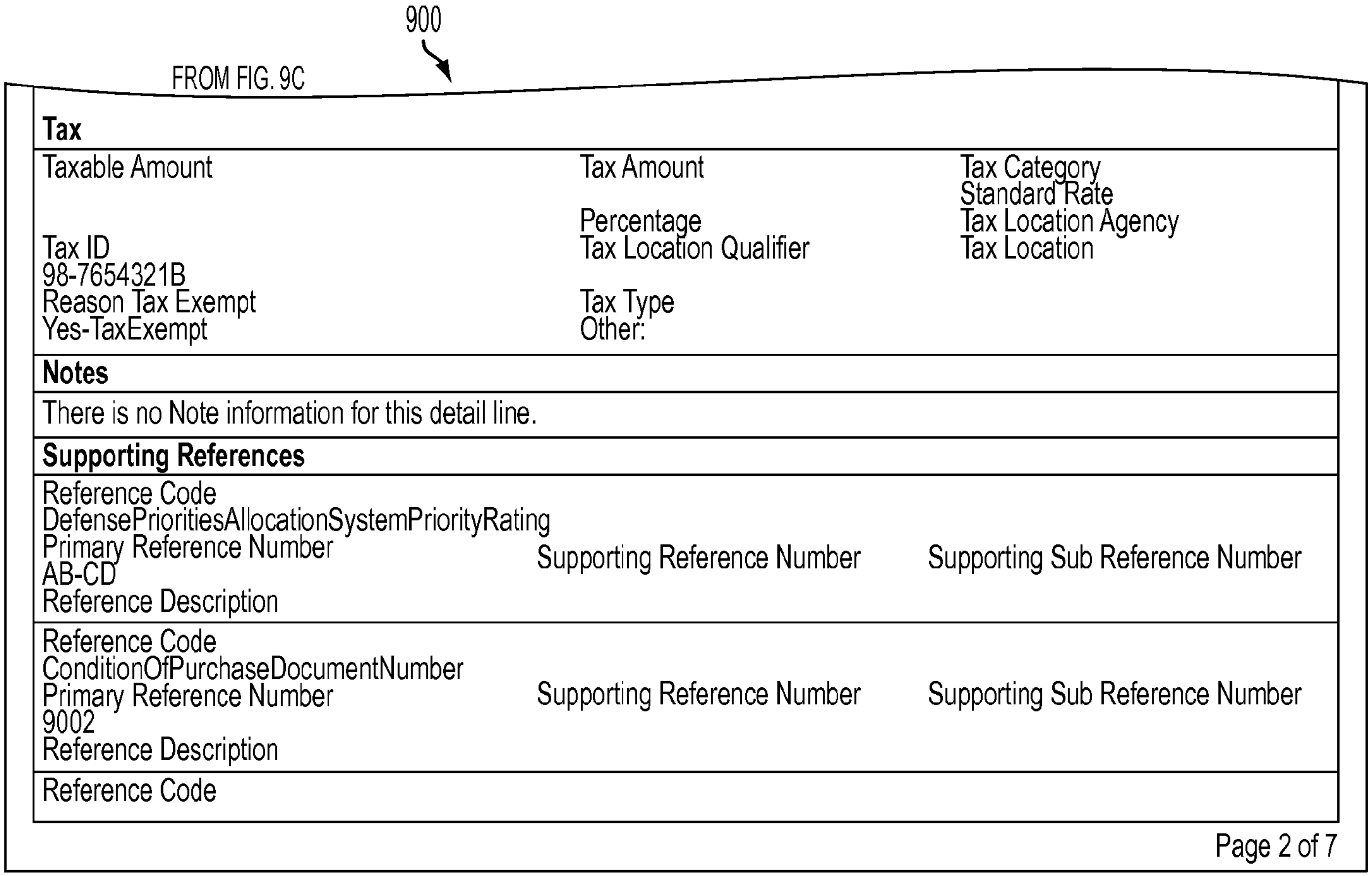

Change Order: K01234 PO Date: Nov 24, 2008 05:00 PM MST CO Sequence: A

Notes:
DPAS Rating

| | | |
|---|---|---|
| Schedule Line ID:<br>4<br>Quantity<br>9.0000<br>Requested Delivery Date<br>Jan 01, 2009 05:00 PM MST<br>Notes:<br>DPAS Rating | UOM<br>Each | |
| Schedule Line ID:<br>5<br>Quantity<br>8.0000<br>Requested Delivery Date<br>Jan 15, 2009 05:00 PM MST<br>Notes:<br>DPAS Rating | UOM<br>Each | |
| Schedule Line ID:<br>6<br>Quantity<br>8.0000<br>Requested Delivery Date<br>Feb 21, 2009 05:00 PM MST<br>Notes:<br>DPAS Rating | UOM<br>Each | |
| Schedule Line ID:<br>7<br>Quantity<br>6.0000<br>Requested Delivery Date<br>Mar 01, 2009 05:00 PM MST<br>Notes:<br>DPAS Rating | UOM<br>Each | |
| **Product Identification** | | |
| Other Product Qualifier<br>DrawingRevisionNumber | Other Product Code<br>C | Other Product Code Ext |
| Other Product Qualifier<br>BuyersEngineeringChangeLevelNumber | Other Product Code<br>02 | Other Product Code Ext |
| Standard Part Number Qualifier | Standard Part Number | Standard Part Number Ext |
| Manufacturer Part Number<br>Manufacturer Name | Manufacturer Part Number Ext<br>Manufacturer ID | |
| Off Catalog Flag<br>true | | |
| **Final Recipient** | | |
| There is no Final Recipient information for this detail line. | | |
| **Tax** | | |
| Taxable Amount<br><br><br>Tax ID<br>98-7654321B<br>Reason Tax Exempt<br>Yes-TaxExempt | Tax Amount<br><br>Percentage<br>Tax Location Qualifier<br><br>Tax Type<br>Other: | Tax Category<br>Standard Rate<br>Tax Location Agency<br>Tax Location |
| **Notes** | | |
| There is no Note information for this detail line. | | |
| **Supporting References** | | |
| Reference Code<br>ConditionOfPurchaseDocumentNumber<br>Primary Reference Number<br>9002<br>Reference Description | Supporting Reference Number | Supporting Sub Reference Number |
| Reference Code | | |

Page 2 of 6

FROM FIG. 10B

| | | |
|---|---|---|
| Schedule Line ID:<br>7<br>Quantity<br>6.0000<br>Requested Delivery Date<br>Mar 01, 2009 05:00 PM MST<br>Notes:<br>DPAS Rating | UOM<br>Each | |
| **Product Identification** | | |
| Other Product Qualifier<br>DrawingRevisionNumber | Other Product Code<br>C | Other Product Code Ext |
| Other Product Qualifier<br>BuyersEngineeringChangeLevelNumber | Other Product Code<br>02 | Other Product Code Ext |
| Standard Part Number Qualifier | Standard Part Number | Standard Part Number Ext |
| Manufacturer Part Number<br>Manufacturer Name | Manufacturer Part Number Ext<br>Manufacturer ID | |
| Off Catalog Flag<br>true | | |
| **Final Recipient** | | |
| There is no Final Recipient information for this detail line. | | |

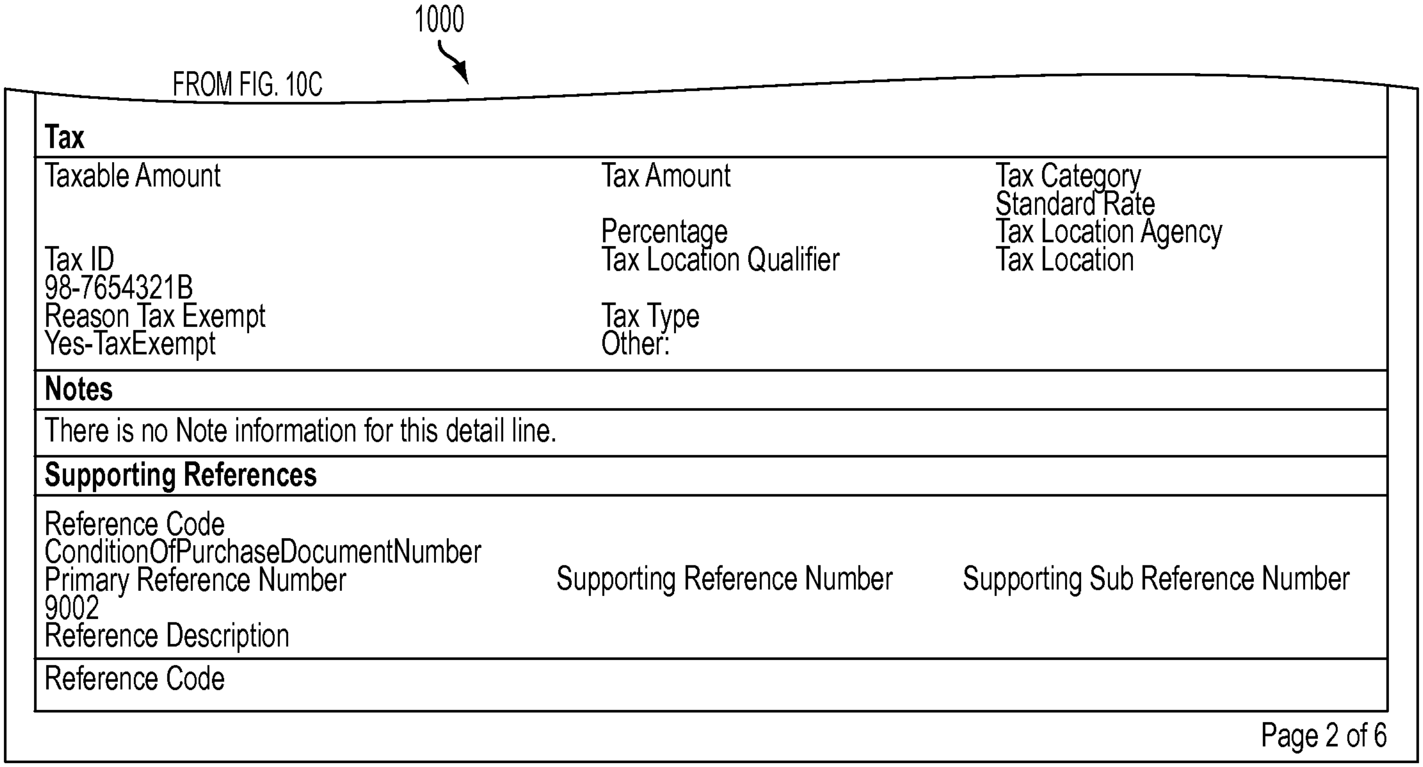

FIG. 10D

Tax

| | | |
|---|---|---|
| Taxable Amount | Tax Amount | Tax Category |
| | | Standard Rate |
| Tax ID | Percentage | Tax Location Agency |
| 98-7654321B | Tax Location Qualifier | Tax Location |
| Reason Tax Exempt | Tax Type | |
| Yes-TaxExempt | Other: | |

Notes

There is no Note information for this detail line.

Supporting References

| | | |
|---|---|---|
| Reference Code | | |
| ConditionOfPurchaseDocumentNumber | Supporting Reference Number | Supporting Sub Reference Number |
| Primary Reference Number | | |
| 9002 | | |
| Reference Description | | |
| | | |
| Reference Code | | |

1100

Purchase Order: K01234     PO Date: Oct 12, 2008 05:00 PM MST

Notes:
DPAS Rating

Schedule Line ID:
4
Quantity
9.0000
Requested Delivery Date
Jan 01, 2009 05:00 PM MST
Notes:
DPAS Rating UOM
Each Schedule Line ID:
5
Quantity
7.0000
Requested Delivery Date
Jan 15, 2009 05:00 PM MST
Notes:
DPAS Rating UOM
Each Schedule Line ID:
7
Quantity
8.0000
Requested Delivery Date
Feb 21, 2009 05:00 PM MST
Notes:
DPAS Rating UOM
Each

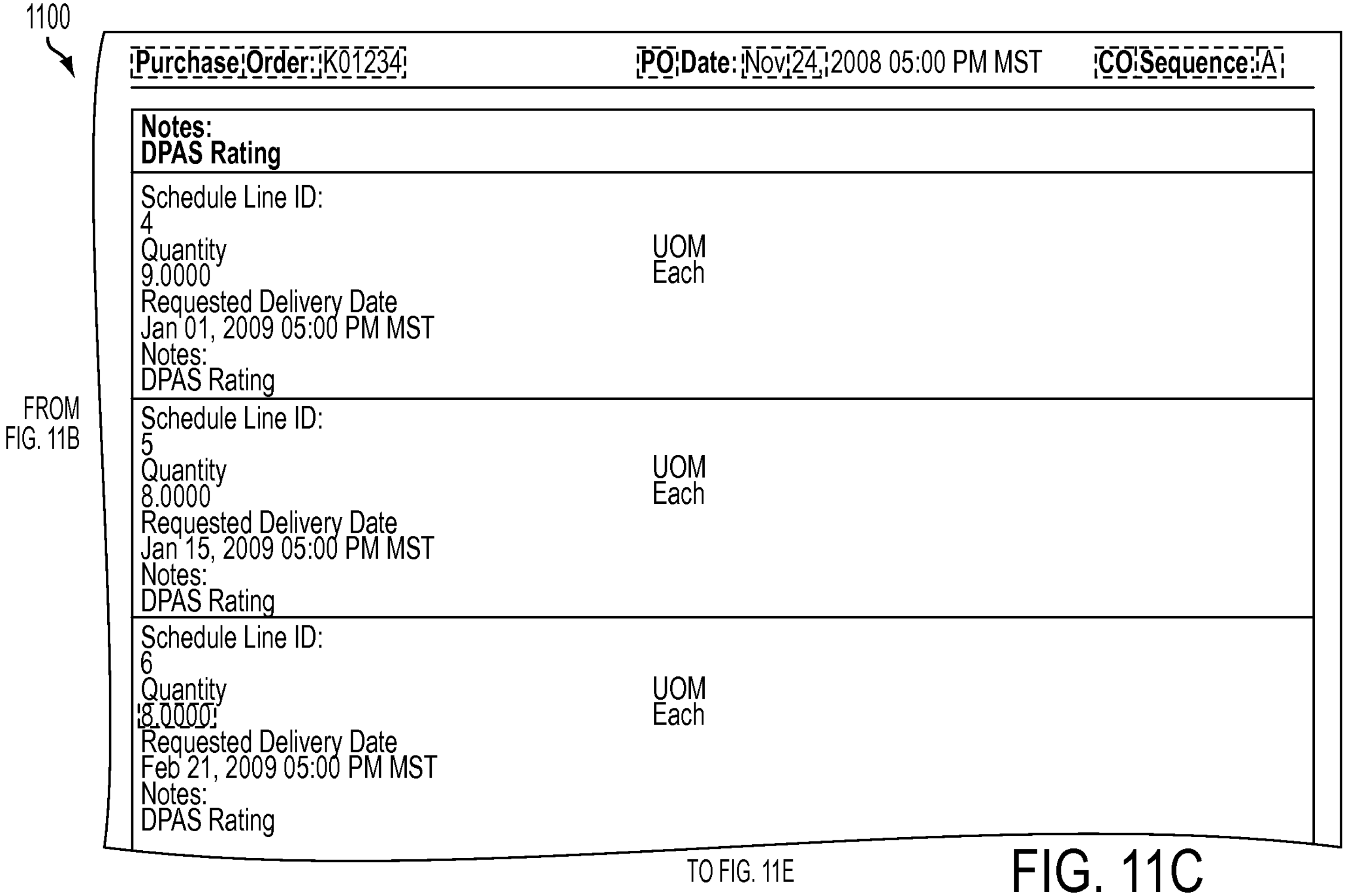

| Purchase Order: K01234 | PO Date: Nov 24, 2008 05:00 PM MST | CO Sequence: A |
|---|---|---|
| **Notes:** <br> **DPAS Rating** | | |
| Schedule Line ID: <br> 4 <br> Quantity <br> 9.0000 <br> Requested Delivery Date <br> Jan 01, 2009 05:00 PM MST <br> Notes: <br> DPAS Rating | UOM <br> Each | |
| Schedule Line ID: <br> 5 <br> Quantity <br> 8.0000 <br> Requested Delivery Date <br> Jan 15, 2009 05:00 PM MST <br> Notes: <br> DPAS Rating | UOM <br> Each | |
| Schedule Line ID: <br> 6 <br> Quantity <br> 8.0000 <br> Requested Delivery Date <br> Feb 21, 2009 05:00 PM MST <br> Notes: <br> DPAS Rating | UOM <br> Each | |

1100

FROM FIG. 11B

FROM FIG. 11B

| | | |
|---|---|---|
| Schedule Line ID: | | |
| 7 | | |
| Quantity | UOM | |
| 6.0000 | Each | |
| Requested Delivery Date | | |
| Mar 01, 2009 05:00 PM MST | | |
| Notes: | | |
| DPAS Rating | | |
| **Product Identification** | | |
| Other Product Qualifier | Other Product Code | Other Product Code Ext |
| DrawingRevisionNumber | C | |
| Other Product Qualifier | Other Product Code | Other Product Code Ext |
| BuyersEngineeringChangeLevelNumber | 02 | |
| Standard Part Number Qualifier | Standard Part Number | Standard Part Number Ext |
| Manufacturer Part Number | Manufacturer Part Number Ext | |
| Manufacturer Name | Manufacturer ID | |
| Off Catalog Flag | | |
| true | | |
| **Final Recipient** | | |
| There is no Final Recipient information for this detail line. | | |

1100

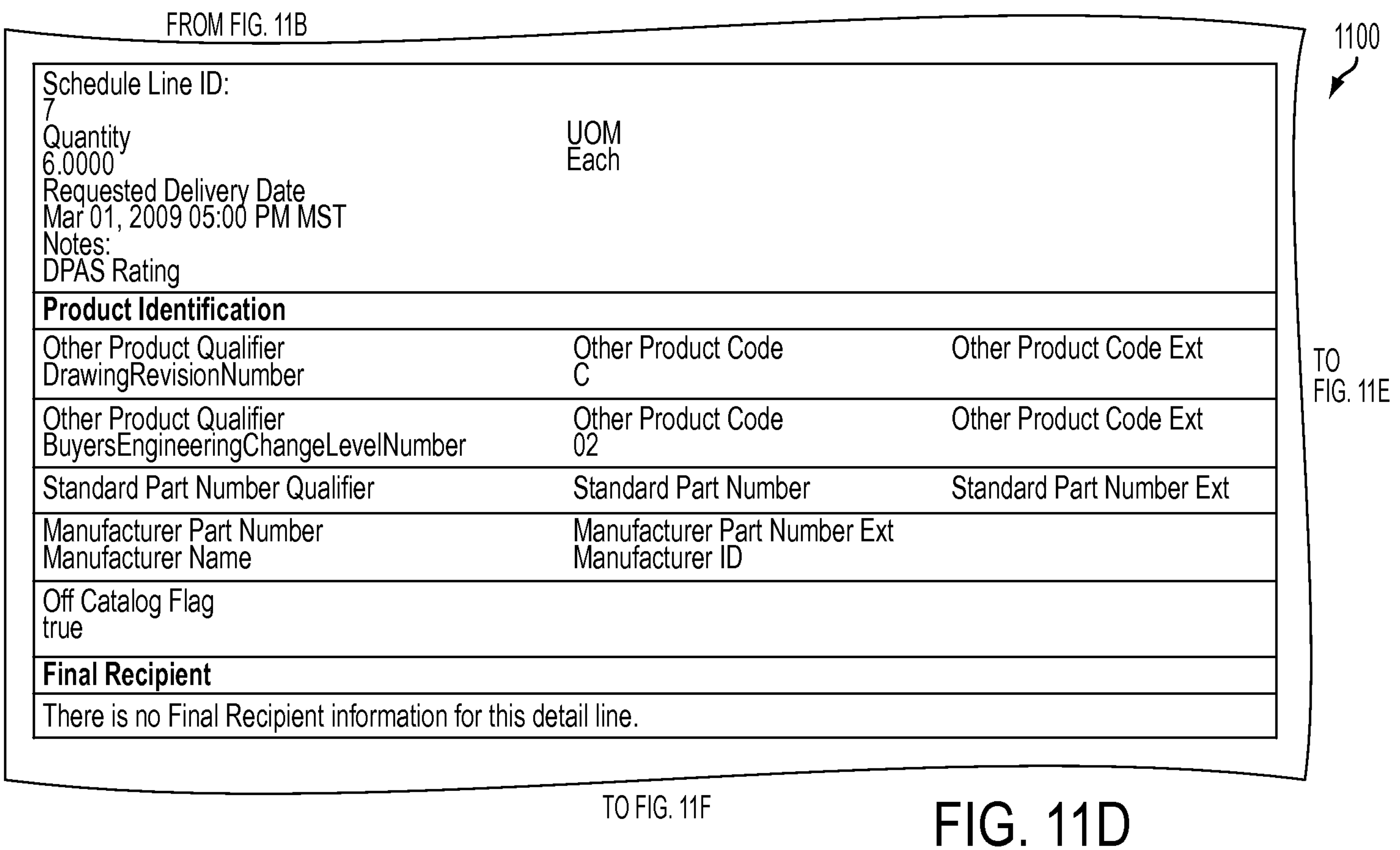

FROM FIG. 11C

FROM FIG. 11D

| | | |
|---|---|---|
| Schedule Line ID:<br>7<br>Quantity<br>6.0000<br>Requested Delivery Date<br>Mar 01, 2009 05:00 PM MST<br>Notes:<br>DPAS Rating | UOM<br>Each | |
| **Product Identification** | | |
| Other Product Qualifier<br>DrawingRevisionNumber | Other Product Code<br>C | Other Product Code Ext |
| Other Product Qualifier<br>BuyersEngineeringChangeLevelNumber | Other Product Code<br>02 | Other Product Code Ext |
| Standard Part Number Qualifier | Standard Part Number | Standard Part Number Ext |
| Manufacturer Part Number<br>Manufacturer Name | Manufacturer Part Number Ext<br>Manufacturer ID | |
| Off Catalog Flag<br>true | | |
| **Final Recipient** | | |
| There is no Final Recipient information for this detail line. | | |

FROM FIG. 11D

Tax

Taxable Amount     Tax Amount     Tax Category
                              Percentage       StandardRate
Tax ID                    Tax Location Qualifier    Tax Location Agency
98-7654321B                Tax Type                    Tax Location
Reason Tax Exempt       Other:
Yes-TaxExempt

Notes

There is no Note information for this detail line.

Supporting References

Reference Code
DefensePrioritiesAllocationSystemPriorityRating     Supporting Reference Number     Supporting Sub Reference Number
Primary Reference Number
AB-CD
Reference Description
Reference Code

1100

Page 2 of 7

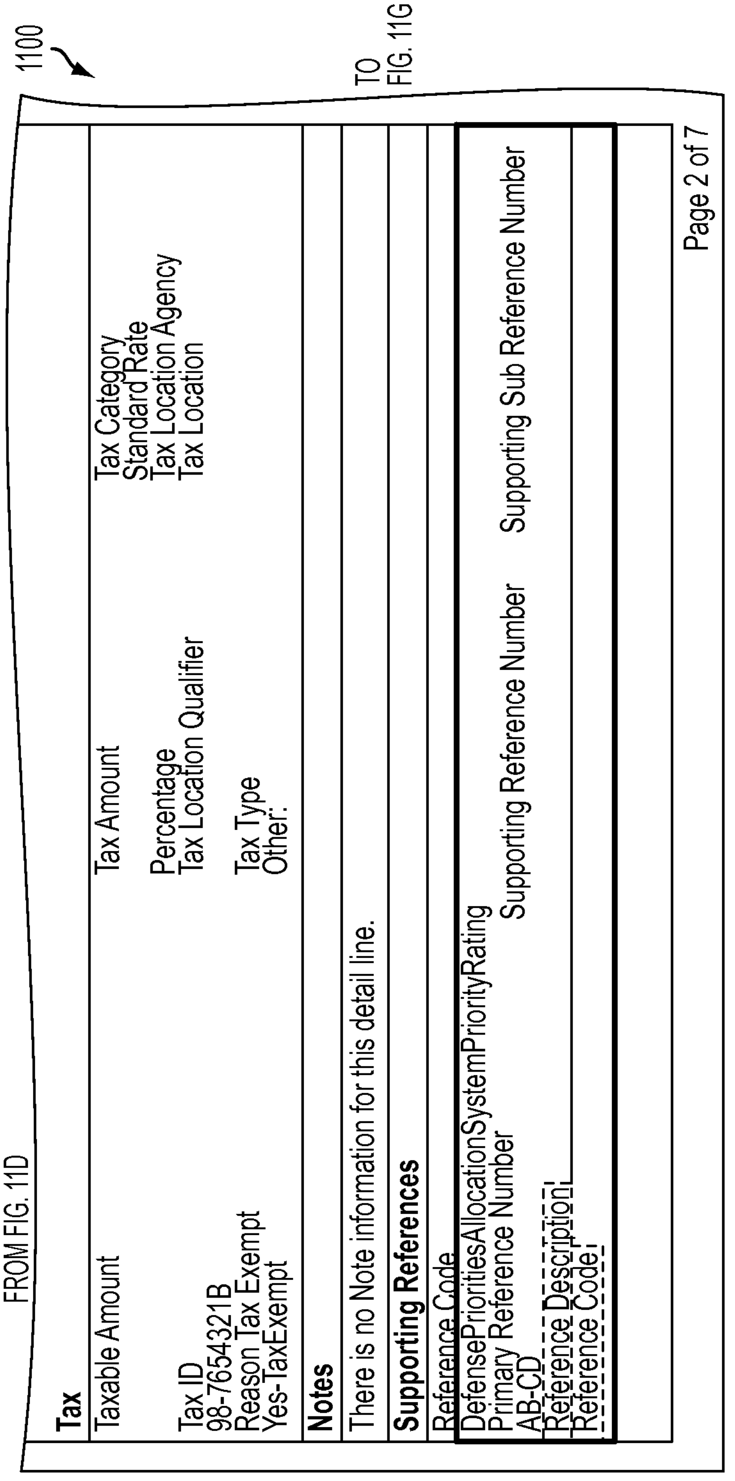

FIG. 11F

FROM FIG. 11D

Tax

Taxable Amount        Tax Amount                    Tax Category
                                                    Standard Rate
Tax ID                Percentage                    Tax Location Agency
98-7654321B           Tax Location Qualifier        Tax Location
Reason Tax Exempt
Yes-TaxExempt         Tax Type
                      Other:

Notes
There is no Note information for this detail line.

Supporting References
Reference Code

FROM FIG. 11F

1110

Page 2 of 7

Change Order: K01234  CO Date: Nov 24, 2008 05:00 PM MST  CO Sequence: A Item Characteristics
Surface Layer Position Agency Code
Item Characteristic Value
ALTERNATING CURRENT MOTOR Product Description

Other Parties

Seller Party  Ship From
N/A 12345678-abcd-1234-efgh-0abcde987654
AEROSPACE ABC DEF GHI SERVICES
12345 N CIRCLE ST
DENVER, USCO 98765-1234
US

Shipping Contact
NORMAN ROCKVILE
Supplier Contact

Manufacturer  Remit To

FROM FIG. 13B

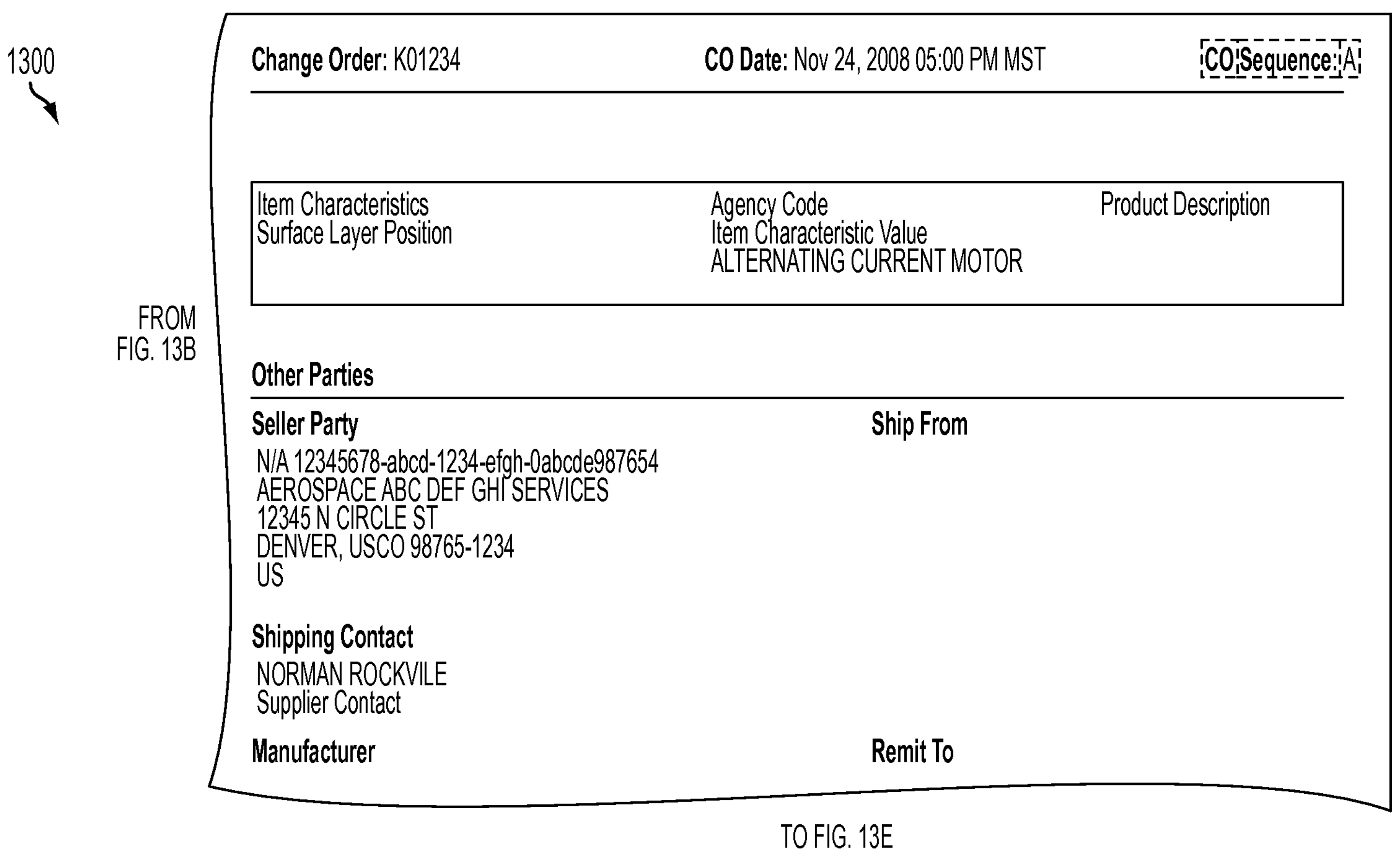

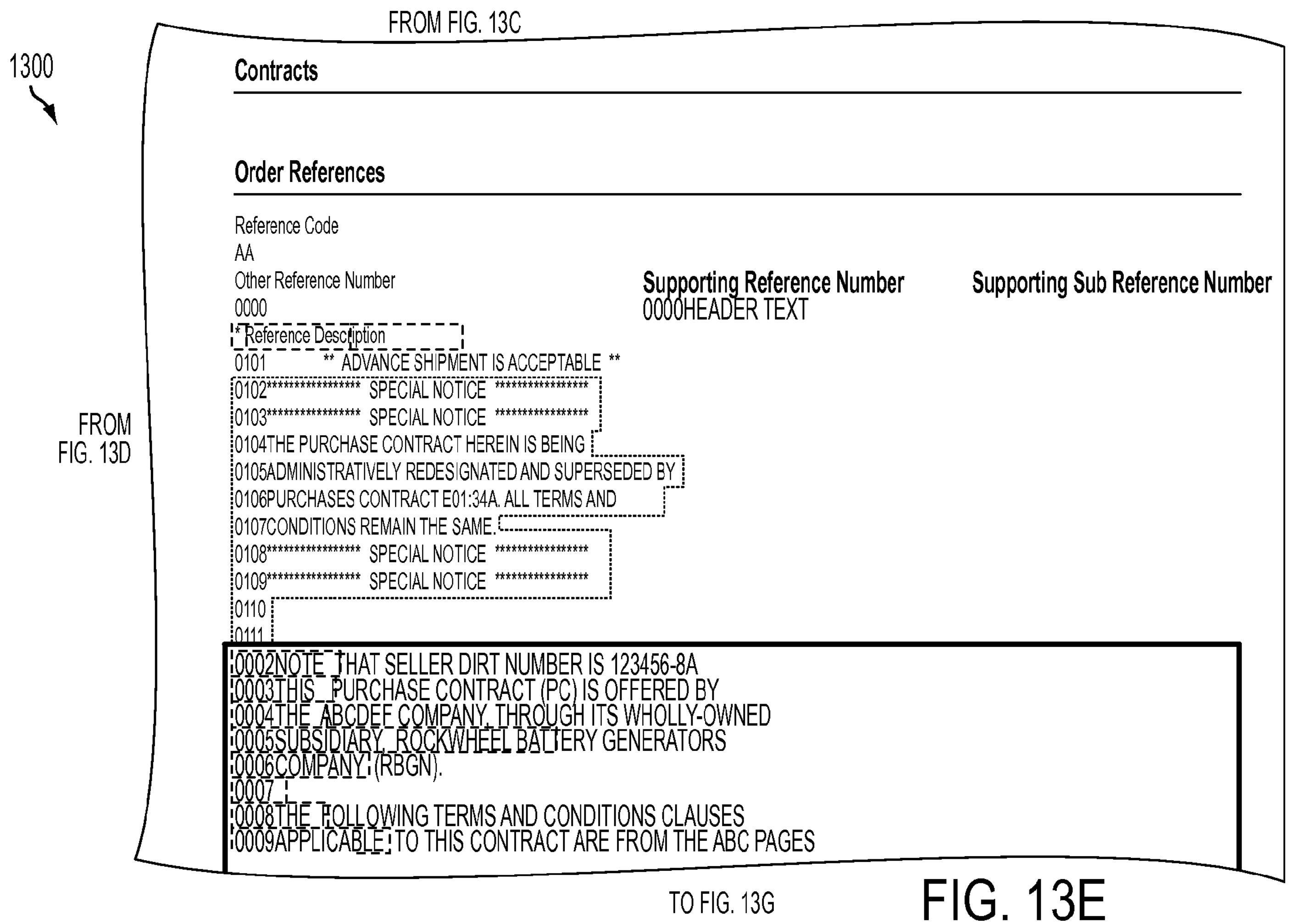

FROM FIG. 13C

Contracts

Order References

Reference Code
AA
Other Reference Number                    Supporting Reference Number         Supporting Sub Reference Number
0000                                      0000HEADER TEXT
 *  Reference Description
0101      ADVANCE SHIPMENT IS ACCEPTABLE 
0102 **********  SPECIAL NOTICE  **************
0103 **********  SPECIAL NOTICE  **************
0104THE PURCHASE CONTRACT HEREIN IS BEING
0105ADMINISTRATIVELY REDESIGNATED AND SUPERSEDED BY
0106PURCHASES CONTRACT E01:34A. ALL TERMS AND
0107CONDITIONS REMAIN THE SAME.
0108 **********  SPECIAL NOTICE  **************
0109 **********  SPECIAL NOTICE  **************
0110
0111
0002NOTE THAT SELLER DIRT NUMBER IS 123456-8A.
0003THIS PURCHASE CONTRACT (PC) IS OFFERED BY
0004THE ABCDEF COMPANY THROUGH ITS WHOLLY-OWNED
0005SUBSIDIARY, ROCKWHEEL BATTERY GENERATORS
0006COMPANY, (RBGN).
0007
0008THE FOLLOWING TERMS AND CONDITIONS CLAUSES
0009APPLICABLE TO THIS CONTRACT ARE FROM THE ABC PAGES

FROM FIG. 13D

1300

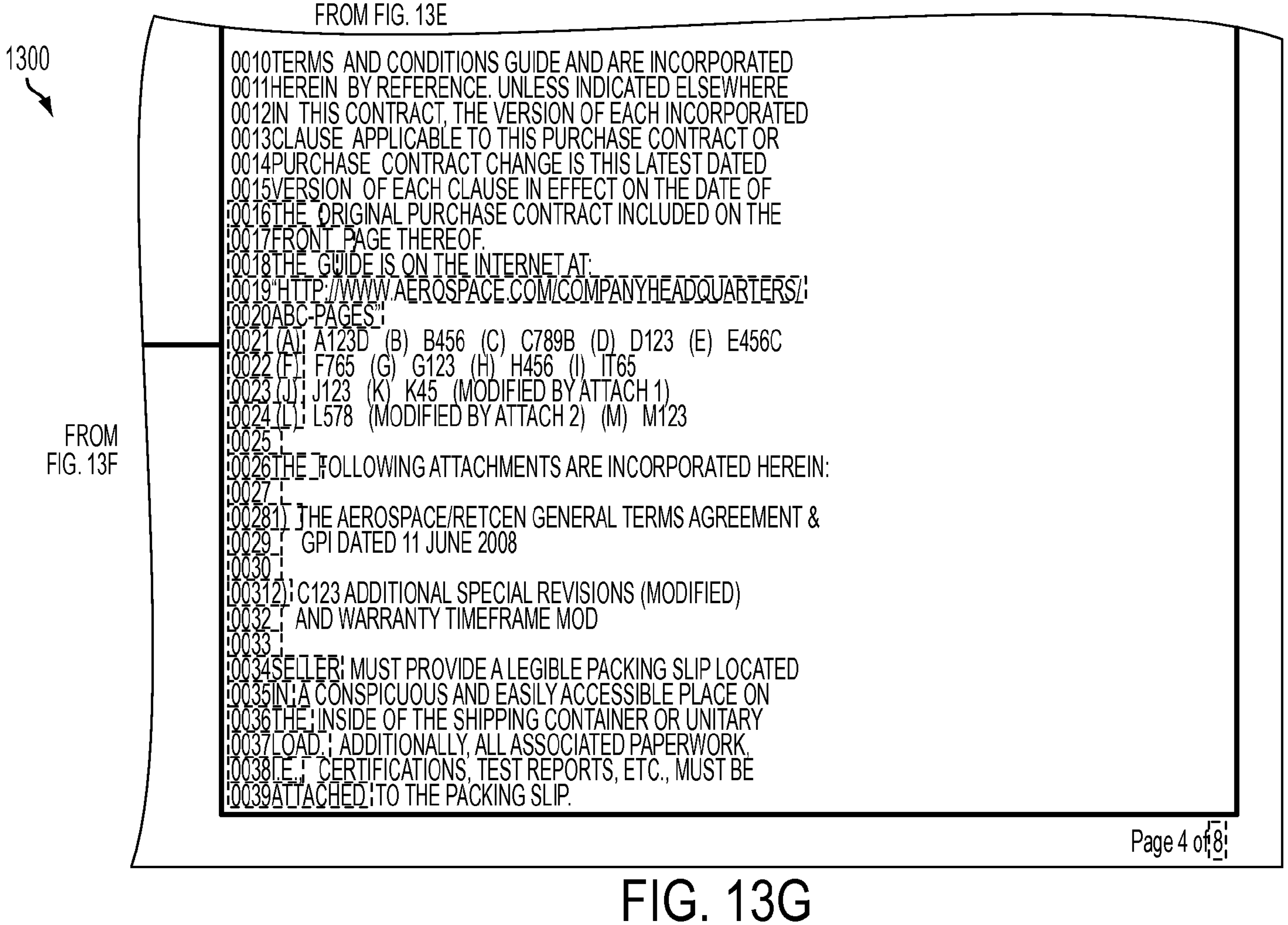

FIG. 13G

FROM FIG. 13E

0010 TERMS AND CONDITIONS GUIDE AND ARE INCORPORATED
0011 HEREIN BY REFERENCE. UNLESS INDICATED ELSEWHERE
0012 IN THIS CONTRACT, THE VERSION OF EACH INCORPORATED
0013 CLAUSE APPLICABLE TO THIS PURCHASE CONTRACT OR
0014 PURCHASE CONTRACT CHANGE IS THIS LATEST DATED
0015 VERSION OF EACH CLAUSE IN EFFECT ON THE DATE OF
0016 THE ORIGINAL PURCHASE CONTRACT INCLUDED ON THE
0017 FRONT PAGE THEREOF.
0018 THE GUIDE IS ON THE INTERNET AT:
0019 "HTTP://WWW.AEROSPACE.COM/COMPANYHEADQUARTERS/
0020 ABC-PAGES".
0021 (A) A123D (B) B456 (C) C789B (D) D123 (E) E456C
0022 (F) F765 (G) G123 (H) H456 (I) IT65
0023 (J) J123 (K) K45 (MODIFIED BY ATTACH 1)
0024 (L) L578 (MODIFIED BY ATTACH 2) (M) M123
0025
0026 THE FOLLOWING ATTACHMENTS ARE INCORPORATED HEREIN:
0027
0028 THE AEROSPACE/RETCEN GENERAL TERMS AGREEMENT &
0029 GPI DATED 11 JUNE 2008
0030
0031 C123 ADDITIONAL SPECIAL REVISIONS (MODIFIED)
0032 AND WARRANTY TIMEFRAME MOD
0033
0034 SELLER MUST PROVIDE A LEGIBLE PACKING SLIP LOCATED
0035 IN A CONSPICUOUS AND EASILY ACCESSIBLE PLACE ON
0036 THE INSIDE OF THE SHIPPING CONTAINER OR UNITARY
0037 LOAD. ADDITIONALLY, ALL ASSOCIATED PAPERWORK
0038 (I.E., CERTIFICATIONS, TEST REPORTS, ETC., MUST BE
0039 ATTACHED TO THE PACKING SLIP.

FROM FIG. 13F

EFFECTIVE SYSTEM AND METHOD FOR VISUAL DOCUMENT COMPARISON USING LOCALIZED TWO-DIMENSIONAL VISUAL FINGERPRINTS

BACKGROUND

The present application is directed to the imaging arts and more particularly to document comparison and the display of documents being compared.

Issues that exist in the area of document comparison are related to the detection and highlighting of changes in layout and content between documents being compared, and the display of the compared documents in a useful manner.

INCORPORATION BY REFERENCE

U.S. patent application Ser. No. 12/147,624, Filed Jun. 27, 2008: Method And System for Finding A Document Image In A Document Collection Using Localized Two-Dimensional Visual Fingerprints, Kletter, Saund, Janssen, Atkinson, herein incorporated by reference in its entirety.

U.S. patent application Ser. No. 12/147,867, Filed Jun. 27, 2008: System And Method For Finding Stable Keypoints In A Picture Image Using Localized Scale Space Properties, by Kletter, herein incorporated by reference in its entirety.

U.S. patent application Ser. No. 12/163,186, Filed Jun. 27, 2008: System And Method For Finding A Picture Image In An Image Collection Using Localized Two-Dimensional Visual Fingerprints, by Kletter, herein incorporated by reference in its entirety.

U.S. patent application Ser. No. 12/701,159: FINE-GRAINED VISUAL DOCUMENT FINGERPRINTING FOR ACCURATE DOCUMENT COMPARISON AND RETRIEVAL, by Kletter.

BRIEF DESCRIPTION

A method and system detects and highlights changes in documents and displays those documents in a side-by-side aligned view. Aspects of a source document and a revised document are detected and compared. Similarities and/or differences between the source document and the revised document are identified and visual identifiers are introduced to maintain consistent and accurate alignment between content in the source document and content in the revised document. A merged single file is output containing the aligned side-by-side view of the source document and the revised document, with all differences between the source document and the revised document visually identified.

BRIEF DESCRIPTION OF THE DRAWINGS

FIGS. 1A-1C is an example of a first page of a source PDF document;

FIGS. 2A-2C is an example of a first page of a revised PDF document;

FIGS. 3A-3E is an example of the output PDF file from the proposed method of this invention;

FIGS. 6A-6E are side-by-side page views of the output PDF file in accordance with this invention;

FIGS. 7A-7E show elements of the output PDF file in accordance with the proposed method of this invention;

FIGS. 8A-8G are examples of a roll over zone in the output PDF file of the proposed method of this invention;

FIGS. 9A-9D are examples of a second page of a source PDF document;

FIGS. 10A-10D are examples of a second page of a revised PDF document;

FIGS. 11A-11G are examples of a source page alignment in an output PDF file of the proposed method of this invention;

FIG. 13A-13G is an example of line clause numbers in the output PDF file of the proposed method of this invention.

DETAILED DESCRIPTION

Figure 3A:
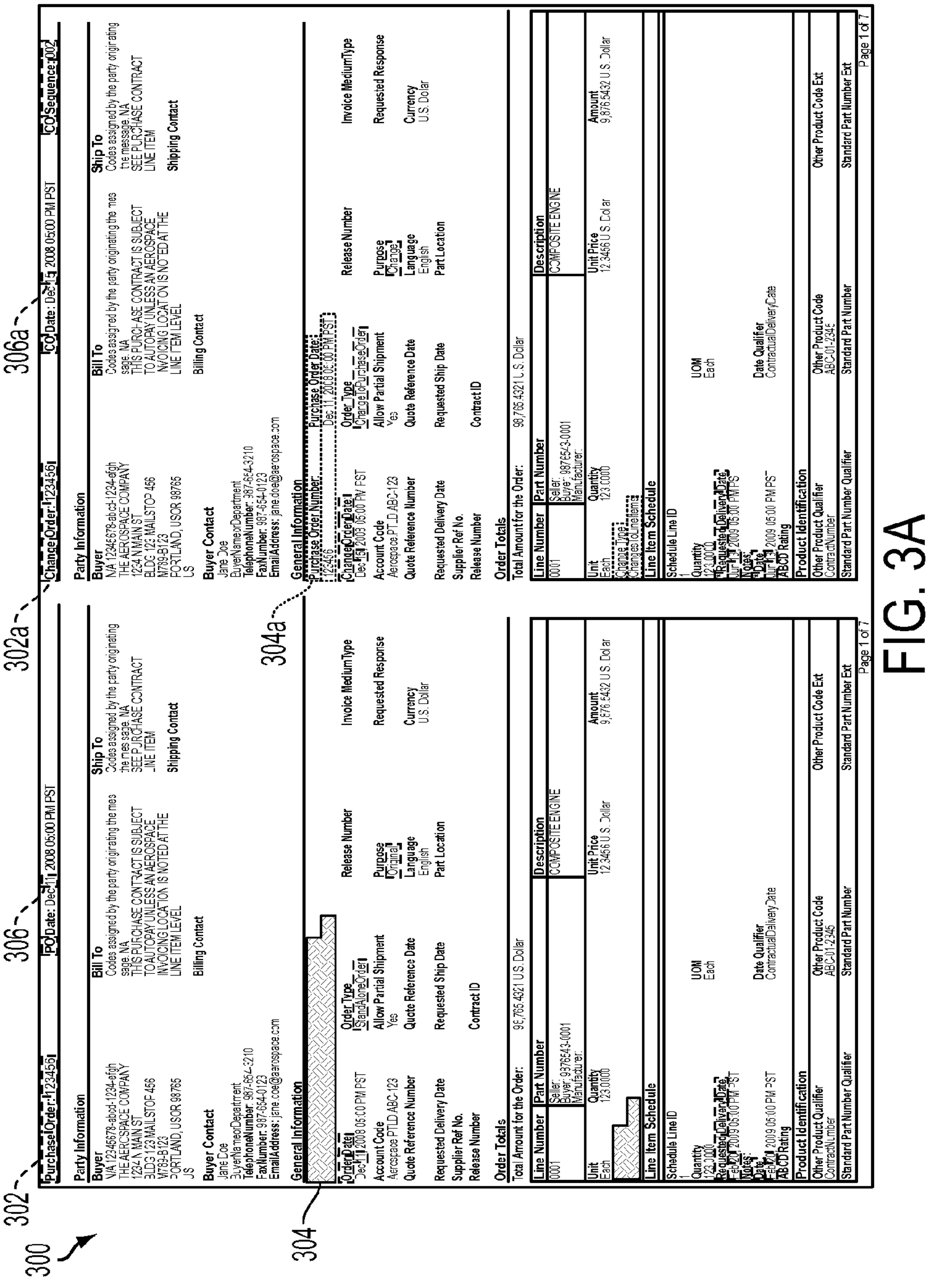

The following discussion focuses on comparing documents which have been rendered in a format known as Portable Document Format (PDF). However, it is noted the present application provides solutions that can be used with other formats, such as but not limited to Microsoft XML Paper Specification (XPS). Any document format can be saved as PDF using the Adobe print driver. Likewise, any Microsoft Office document can be saved in either PDF or XPS format by downloading an add-on plug-in from Microsoft.

There are a number of existing solutions to the problem of comparing two rendered images, one being a source image and the other being a revised version of the source image. Existing solutions are generally directed to documents in PDF. Examples include utilities such as Compare PDF by AKS Labs, Diff PDF by AJC Software, Acrobat Professional from Adobe Systems Inc., as well as Work Share Professional from Work Share Inc.

Many of the available low-cost PDF compare programs work by extracting the text content out of the PDF files and performing a line-by-line text comparison. Simple compare programs are, however, unable to cope with the complexity of arbitrary PDF layout and content fragmentation caused by the internal PDF drawing order. In many cases the programs attempt to compare the fragmented content directly, and this can invariably lead to problems. The programs have trouble differentiating text that is not visible on the page (e.g., painted in invisible foreground color or hidden behind other objects). Such systems also result in a great deal of ambiguity with text based comparison, especially for documents such as contracts that contain many repeating phrases in formal or semi-formal languages.

Further, some of the low-cost solutions have trouble with PDF content revisions. For example, when a change is made to a particular PDF content, it may not necessarily overwrite the original file content. PDF comes with a built-in mechanism for supporting changes and revisions. Changes can be conveniently captured at a later section of the file instead of having to be directly incorporated into the existing PDF structure. Therefore, programs that simply extract the text out of the PDF often do not work properly if they attempt to compare any extractable text.

Also, only few of the existing solutions even attempt to provide an accurate visual display of the changes. Some of the simple programs merely provide a text list output of the changes. The text list is often sequential, on paragraph basis, and does not resemble the visual layout of the page.

A few of the more advanced high-end PDF compare programs do apparently produce a visual comparison of some sort. However, an objective of those programs is aimed at showing the change history perspective rather than attempting to produce a visually accurate side-by-side page comparison view. Adobe Acrobat Professional, for example, can circle the differences on a page, but the data is not aligned between the source and revised documents (e.g., files).

Programs such as Work Share Professional take an approach that is similar to the track changes feature in Microsoft Word and other high-end word processing programs. The idea in these systems is to illustrate the changes that occurred between the two different versions. However, track changes are shown as sequences of crossed-out and revised text that change the appearance and layout of the page. By turning the track changes feature on or off, the user can choose to see either a visually accurate page display (i.e., no edits), or see the edits in non-visually accurate display—but not both at the same time. When the edits are shown, the visual display is no longer accurate with respect to the original document layout. The common track changes display is a single file view with incorporated changes from the other file. Furthermore, the track changes feature only works reliably when the change history is fully documented or in simple cases when it can be accurately reconstructed. The accurate track changes history is usually captured by the original application in a proprietary form, and is not available in PDF. In addition, for track changes to succeed, complete and strict cooperation is required by all users making changes, which is difficult to enforce.

Further, no document comparison system found produced a detailed, visually accurate, side-by-side comparison of the documents, in a single PDF file (for accurate viewing with a single zoom/navigation control), maintaining the two document files in perfect alignment at all times.

The overall problem is deceptively simple: compare two given documents, detect and highlight any changes in content or layout placement, and visually make the changes stand out in an effective, intuitive, and easy to see manner.

The two documents to be compared are typically related in some way. They may be different versions of a document, or a later amendment in time. In this application they are referred to as a source document and a revised document. The two documents can be created by different entities, using different applications, and may not include any reliable visual cues or other information (such as track change history, highlight color, yellow background, etc.) that could be used to accurately pinpoint where changes are made.

PDF is an open industry standard for document exchange and archival, which is independent of the application software, hardware, and operating system. Virtually any file type can be converted to PDF, and PDF files are easy to view, print, and share on any platform. Each PDF file encapsulates the complete description and layout of the document including text, fonts, images and two-dimensional vector graphics that compose the document. However, in normal practice, the PDF version of the document does not retain the high-level semantic content of an original document file or its change edit history. It merely serves to capture the drawing commands necessary to faithfully reproduce the pages of the document. The PDF content is often internally re-organized for optimized viewing performance and efficient resource handling such as fonts, and the resulting drawing order may be different than the logical reading order. In consequence, the PDF content is usually fragmented, potentially re-arranged in a different order, and therefore not readily amenable for simple comparison between files.

The need to visually compare documents and identify layout and content changes is widespread and universal. Consider the case of business contracts and amendments, for example. The documents to be compared may contain time critical information such as delivery items, quantity and/or schedule changes. Without effective means for automatically highlighting the changes, companies rely on having teams of dedicated specialists to manually review and compare revised contracts and amendments, looking for changes. The task of manually comparing documents is tedious, time consuming, and prone to error. A high level of concentration and cognitive attention to small detail is required. Even an experienced specialist quickly tires of repeatedly and continuously manually visually scanning and comparing bits and pieces of content for many hours per day. A failure to recognize a critical change or identify an opportunity in a timely manner could result in a potential business risk to the company.

The present method and system provides an automated way for detecting and highlighting changes and presenting the results in a visually effective manner that is both intuitive and easy for viewers to quickly recognize.

In one embodiment, the method includes: (1) Detection of similar visual patterns in the documents to be compared (in one embodiment using localized fine-grain two-dimensional (2D) fingerprints for such detection); (2) Identifying regions of similar patterns (in one embodiment this would be based on the consolidated fingerprint information); (3) Extracting the underlying content and applying layout analysis and content similarity scoring to associate corresponding content or lack thereof (in one embodiment, the content would be the PDF content); (4) Introducing visual elements such as alignment zones, roll over zones and page extensions, in order to maintain consistent and accurate alignment between the source and revised content; and (5) Outputting a merged file (e.g., a PDF file) containing the aligned side-by-side view of the documents content, with all the changes efficiently highlighted in place. When the content is PDF content, modified PDF operators are used to provide visual cues, such as to augment the color, draw additional color boxes around content, and apply still further additional visual cues such as hatch patterns to draw users' attention to the changes, without disturbing the overall visual layout of the page. This makes it easy for the viewer to compare side-by-side and instantly recognize the changes between the source and revised documents.

As mentioned above, a concept of the present application is to identify and display for a viewer, both any changes to a layout of documents and any specific changes to the content of the documents (e.g., text content additions, deletions and/or modifications). Therefore for purposes of understanding, in the following description various figures (i.e. FIGS. 1A, 2A, 3A, 6A, 7A, 8A, 9A, 10A, 11A and 13A) are provided to show the layout of a document. Then figures corresponding to these figures are provided in a broken out fashion to show the details of the content in those figures.

For example, FIG. 1A illustrates a layout of a first page of a source document 100 (e.g., as a PDF of a company Purchase Order) and FIG. 2A illustrates a layout of a corresponding first page of a revised version of that document 200 (e.g., as a PDF). Corresponding figures (e.g., FIGS. 1B-1C and 2B-2C) show the content of these documents in detail.

Given the two documents in FIGS. 1A and 2A, the objective is to compare the two documents, detect and highlight any changes in content or layout placement, visually make the changes stand out in an effective, intuitive, and easy to see manner, and display the documents in a side-by-side manner with all content aligned. FIGS. 3A-3E illustrates the layout and content changes in a single image 300 which is generated in accordance with operation of the comparison and display concepts of the present application. The changes shown will and are identified in a variety of different ways (see pairs, 302-302*a*, 304-304*a*, 306-306*a*, as examples) depending on the type of change. The different types of change identifiers will be explained in more detail below.

Even though the content of FIG. 1A and FIG. 2A is relatively simple and comprised of semi-structured text in a form-like layout, it is generally difficult for people to quickly manually visually scan such pages and manually point out all changes. The human brain is capable of readily picking up large differences, but when the overall page structure and layout is similar it requires a high level of visual cognitive ability and concentration to successfully recognize subtle changes. As previously mentioned, customer service representatives that receive contract changes and amendments similar to the ones shown in FIGS. 1A and 2A must comb the documents looking for changes. The manual comparison process is time consuming, tedious, and prone to error. Even an experienced customer service representative quickly gets tired after some time, and the error level rises. The consequences of missing a single change such as a quantity or delivery date change may have significant business and risk impact to the company.

As can be seen in FIG. 3A, all changes are accurately highlighted, and because the content is always aligned, it is easy for the user to compare the content of the two files in the side-by-side view and quickly recognize the changes.

An aspect of this application is the ability to instantly recognize the original page layout. When the layout is ignored and text is extracted and presented sequentially (as some of the existing methods do), the comparison task becomes much more difficult for the user to mentally associate with on page locations.

It should be pointed out that the content in FIGS. 1A and 2A starts out in relative alignment for the first page of each file. However, as more changes such as additions and deletions are introduced during subsequent pages, the following original and revised pages are likely to grow further out of alignment with respect to each other. Eventually, the user will no longer be able to rely on having the same page numbers for the comparison. He or she would need to manually keep track of the content in each document in order to maintain the intra-document alignment for convenient viewing. With the plurality of ongoing changes (deletion and insertions, etc) on a given page, different parts of the page may each be in a different alignment relative to their corresponding original page counterparts.

The alignment problem makes it particularly difficult to perform the comparison electronically on a computer screen that can only display one page (or less) at a time, especially for large multi-page documents. Without the concepts of the present application, a user trying to compare documents would have to continuously scroll back and forth between pages, in order to align the content for convenient side-by-side viewing. Furthermore, it is generally difficult to view two documents side by side on a single computer screen and still be able to read the small point text in less than full size resolution. Thus the user may additionally need to continuously zoom in and out to see the content, and it is time consuming to separately navigate in two independently zoomed files. Ideally, the user would greatly benefit if the two files to be compared are linked together for convenient viewing, but this is impossible to do for independent files on existing computer platforms. Instead, users not using the concepts of the present application often prefer to print the entire documents and manually try to arrange the hardcopy pages for a form of side-by-side viewing. But even this will not always result in exact side-by-side matching of the content of the documents, if during the editing lines of text have been added or removed in the revised document. On the other hand, the present method and system provides an effective and natural way to address the above issues and eliminate the need for wasteful paper printing and tedious manual comparison by hand.

Figure 4:
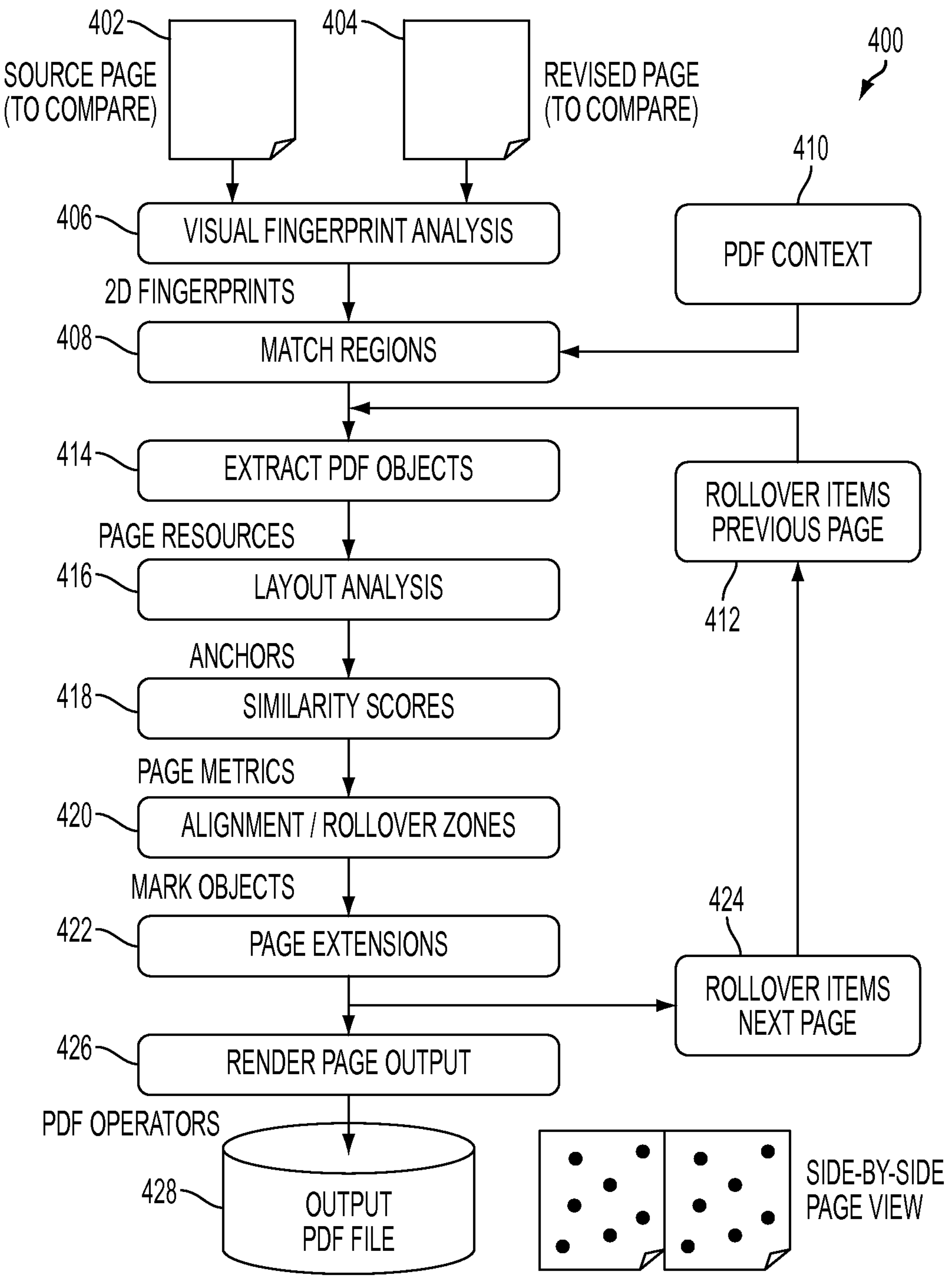
FIG. 4 is a flow diagram showing the steps for highlighting and displaying documents according to the present application.

A flow diagram of the present document comparison, highlighting and display method and system 400 is shown in FIG. 4. The following is in one embodiment, accomplished by use of an appropriately configured electronic processor. In operation, the input pages of the documents to be compared are processed sequentially, one page at a time. In this particular embodiment, 2D fine-grain visual fingerprints were used to identify similar patterns. The 2D fine-grain visual fingerprints bear similarity to the fingerprint concepts of the inventor previously mentioned in various ones of the documents incorporated herein by reference. However, the 2D fine-grain visual fingerprints are designed to take advantage of noise-free electronic input rather than noisy camera input, as for example taught in the incorporated by reference application, U.S. patent application Ser. No. 12/701,159: FINE-GRAINED VISUAL DOCUMENT FINGERPRINTING FOR ACCURATE DOCUMENT COMPARISON AND RETRIEVAL, by Kletter.

In method 400, the 2D fine-grain visual fingerprints are independently extracted for each page of the source document 402 and revised 404 documents. Visual Fingerprint Analysis 406 is applied to identify corresponding combinations of matching fingerprint patterns between the two pages. The fingerprint scores are used to select from among the strongest most likely combinations.

The locations of matching patterns are clustered and aggregated by the Visual Fingerprint Analysis 406 to produce a list of corresponding matching regions 408 between the source and revised pages. For from-like pages that contain primarily 2D text layout, rectangular regions are used to define the matching regions. Although other region definitions may be used.

It is worth noting that the use of 2D visual fingerprints is just one manner of obtaining the comparison data, and the presently proposed method and system is equally valid and effective with other means of obtaining a corresponding regions of matching similarity (e.g., matching regions) 408. For example, other techniques such as text or shape object matching, such as which could be obtained by use of optical character recognition (OCR) technology, can be applied instead of or in conjunction with visual fingerprinting.

Next, additional PDF context 410 from the previous and subsequent pages can be provided to facilitate the matching of regions that might have ran across page boundaries.

For example, in one embodiment, the method and system of this application obtains high quality output by manipulating the PDF operators to highlight the changes in color and by drawing color boxes and other objects around modified content. The PDF objects are extracted 414 for the current page under comparison, including necessary PDF resources such as fonts and other shared resources.

If there is any rollover content from the bottom of the previous page 412, the rollover content is merged at the top of the current page, and added to the list of extracted PDF objects 414 for the current page.

Next, a two-pass layout analysis 416 is applied to the extracted PDF page objects. The layout analysis is guided by the match region 408 output. Each matching PDF object from the revised pages is paired with a corresponding PDF object on the source document page, and the relative positioning are noted. In the first pass unique patterns that appear only once in the page are sought. These patterns are called anchors (or pattern anchors). They provide unique identification of the source to revised document mapping. The requirement for first pass pattern anchors is that they are not allowed to differ in content, only in their relative location. Once the pattern anchor positions have been determined, a second pass layout analysis determines the pairing of additional objects based on the given pattern anchor positions. A rule based system is applied for non-pattern anchor items.

It is noted that in this system and method the search of possible matching objects is confined to the match region area. Since the number of possible combinations grows exponentially with the number of objects, a full search would be time consuming and therefore this confined search area improves the operational speed of the system and method.

Next, a similarity scoring method 418 is applied to the remaining yet unmatched objects to identify possible changes in content. The scoring function uses the layout as well as content. It uses a set of rules to determine the likely changes in conjunction with the page layout metrics. When there is a large degree of similarity, the scoring function causes the changes to be highlighted in place such as the highlighted text 306-306*a* in FIG. 3A. The scoring function determines how to render the changes. For short single line changes, the in place method is preferable. However, for a multiline area with a low overall level of similarity, it is preferable to show the source lines as a deleted group, followed by the revised lines as an added group, instead of showing a single group of largely unrelated lines, all heavily highlighted in red. The use of the scoring function in this manner contributes to the intuitive look and readability of the output.

After layout and scoring analysis, the alignment and rollover analysis 420 determines the relative alignment of zones on the output page based on the collective information of pair wise matching objects within a zone. Any remaining unmatched PDF objects are marked and assigned to an existing or a new zone depending on the behavior of objects in the immediate neighborhood and zone type. The alignment and rollover analysis investigates the unmapped zones in the source and revised page and determines when an alignment zone should be introduced in order to maintain the alignment between the source and revised content. There are two types of alignment zones: (1) a source alignment zone that is caused by source content that has been deleted; and (2), a revised alignment zone that is caused by additional added content in the revised document not present in the source document. Each zone type leads to an opposite effect, where a source alignment zone leads to a positive displacement of the revised content, while a revised alignment zone leads to a positive displacement of source content. Different colors or other identifiers are used to highlight the different alignment zone types. A viewer quickly learns to recognize the color/identifier and anticipate the corresponding alignment behavior (lines deleted or added, etc.) relative to the original files.

Finally, the alignment and rollover analysis 420 also examines the locations and quantity of objects on the bottom of the page to determine when a rollover zone is to be inserted on the top of the following page. The actual rollover content is determined during the page extension step 422 by rolling over any items that fall below the visible bottom page boundary.

The page extensions module 422 inserts one or more page extensions in order to accommodate any overflow from large source content deletions. As indicated above, the use of page extensions eliminates the need to scale down the revised content in order to make it fit within a single visible page. A scaled down image of small point text becomes difficult to read. Instead, page extensions are used to maintain a constant 1:1 scaling ratio between the source and revised content at all times, and the content is always just as readable and closely resembles the original page layout.

The page extensions module 422 redirects any content below the visible bottom of the current page or last page extension to the next page rollover holding buffer 424. Upon completion of the current page processing, the rollover items are transferred from the holding buffer 424 to the next page rollover items 412 during the subsequent page cycle.

Finally, the render output page module/process 426 consolidates the aligned and highlighted PDF objects to appear side by side on a single output page. The PDF objects are written out to file 428, one page at a time, together with all the associated page resources such as embedded fonts etc. The final output PDF file contains the aligned side-by-side view with all changes accurately highlighted as seen in FIG. 3A. The content of this output file will then be displayed by a display device, such as an electronic display of a computer or other type system, printed, and/or shared with other users by means of e-mail or shared folder, drive, or a document repository.

Figure 5:
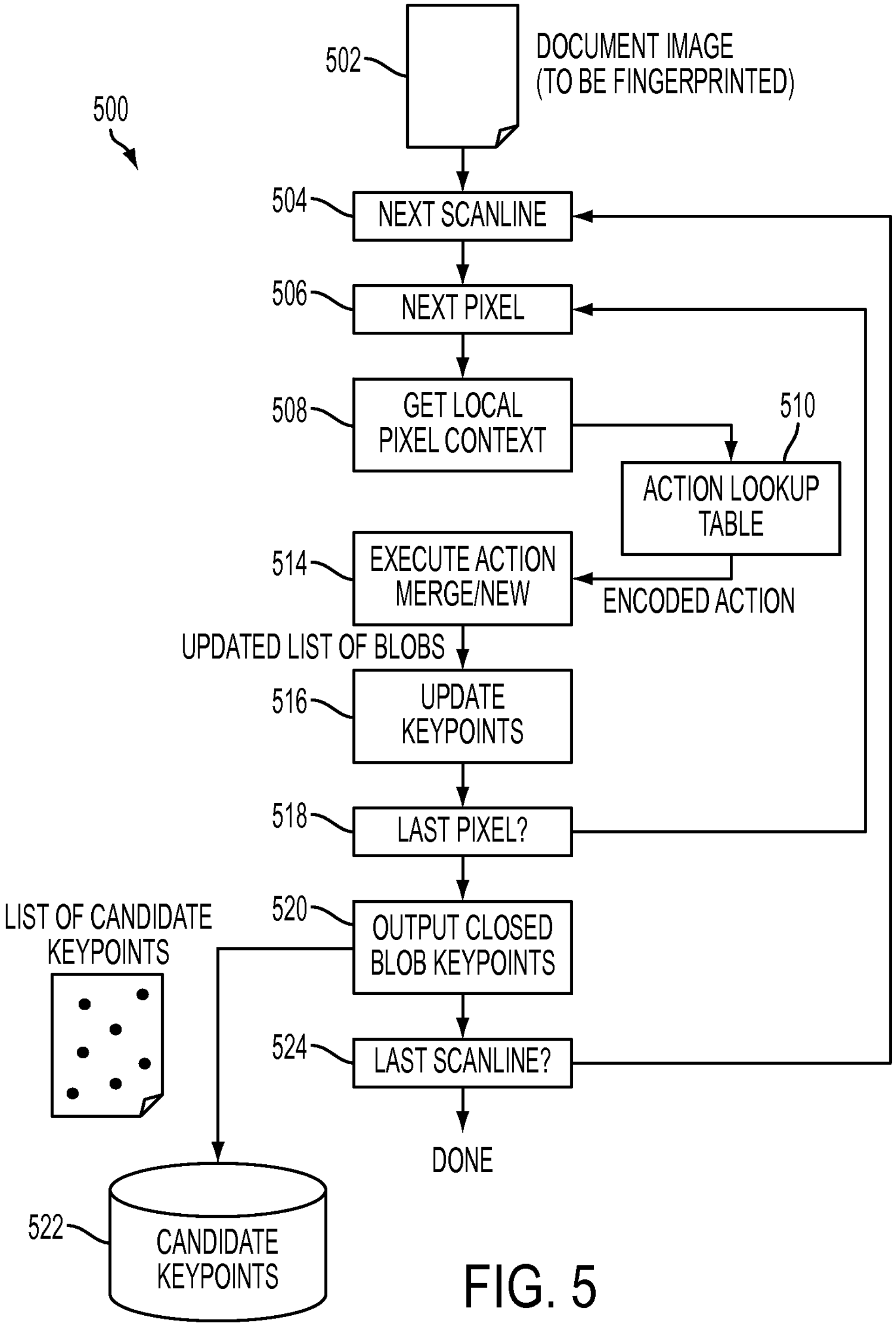
FIG. 5 is a flow diagram describing generation of 2D fine-grain fingerprints.
Figure 6A:
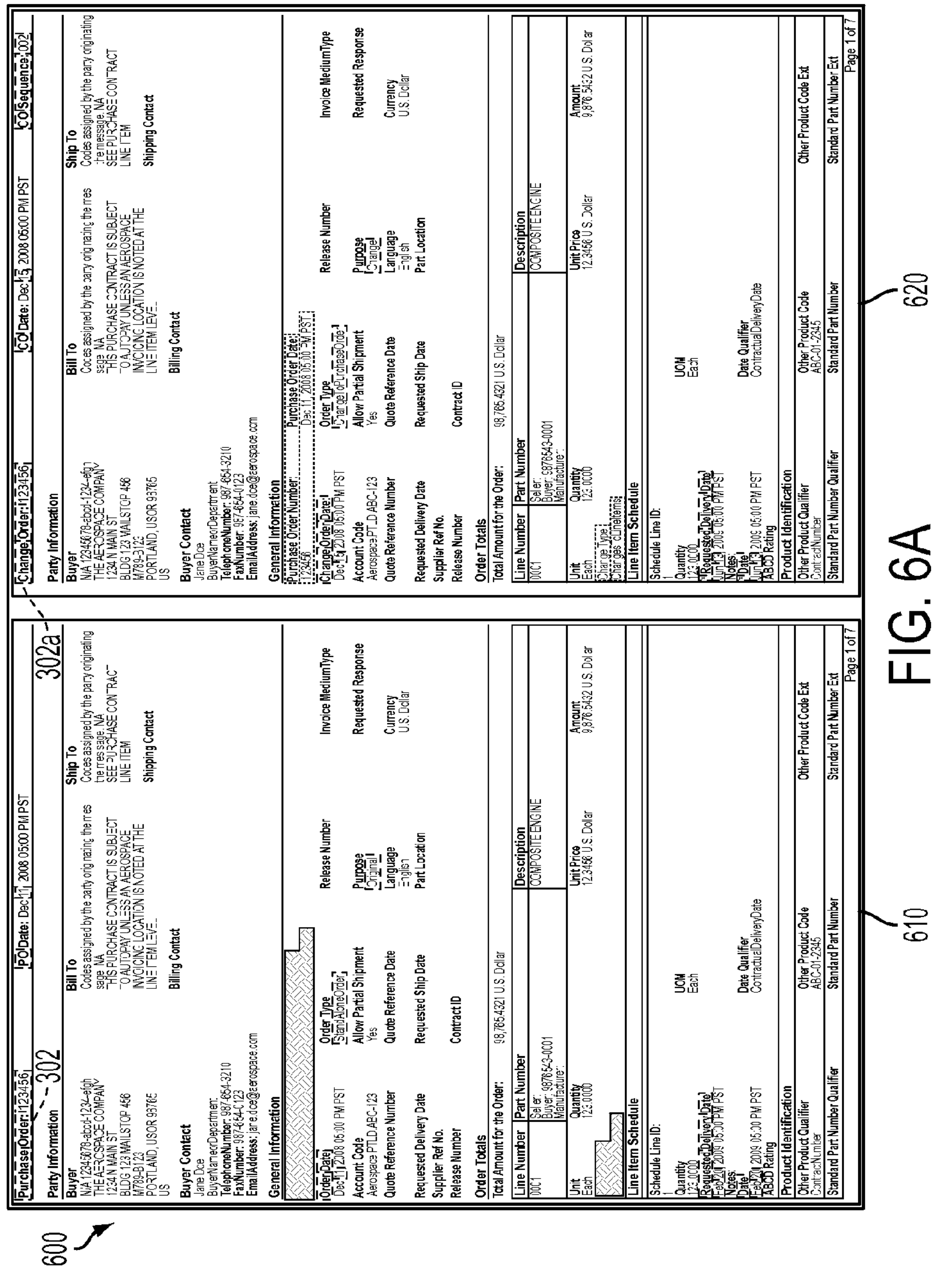
Figure 7A:
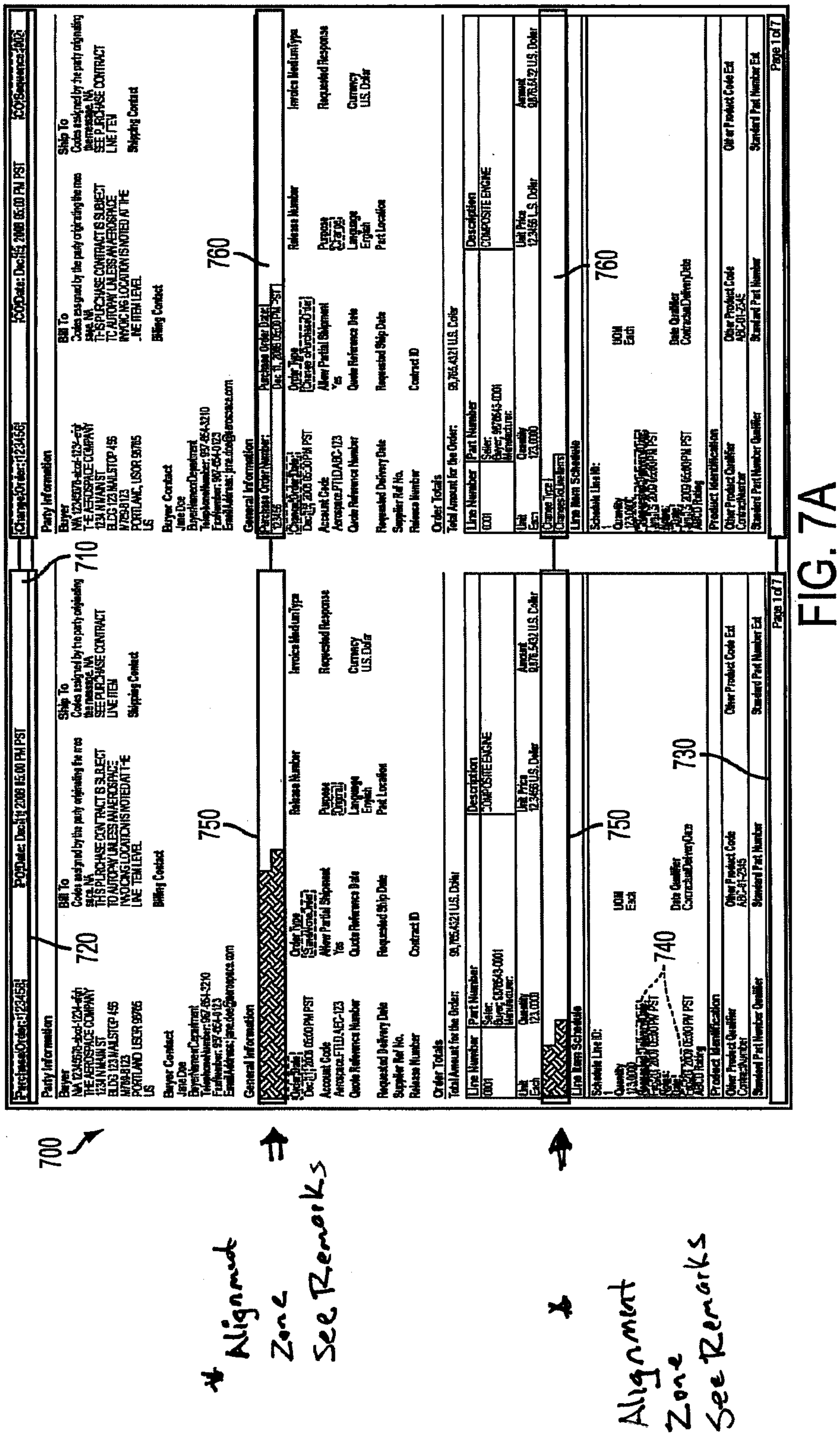
Figure 8A:
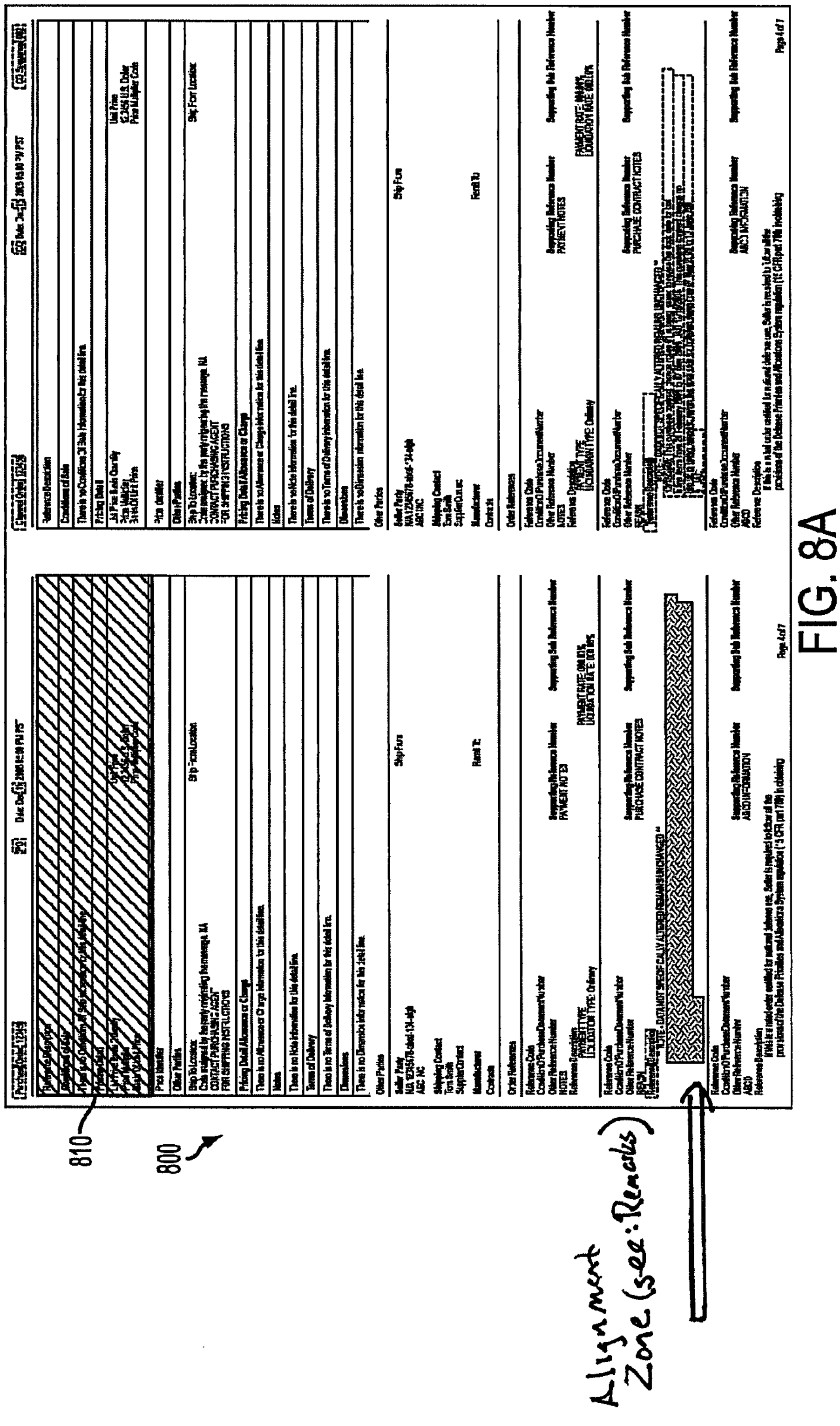
Figure 8F:
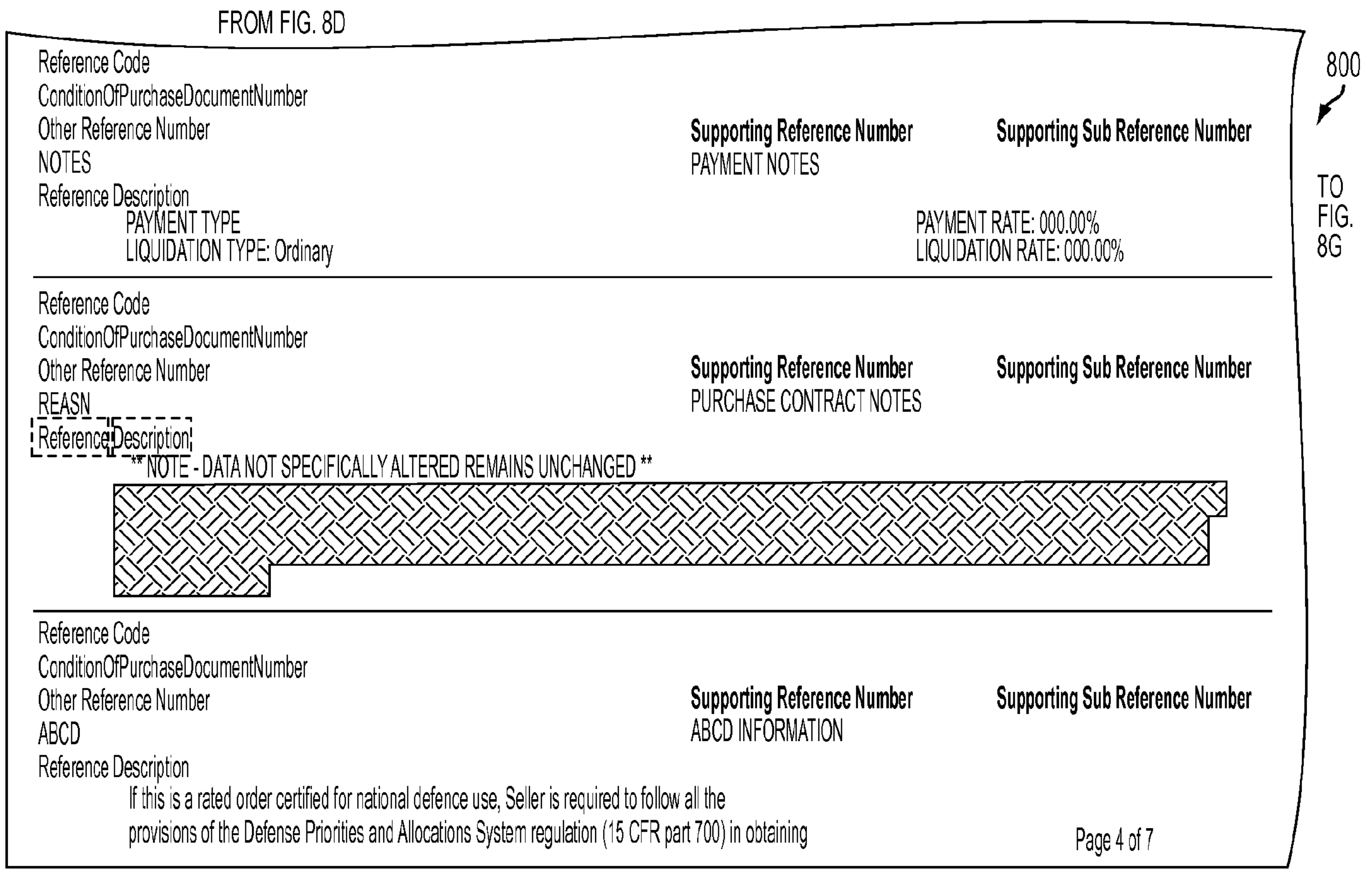

With more detailed attention to the use of 2D fine-grain fingerprints, FIG. 5 illustrates a fine-grain fingerprint generation method 500 which identifies blobs and candidate keypoints, for use in generating fine-grain fingerprints of a document image. In this application keypoints are understood to be identifiers of distinctive locations in the image such as corners, junctions, and\or light or dark blobs, where blobs include groups of pixels of an image being investigated, and candidate keypoints are understood to be associated with locations of distinctly identifiable visual patterns of content of the document in corresponding partial local pixel neighborhoods of blobs. The final set of candidate keypoints are selected from among a set of keypoints identified and iteratively merged and refined during blob processing.

The method 500 progresses down a supplied document page 502 in regular raster scan order, one scanline 504 at a time. For each scanline, the image pixels are examined sequentially, one pixel 506 at a time. At each current pixel location, method 500 determines if the current pixel is a member of a new or previously existing blob, and in addition, if the current pixel location is to be considered as a candidate keypoint for fingerprinting.

In one embodiment this method is a fast single-pass algorithm. The method 500 utilizes a small neighborhood of pixels 508 around a current pixel of interest to iteratively build up blob structures and keypoints for the entire page. The algorithm has low memory requirements in that it only uses one previous scanline of the image, and the computational load is minimized by pre-encoding and storing in advance all the possible blob processing actions in an action lookup table 510.

For each current pixel location, pixel neighborhood context 508 is gathered and assembled together to form an address of the action lookup table 510. The content of the action table at this address defines the action that is to be applied at the current pixel location, based on the configuration of neighboring pixel values and the previous blob assignments. The appropriate action is identified and fetched out from among actions stored in the action lookup table 510.

Although there could be many combinations of input pixel values and previous blob assignments, the number of possible resulting actions is rather limited in practice. Examples of typical actions include such items as: (1) assign a new blob to the current pixel; (2) merge the current pixel with an existing previous blob, which may be in one of the following locations: on the left, top-left, top, or top-right of the current pixel; (3) combine two existing blobs together and merge the current pixel into the combined blob; and so on. The small number of possible actions is conveniently stored in the action table for fast and efficient lookup.

The appropriate action for the current pixel of interest (based on the generated address) fetched from the action table is then executed 514. As a consequence, the current pixel content may be added to an existing blob, or a new blob may be allocated for the current pixel of interest, or two previous blobs may be merged together, etc. Each blob is represented by a data structure in a system memory that is being manipulated. In addition, a separate blob ID image is created and updated by the execution 514, one pixel at a time. The final dimensions of the blob ID image are the same as in the original document image. Each pixel value of the blob ID image represents a current blob ID assignment for this pixel location.

After the action is executed 514 and the blob(s) status is updated in a system memory to reflect the current pixel state, a keypoint update operation 516 determines if the current pixel location is a candidate keypoint. Keypoints are initially allocated upon the discovery of a new, previously unseen blob. In one embodiment of the present application two opposing types of keypoints are used: (1) Type-1 keypoint that seeks to advance in the top-left direction; and (2) Type-2 keypoint that seeks to advance in the bottom-right direction. For each current pixel location, the position of an existing keypoint may be: (a) updated relative to a previous position; (b) a new keypoint may be assigned; or (c), an existing keypoint may be removed based on predefined conditions. For example, if the conditions are appropriate, the position of a Type-2 keypoint on the previous pixel of the current scanline may be updated to the current pixel position, or a new keypoint may be introduced at the converging intersection of two existing blobs.

The scanline processing continues in this manner, one pixel at a time, until the entire scanline has been processed and the last pixel 518 in a scanline has been encountered. At this point, a closed blob process 520 is launched to determine if any of the currently open blobs can be closed. A blob can be closed if no new pixels have been added to the blob during the current scanline operation, since there is at least one line of discontinuity between the blob and any other blob on a following scanline. All blobs that can be closed are processed to compute various attributes, and their resulting data and keypoints are outputted to a candidate keypoint file 522. The memory consumed by the blobs that have been closed by this operation is freed-up, and the closed blob ID's are recycled for subsequent reuse. A particular aspect of the described embodiment is the ability to process thousands of blobs on a document page in a small memory footprint by maintaining a small list of open blobs and eliminating, on-the-fly, any blobs that can be closed. The forgoing operations identify a set of keypoint candidates in a local image neighborhood, the locations of which are combined in a specific manner to form distinct 2D fine-grain fingerprints.

The scanline process 524 continues one scanline at a time, until finally the last scanline has been processed (DONE).

Turning to FIGS. 6A-6E illustrated is the side-by-side aspect of the displayed documents 600. For each page, the output PDF page dimensions are programmed to accommodate the two input files (of the compared and highlighted documents) side by side, with a slight gap in between. For each page, source input content 610 of the source document is consistently shown on one side, while revised input content 620 of the revised document is consistently shown on the other side. Matching content of the source and revised documents are placed in alignment relative to each other in the vertical direction, such that they appear to be aligned side-by-side.

FIGS. 7A-7E illustrates additional elements of the displayed material. The side-by-side page 700 may include fixed elements such as a page header 710, header line 720, and footer 730. These are stationary elements whose relative position on the page remains unchanged when content is aligned. If the page header content 710 exists, it is compared with the revised page header content, and any changes are highlighted. The page may or may not include an additional header line 720. The page may also include footer content 730 on the bottom of the page. If the page footer content 730 such as containing the page number or any other information exists, it is compared with the revised page footer content, and any changes are highlighted.

FIGS. 7A-7E also illustrates the method of highlighting content changes. Highlighted text 740 is painted in high-key color (usually red) to make it stand out relative to regular non-highlighted content. Text words are highlighted when there is any content or layout difference between the source and revised documents. Identical words or text fragments in both content and layout (same location, font, size, etc.) are not highlighted. This draws the viewer's attention to the actual difference (e.g., a date or quantity change, for example) rather than having the entire text line highlighted in red. An additional color box (in red) is added around the highlighted text. The purpose of the color box is to draw visual attention to the change. Without the color box, it may be difficult to notice a single character change even if the character is painted in high-key color.

Additionally, FIGS. 7A-7E also illustrates two revised alignment zones 750 of the first type. The alignment zones represent additional revised document content that is not present in the source document. The text 760 added in the revised document, that corresponds to the alignment zones 750 in the source document 770 is highlighted (e.g., in pink) on the revised document side, and an additional color box (e.g., in pink) is placed around the text 760. The purpose of the color box is to draw visual attention to the change. Without the color box, it may be difficult to notice a single character change even if the character is painted in a different color. A third visual cue is provided by a low-key color hatch pattern in the alignment zones 750 that serves to indicate the presence of an alignment zone on the source side, while reminding the user to anticipate content to be shifted down to compensate for the additional content that has been added to the revised document.

FIGS. 8A-8G illustrates a document page 800 with a rollover zone 810. The rollover zone is indicated on the top portion of a source document page on the left side. Rollover zones indicate content that has been carried over from the previous page into the current page. In, one embodiment light background shading (e.g., cyan, yellow, or light gray) is used to highlight rollover areas. Rollover zones mark the boundary of the original page layout. This makes it easy for the user to map the original page boundaries relative to the PDF output and keep track of the current page position relative to any printed hardcopy pages the user may have.

Figure 9B:
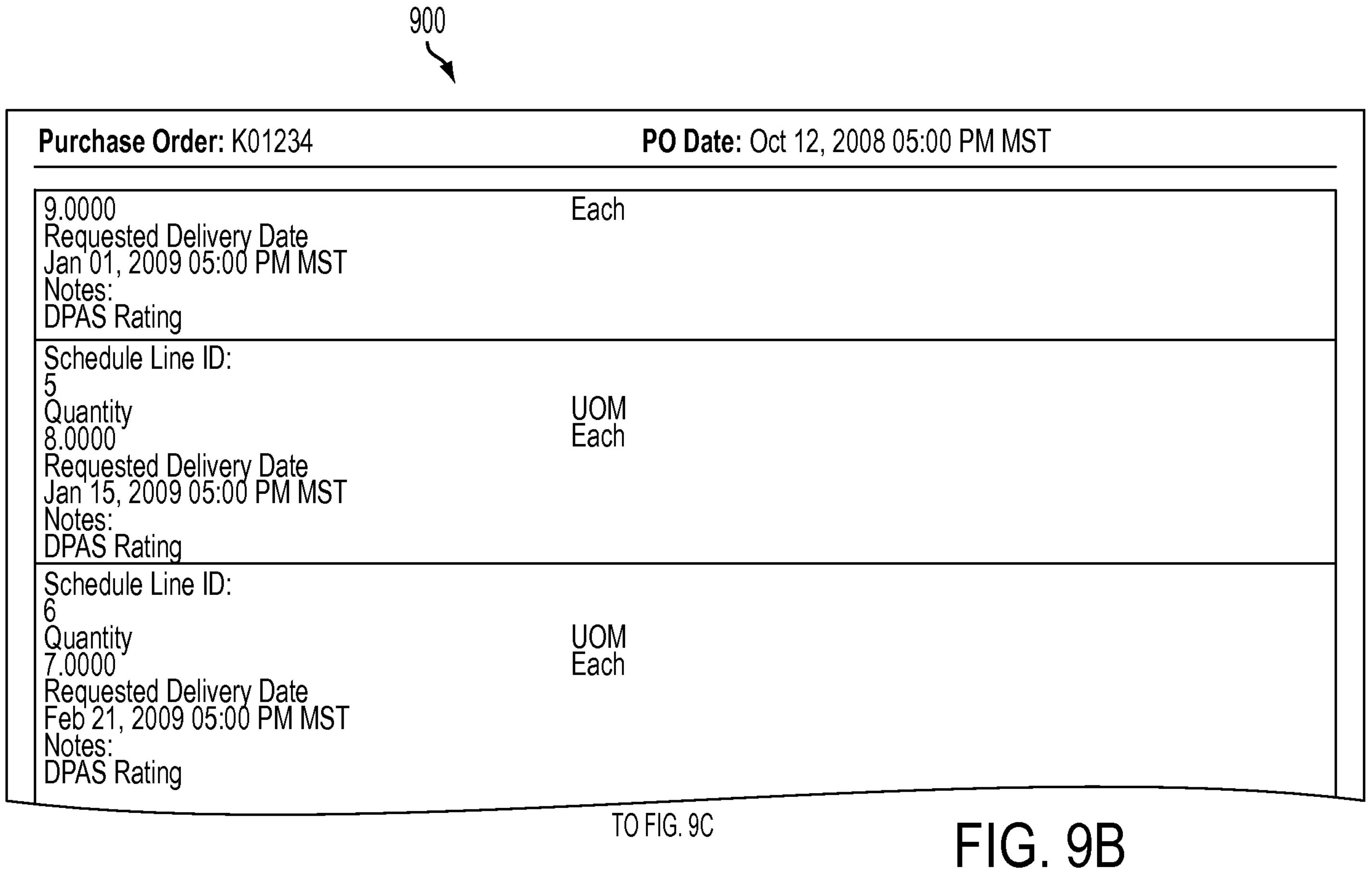
Figure 10B:
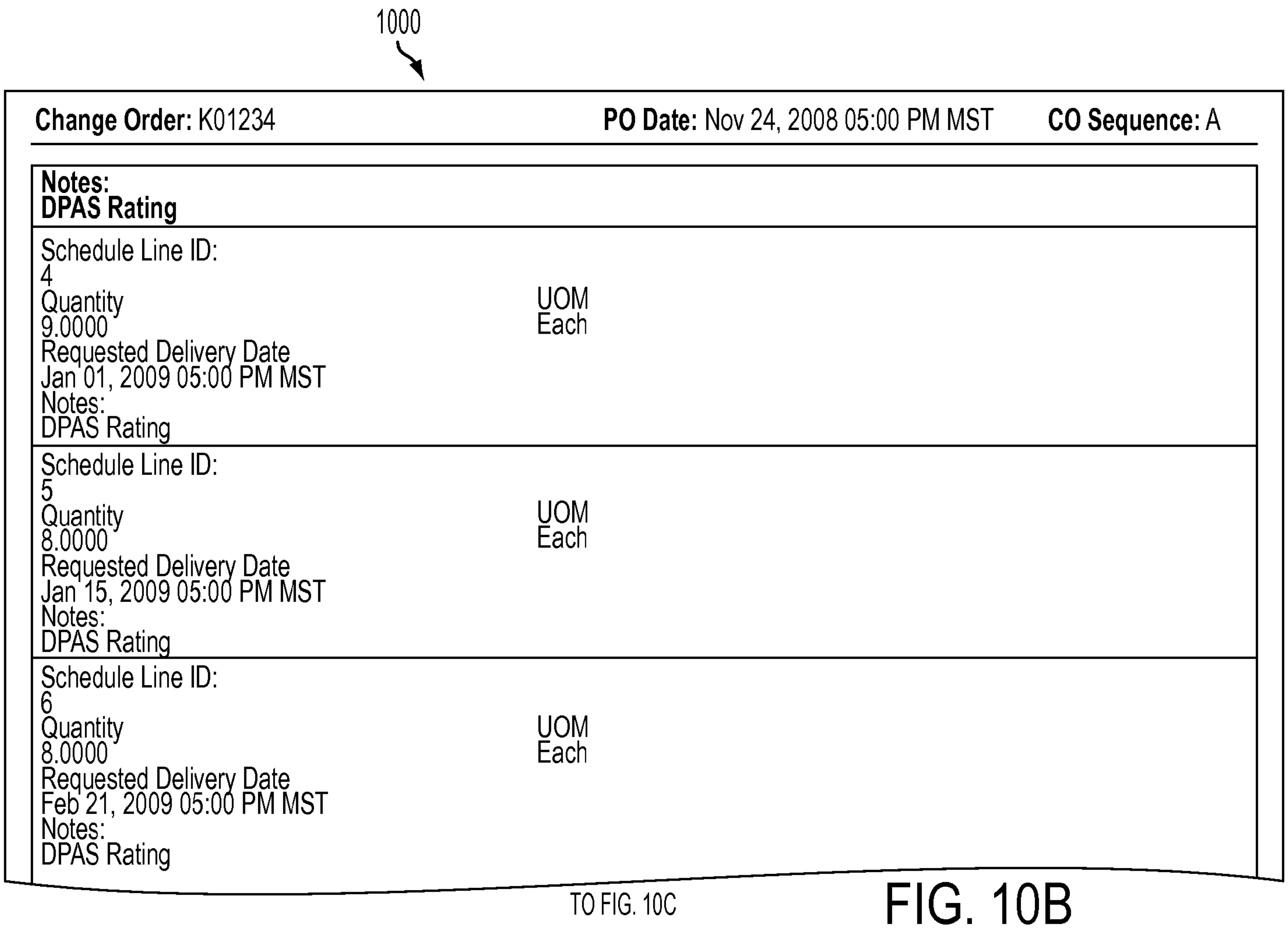
Figure 11A:
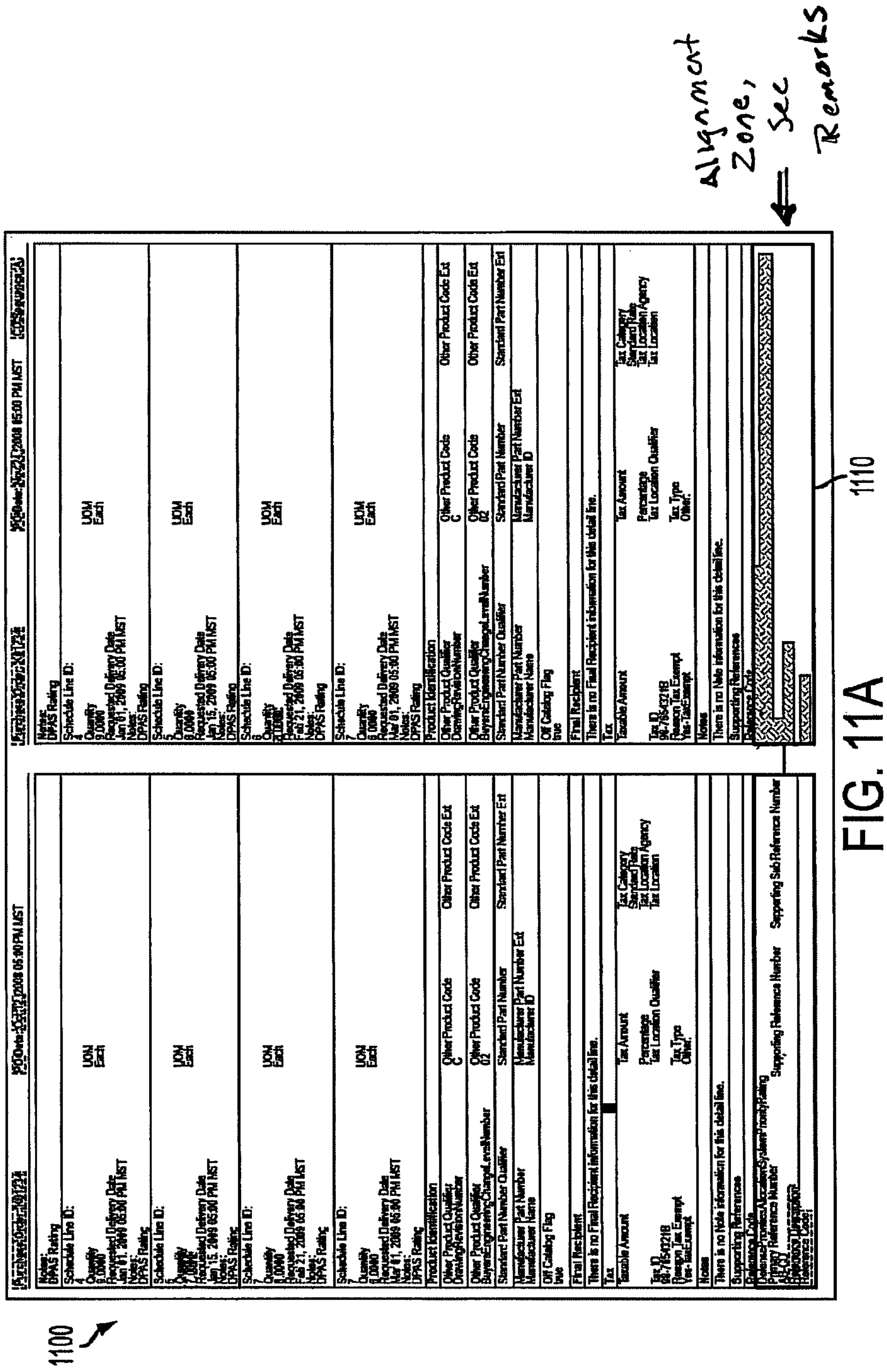
Figure 11B:
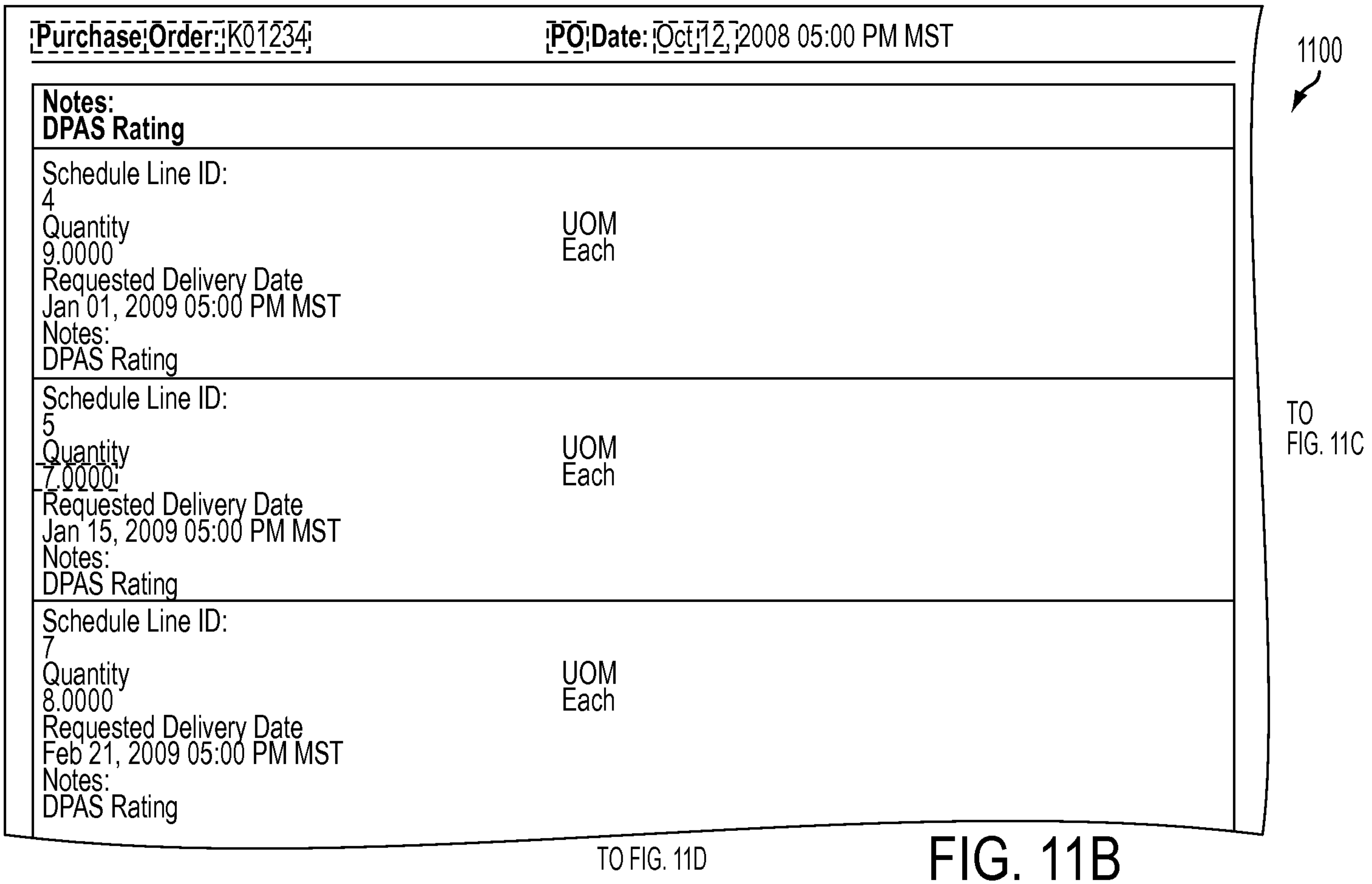
Figure 11G:
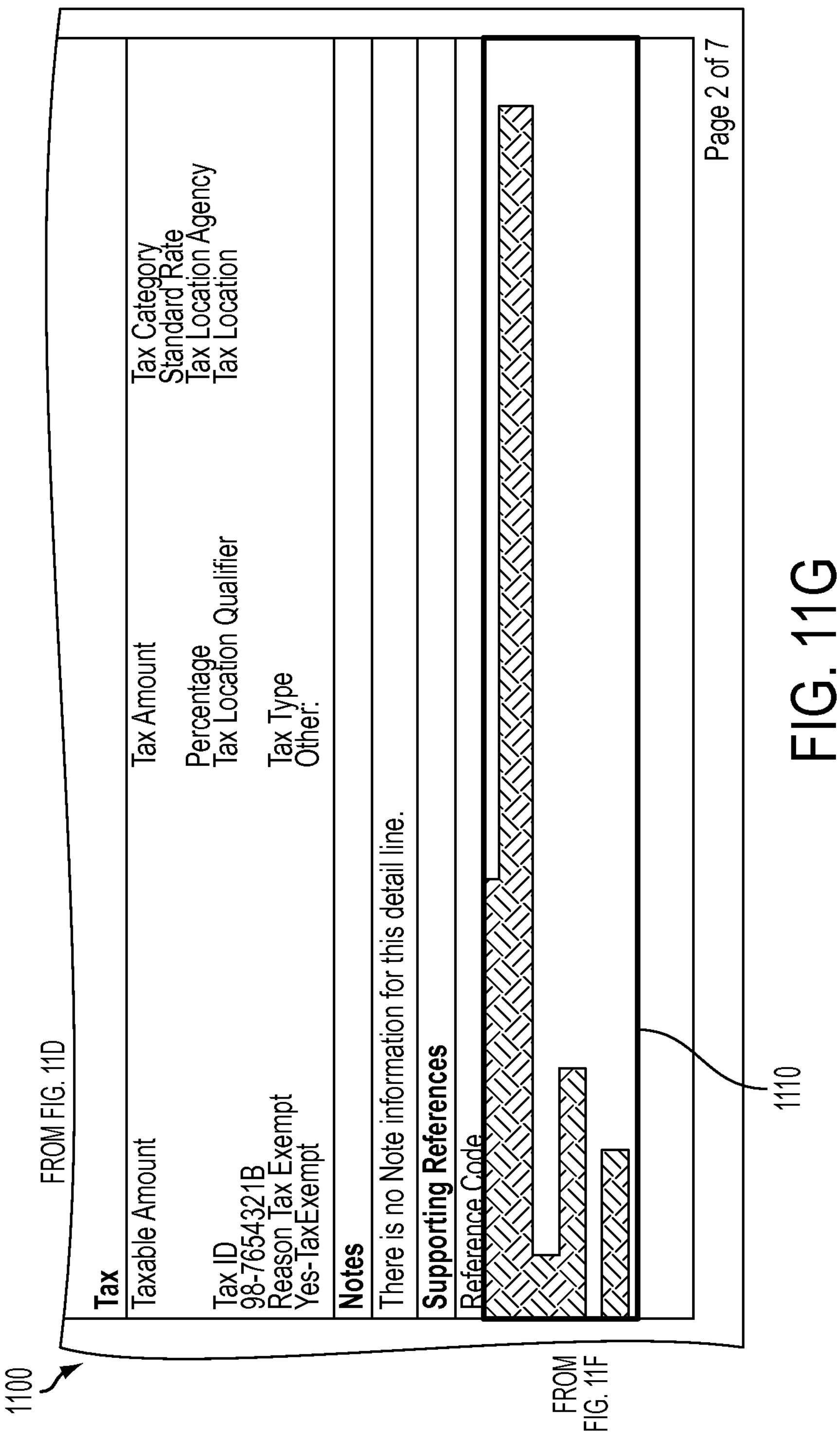

FIGS. 9A-9C illustrates an example of a first page of another source PDF document 900. FIGS. 10A-10D illustrates an example of a first page of a corresponding revised PDF document 1000. FIGS. 11A-11G illustrate an output document 1100 including a source alignment zone 1110 that is being introduced as a result of the comparison of the pages in FIGS. 9A and 10A. A source alignment zone is introduced to compensate for original source content that has been deleted and is no longer present in the revised document. In one embodiment a different high-key color (blue in this case) is used to indicate the second type of alignment zone—a source alignment zone—to differentiate it from the first type of a revised alignment zone 750/760 in FIGS. 7A-7E above. The two types of alignment zones are complementary, in that one is inserted in the revised document while the other is inserted in the source document. Other than the color and reversed sides, the highlighting scheme is identical. The alignment zones employ, in one embodiment, low-key color hatch pattern as a visual indicator to indicate the presence of a revised alignment zone, reminding the viewer to anticipate content to be shifted down to compensate for content that has been deleted from the source document.

Figure 12:
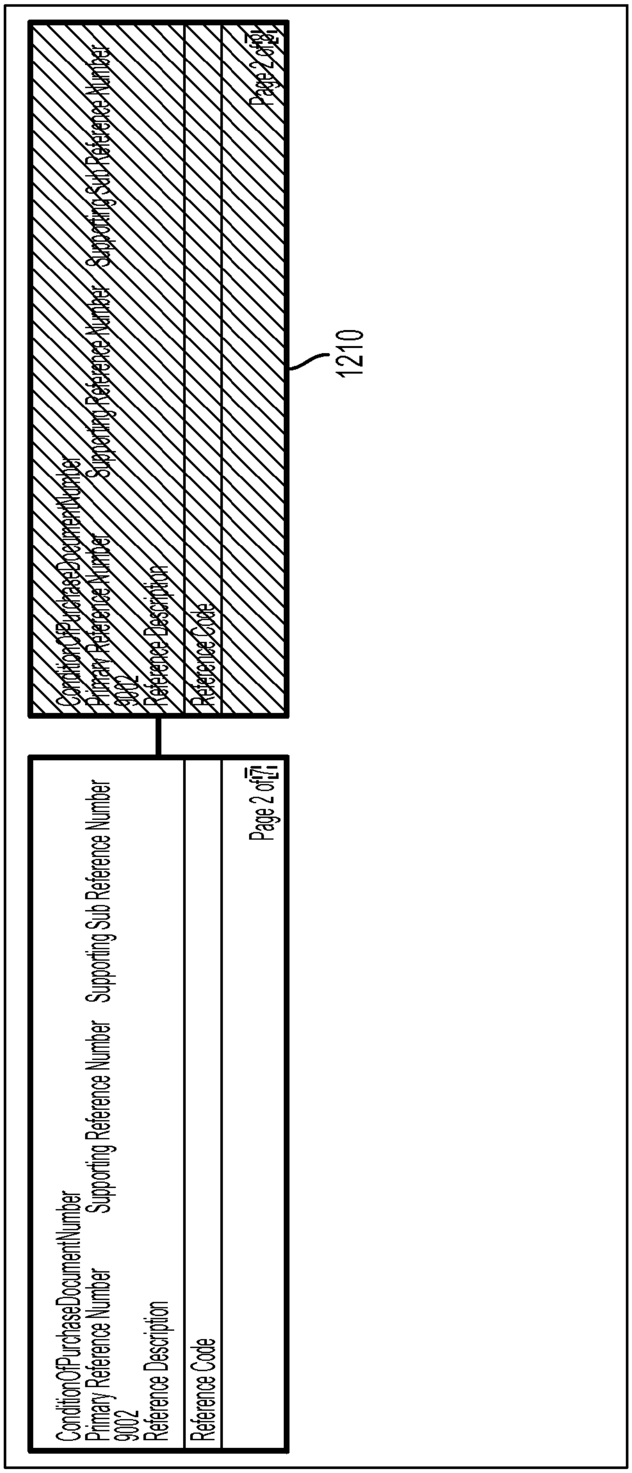
FIG. 12 is an example of a page extension in the output PDF file from the proposed method of this invention.
Figure 13A:
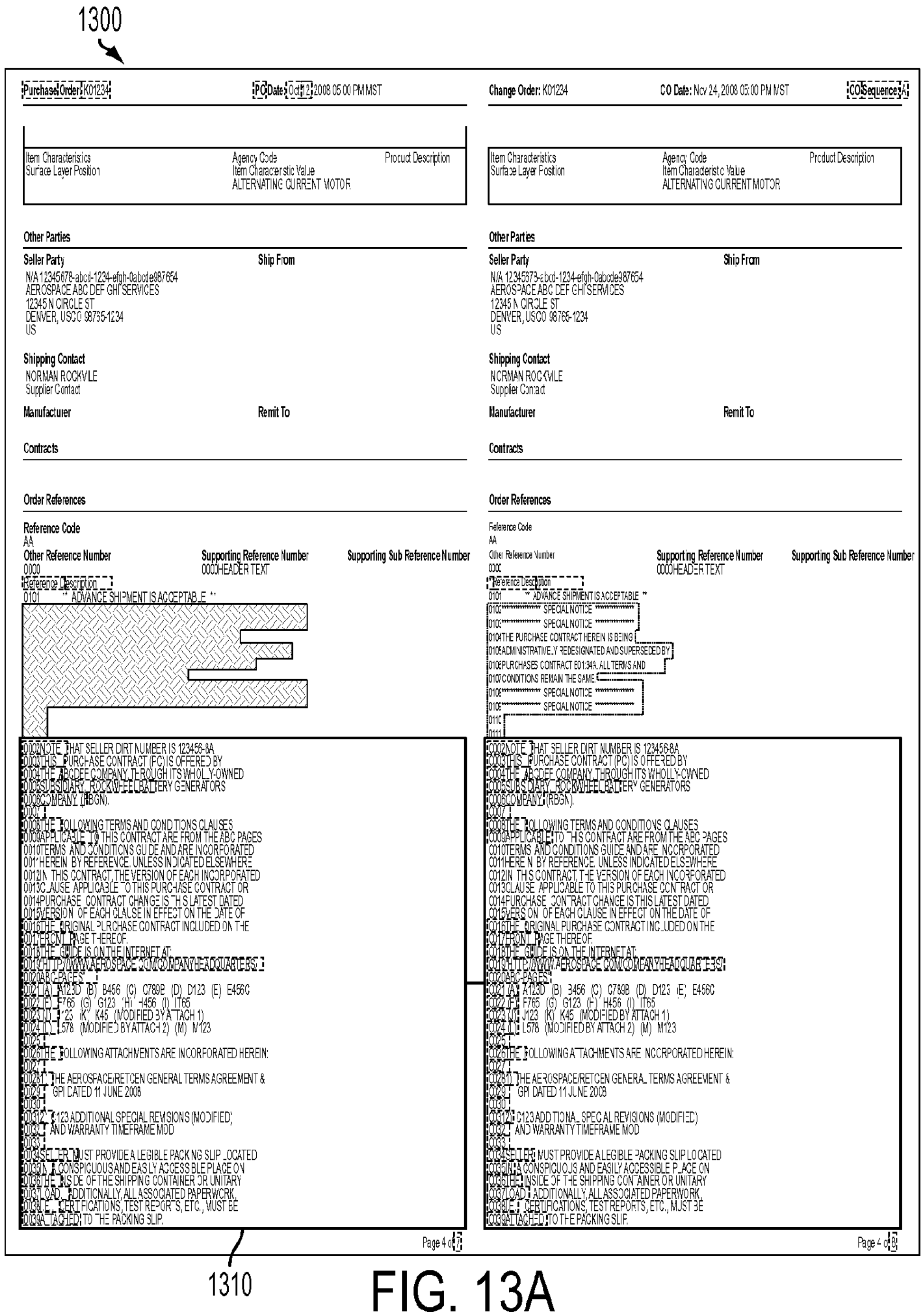
Figure 13B:
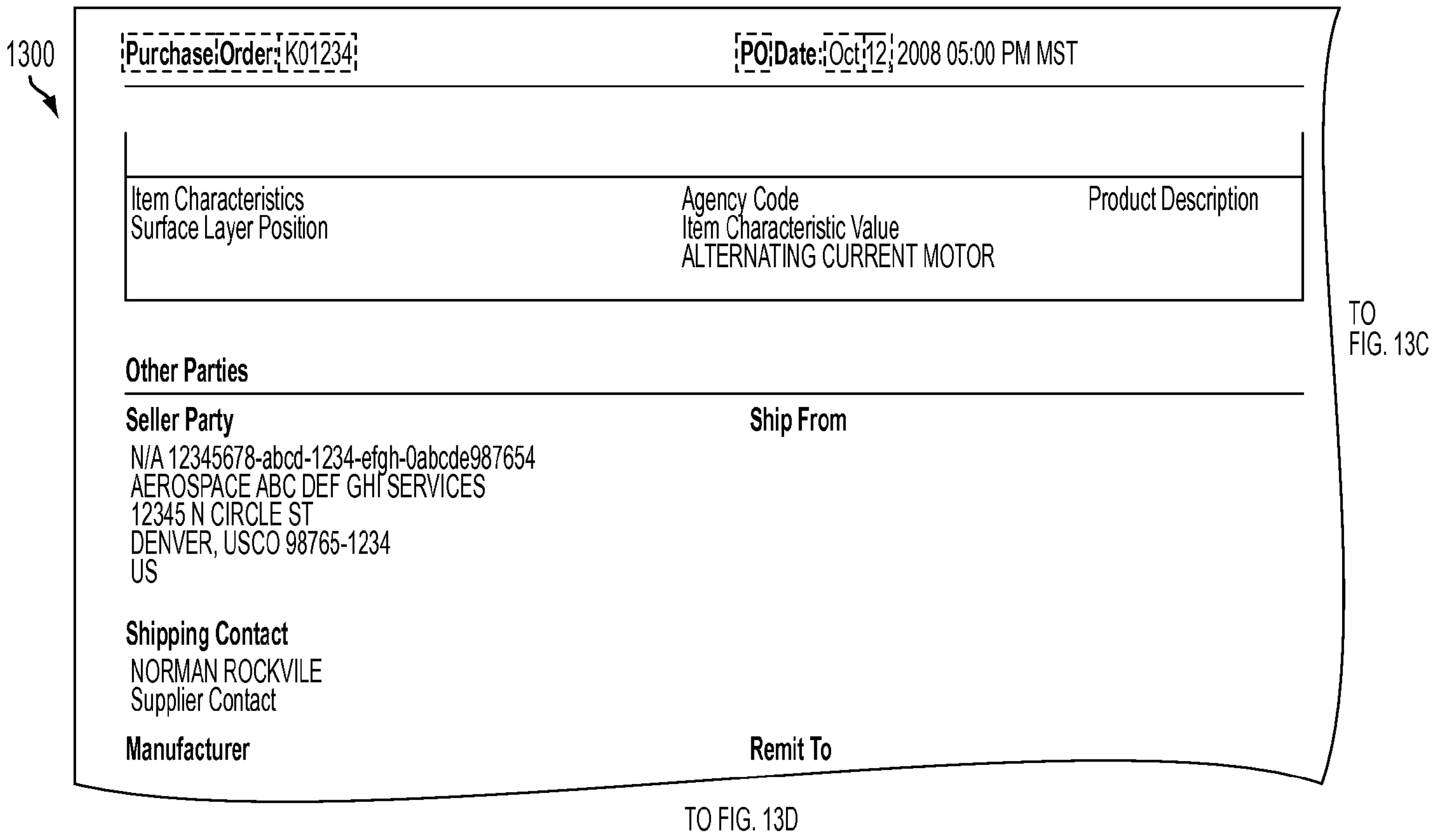
Figure 13D:
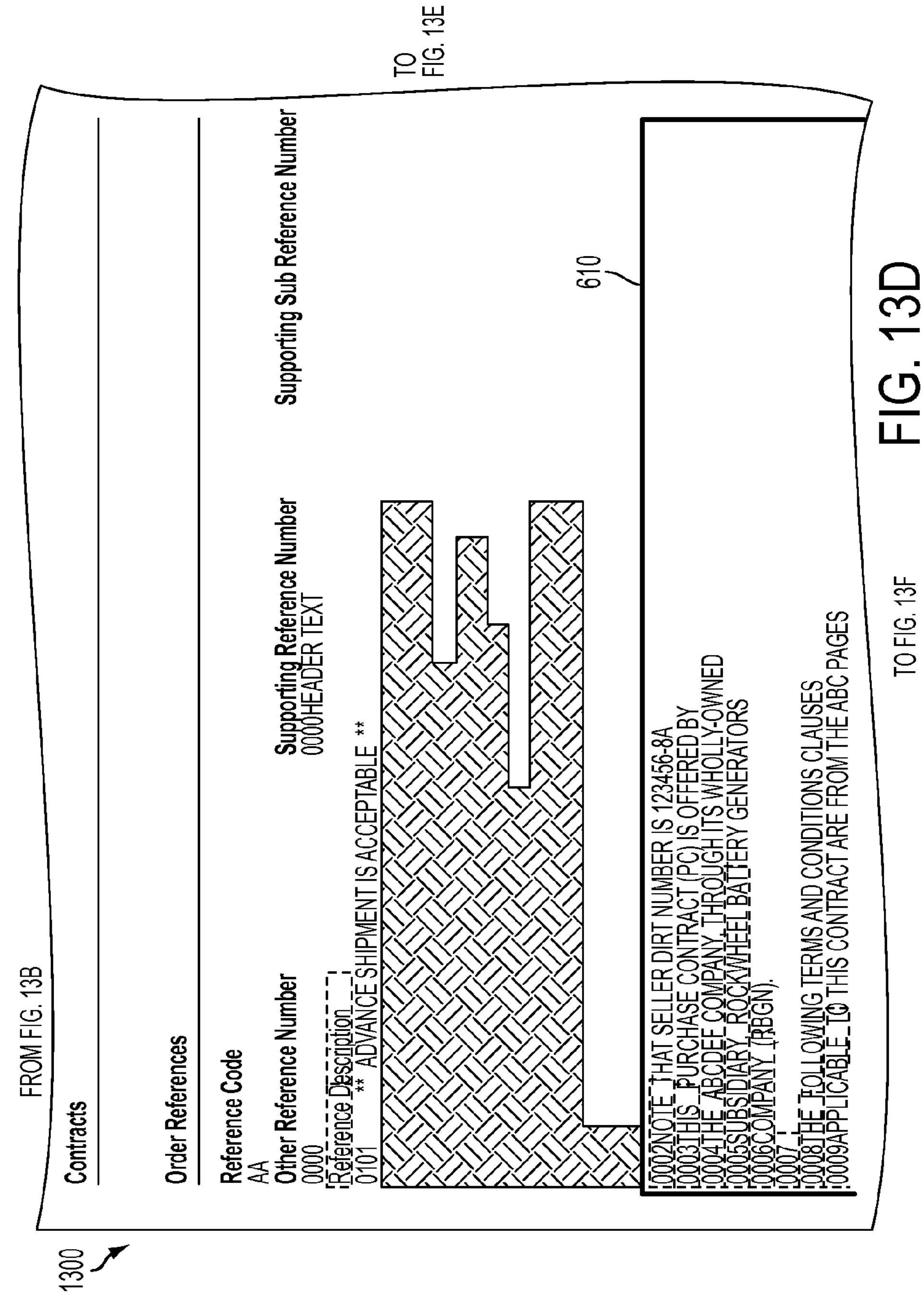
Figure 13F:
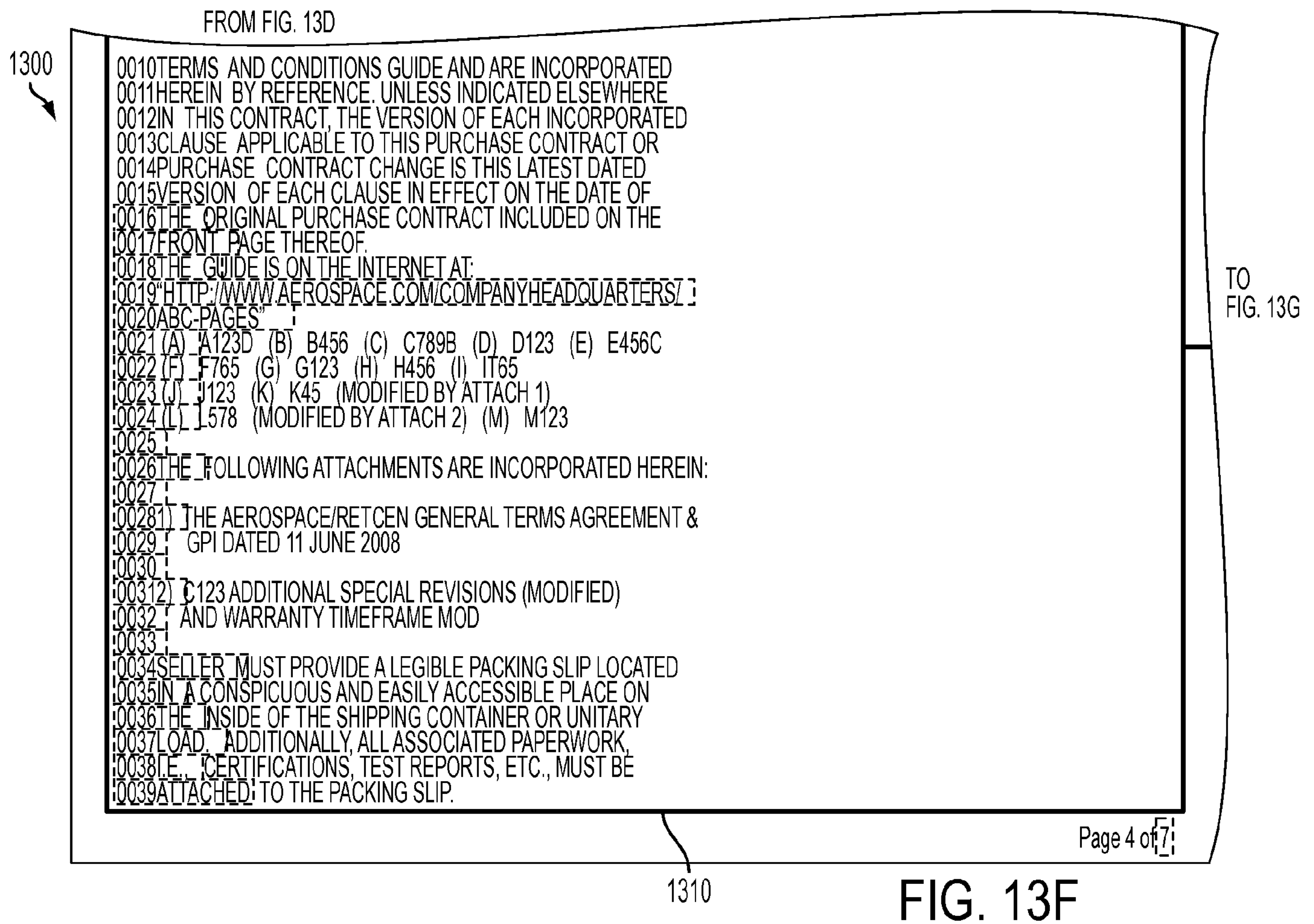

FIG. 12 illustrates a page extension 1210. This page extension is introduced due to the inclusion of the source alignment zone 1110 in FIG. 11A. Without the source deletions on the left side of FIG. 11A, the entire content of the page of the revised document (shown on the right side in FIG. 10A) would fit in FIG. 11A. However, because of the source deletions, an alignment zone 1110 is introduced in order to maintain the bottom content of the revised page in alignment. Once the alignment gap (i.e., alignment zone) is added, it is no longer possible to fit the expanded page in place. Since it is desirable to maintain a constant 1:1 scale, the remainder bottom part of the page is carved out to be displayed on an extension page. Light background shading (e.g., cyan, yellow, or light gray) is used to highlight page extensions on the revised document side. It is to be particularly noted that the source and revised content remain in perfect alignment throughout the extension page.

FIG. 13 illustrates a document page 1300 showing an example of line clause number comparison 1310. In this arrangement special features such as line clause numbers and other practical ways for indicating content change such an asterisk prefix, etc. are detected. In the context of legal documents and contract agreements, sequential line clause numbers are often added in the beginning of each text line as a convenient way of referencing a particular line. When content is newly added or removed, the line clause numbers are correspondingly readjusted to reflect the new line numbers. In the method and system of the present application is capable of recognizing and correctly matching the source and revised content even in the presence of reassigned line clause numbers, asterisk prefix and other change notification markings. The line clause items are always highlighted, like other document changes, when the internal line numbers are different.

Figure 14:
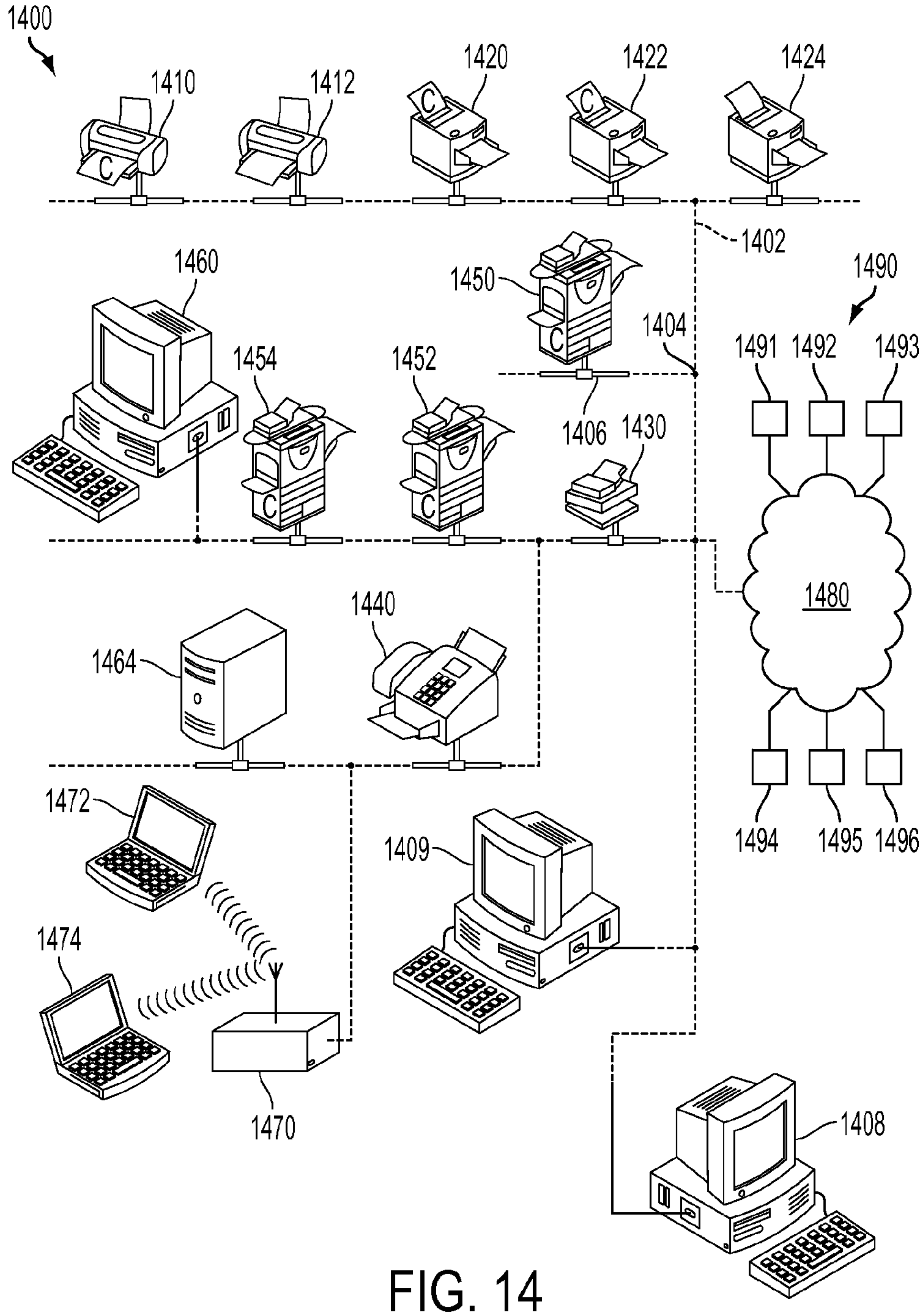
FIG. 14 depicts a system in which the concepts of the present application may be achieved.

The system and method as described herein in at least one embodiment is configured to operate within the parameters of a network 1400 as illustrated in FIG. 14. Network 1400 is, in one design, comprised of a series of wires 1402, many of which may branch or join with a third wire 1406 at a wire junctions 1404, connects a standalone peripheral device or passes through a peripheral to connect to other devices, such as computers 1408, 1409, wherein a computer may be considered a peripheral device. The network may incorporate a color printer 1410 or other than color printer 1412 as well as at least a color laser printer 1420, 1422 or one other than color laser printer 1424. The network may also incorporate a scanner 1430, or a fax machine 1440, a photocopier 1450, a color photocopier 1452, or a combination color printer/scanner/fax machine 1454. The network may also contain a personal computer and/or standalone computer terminal 1460, or stand alone hard drive data storage medium 1464. The network may also contain a wireless network transmitter receiver 1470 and interface with at least one laptop computer 1472, or a plurality of laptop computers 1474. The network may also interconnect with any form of network 1480 including but not limited to the Internet, an Intranet or other communication network. Through use of an interface with another form of network, the present system and method may interface with a plurality of peripheral data capturing devices 1490 including, but not limited to a digital still camera 1491, a digital video camera 1492, a cellular telephone 1493, a scanner 1494, a personal data assistant 1495, or a document indexing system 1496. It is to be understood the present concepts may be implemented in networks having various combinations of the above components, going from a network having a single device to one which includes thousands or more connected devices. Further, various ones of the above components may have memory storage areas arranged in any of a number of known configurations which may be useful in implementing the concepts to be described. The storage areas may be RAM, ROM, Flash Memory or other memory types which can hold software incorporating the concepts of the present application. Other memory storage areas may be configured to hold various digital images in any of a number of database formats.

Still further various ones of the components of FIG. 14, such as but not limited to the computers, include processors to process instructions from software loaded on or otherwise accessible by the components. It is to be understood various ones of the components having the processors may have more than one processor whereby processing of the instructions can be divided among the multiple processors. Alternatively, a single processor can operate to divide the instructions, whereby processing can occur in a multi-threaded environment.

Additionally, it is to be appreciated the input documents can come from a variety of sources. One obvious case is from a scanner system as discussed in detail. However, the present concepts also apply to systems employing different document input designs. One other particular configuration is comparing revised documents (such as contracts) which are electronically posted as PDF documents on a portal system such as Exostar® (Exostar® is a trademark of Exostar LLC of Herndon, Va.).

Another situation is where an electronic document is compared with a revised document that has been faxed in or sent in a paper form and then scanned. The present application can easily handle the mixed case of comparing an electronic document and a scanned document. In this example, a faxed/scanned document may be OCR'd to extract text and layout information for comparison.

A third and somewhat different application is related to the automatic discovery of posted changes. As mentioned above, revised contracts are often posted on a portal system, such as Exostar®. Previously quoted prices, quantities and/or delivery schedules may have been modified. A vendor may be interested in actively polling the portal system, identifying newly revised posts, and automatically providing a highlighted change list. This way, an operator can quickly catch any changes as well as quickly identify new business opportunities such as a higher bid price or an extended delivery schedule.

Thus, it is understood the present application is applicable to the situations above which employ a variety of different document input systems, as well as other document input systems.

In this application various shortcomings of the existing document comparison systems and methods are addressed, wherein the present system and method:

1. Provides a natural and easy to use method and system for displaying and highlighting changes between two input file versions using a rendered side-by-side aligned view that accurately and coherently shows all the changes highlighted, while simultaneously preserving the individual visual look and integrity of the page content of both input files together. The method and system of the present application can be applied to compare any two files without relying on the availability of accurately recorded change edit history in a proprietary (and possibly unknown) application-specific manner. Even the most advanced existing methods or systems cannot accurately show the visual pages and changes at the same time. With track changes view, for example, the display often becomes cluttered with inline edits and strike out changes that no longer reflect the visual looks of the page.

2. Rather than trying to illustrate the changes in each file separately as is commonly done with track changes or other existing methods, the present application and method merges and manipulates the information of the two input files to create a single output file (e.g., PDF, XPS, etc.) that shows all content of both the source documents and the revised documents to be visually reviewed, in an accurate, perfectly aligned, easy to see, side-by-side view, and with all changes clearly highlighted. The output is a standard self-contained file that can easily be viewed, printed, or shared with other people.

3. For the single output file with side-by-side display, as disclosed, the content of the source document and revised document on each page is rendered in such manner as to maintain perfect alignment between the content of the source document and revised document. This makes it visually easy for the viewer to see and compare the aligned content as well as inspect all highlighted changes between the two documents. In addition, the output file provides a convenient and natural way to have a single operation/means for simultaneously scrolling and navigating the content of both files together, rather than independently navigating each file separately. Since the output content is rendered to place source and revised content in alignment, the relative position between content of the source document and revised document is locked in, and there is never a need to scroll or reposition one document relative to the other. This eliminates a key difficulty with some of the existing methods and makes it easier and more natural for the user to operate.

4. Special alignment zones are defined in order to maintain the relative positioning of content between the two documents being compared. The alignment zones ensure that corresponding content pairs between the source and revised documents are always placed in perfect side-by-side alignment for easy viewing. The alignment zones completely eliminate the need to scroll backward or forward in the file in order to match corresponding pieces of content as commonly is the case with some of the existing techniques. The present system and method guarantees that the content will always be aligned between the two displayed documents, making it easy for a viewer to quickly manually visually scan and instantly recognize changes.

5. Two different kinds of alignment zones are introduced: (1) one for new content additions (not present in the original document), and (2) the other for content deletions (not present in the revised document). In one embodiment different colors are used to distinguish each type of alignment zone. Additionally a colored box is drawn around the content of each alignment zone. The purpose of the colored box is to alert the viewer attention to small changes that might otherwise be difficult to see. For example, a single digit or dot change in a large block of text might be difficult to spot, even when highlighted in color. The addition of a color box around the text increases the likelihood of the user noticing the change. Still further, a fill pattern in a low key color such as gray hatch pattern or light gray shading, etc., is used to fill the alignment zone spacing, in order to provide a third visual cue for the presence of an alignment zone. The hash pattern fill also serves to eliminate any potential confusion about the alignment zone content.

6. Rollover zones are introduced to provide additional visual cues about the relative alignment of pages between the source and revised documents. Rollover zones indicate content that has been carried over from the bottom of the previous page into the top of the current page. In one embodiment light background shading (e.g., cyan, yellow, or light gray) is used to highlight rollover areas without obscuring the content. Rollover zones indicate the starting and ending position of a previous original page relative to the current page. This makes it easy for the viewer to identify the original page boundaries and always keep track of the progress relative to any printed hardcopy pages the viewer may have.

7. In one embodiment, and in contrast to document comparison approaches that use text comparison, the present method and system is predominately a layout matching approach. In the layout matching approach, 2D fine-grain visual fingerprints are used to identify matching locations in the two documents. And layout analysis is employed to narrow down the candidate matches. Thereafter, text scoring operations are used to determine a preferable way of highlighting the changes (e.g., type of color, hatching, etc.). Use of the 2D fingerprinting in combination may be employed in some embodiments to obtain to higher performance and improved accuracy for the method and system.

8. In many situations the original application that created the files to be compared is not known or not available. A common practice is to convert the original files into a standard file format such as PDF or XPS that can be readily viewed and printed on any platform. One difficulty, however, with PDF and other formats is that the internal PDF representation is fragmented and optimized for efficient viewing by means of a sequence of drawing commands. The original semantics of content, relations, and edit history are generally lost. It is generally difficult to accurately convert back the PDF into original application files except in simple cases. Unlike many of the existing techniques that attempt to extract the text out of the PDF and put it back together into zones and paragraphs for comparison—a rather difficult and prone to error process. In the present application, in some embodiments, fine-grained 2D visual fingerprints are used to identify the locations of matching patterns in both documents. The fine-grain 2D fingerprint analysis is used to determine corresponding regions of fingerprint matches or lack thereof. For each resulting region, the layout information is used to identify the underlying content (e.g., PDF) and appropriately highlight each object in accordance with the observed changes. Thus as mentioned previously, the present technique is driven by layout first—via matching regions of similar visual content as determined by the 2D fingerprinting—and content comparison is applied at the last step to determine if an object such as a particular PDF text object is to be highlighted or not.

9. Contrary to existing methods, the present method and system can be applied to surgically highlight any content or layout change of interest. Each content piece is highlighted when either one of the following conditions occurs, or both: (1) the layout of the phrase (e.g., PDF phrase) is different; or (2) the content of the phrase is different. A layout difference can include any layout item such as a different starting position, different width or height, or different orientation, for example. Additionally, other attributes such as the use of a different font and/or font size can also directly contribute to a layout mismatch by effecting the width or height. A content difference can include any missing, extra or modified content such as, but not limited to, character content or spacing.

10. The method and system of the present application uses the layout information to localize the objects (e.g., PDF objects) that are to be compared between the two files (e.g., of the source document and the revised document). The localization dramatically reduces the number of possible object combination pairs that need to be investigated, especially for certain types of documents such as contracts that contain many repeating phrases of structured or semi-structured format. In contrast, an unrestricted direct comparison of all the possible phrase combinations might be prohibitive due to the exponential growth in the number of combinations.

11. The method and system of the present application leverages the information available in the PDF and other format object fragments to highlight the changes. The object fragments often carry the original representation, wording, and punctuation marks. Rather than attempt a potentially inaccurate higher level reconstruction of the content, the fragments are directly used to highlight any changes.

12. The present application uses a triple method of highlighting changes. The first method is by highlighting the change in a different color that will stand out against the background of regular unmarked text. Examples include: red text, yellow background, or inverse color text as appropriate. The purpose of text color highlighting is to alert the user attention to the presence of a change. Only different content is highlighted, while identical content (e.g., identical characters in exact same location and font) are not highlighted. The second method is by drawing a colored box around the fragment that includes the change. The purpose of adding the color box is to alert the user attention to small changes that might otherwise be difficult to see. For example, a single character change such as a single digit in a long number sequence, or a dot or comma, might be difficult to spot even when highlighted in color. The addition of a color box around the phrase significantly increases the likelihood of noticing the change. The third method is by additionally highlighting the phrase boundaries to provide confirmation and additional visual cue on the content being compared. The user can use this information to make decisions such as if an extra dot or comma at the end of a phrase may or may not be significant. In any case, the present method is designed to highlight any kind of change, no matter how small. A user can then look at the result and quickly discard any changes that might not be significant (that is, maximized detection likelihood).

13. The method and system of the present application introduces the concept of page extensions to address the issue of large content deletions. When large amounts of original content are deleted, it is no longer possible to fit the revised page on a single screen, while at the same time showing all of the existing page content as well as the deleted content. Other approaches have attempted to scale down the page in order to make it fit the existing screen size. However, the amount of scaling is variable in each case, depending on the amount of content that has been deleted, thereby creating an undesirable inconsistent viewing experience. Furthermore, the reduced image size makes it difficult to read small point text at a scaled down resolution, and the pages acquire a different look. In the present application, constant scaling is used throughout the entire document, and additional page extensions are introduced as necessary to show all of the content—including the existing as well as content that has been deleted.

14. The method and system of the present application supports special features such as reassigned line clause numbers as well as common practical ways to indicate content change such an asterisk prefix, etc. In the context of legal documents and contract agreements, many times sequential line clause numbers are added in the beginning of each line as a convenient way of referencing a particular line. When new content is added or removed, the line clause numbers are correspondingly renumbered to reflect the new content. The steps of the present method (e.g., in one embodiment in the form of a software program) is capable of recognizing and correctly matching the source and revised document content even in the presence of reassigned line clause numbers and other change notification markings.

It will be appreciated that various ones of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for detecting and highlighting changes in documents and displaying the documents in a vertically side-by-side aligned view, the method comprising:

detecting aspects of a source document and a revised document;

comparing the detected aspects of the source document and the revised document;

identifying at least one of similarities and differences between the source document and the revised document based on the comparing, wherein the differences are layout differences found on the documents, including at least one of different widths, different heights, different orientations, different font types, and different font sizes between at least some of the detected aspects of the source document and the revised document;

introducing visual indicators in an automated manner to maintain consistent and accurate vertical alignment between all of the source and revised content based on the comparing and identifying, wherein the vertical alignment includes identifying corresponding content pairs between the source document and the revised document to have corresponding content of the corresponding content pairs in side-by-side alignment in the vertical direction for all of the source document and revised document, and wherein the visual indicators include at least one of (i) an alignment zone in the source document in a form corresponding to an outline pattern of content that has been added to the revised document, wherein the outline pattern of the alignment zone changes in its outline form to match the outline form of content to which it is associated, (ii) an alignment zone in the revised document in a form corresponding to an outline pattern of content deleted from the source document, wherein the outline pattern of the alignment zone changes in its outline form to match the outline form of content to which it is associated, and (iii) page extensions configured to re-direct any content below a visible bottom of a current page or a last page extension to a next page to maintain the side-by-side alignment and a constant 1:1 scaling ratio between the source document and the revised document; and outputting a merged single output file containing the aligned side-by-side view of the source document and the revised document, with all differences between the source document and the revised document visually identified, wherein the side-by-side vertical aligned view is accomplished by use of the visual indicators, wherein the visual indicators include rollover zones which indicate content that has been carried over from a previous page into a current page, and wherein rollover zones mark a boundary of an original page layout, and wherein the method is accomplished by use of at least an electronic processor device, configured to perform at least the detecting, comparing, identifying, introducing and outputting.

2. The method according to claim 1, wherein the single output file with the aligned side-by-side display, includes perfectly aligning content in the source document and content in the revised document, and wherein the source document and the revised document are rendered as a merged self-contained single output file.

3. The method according to claim 1, wherein a single action allows simultaneous scrolling of the content of the source document and the content of the revised document together as a single file in alignment, rather than independently scrolling each document separately.

4. The method according to claim 1, wherein the alignment zones maintain relative positioning of content between the source document and the revised document, the alignment zones ensuring that corresponding content pairs between the source document and the revised document are always placed in side-by-side alignment for easy viewing.

5. The method according to claim 1, wherein the page extensions address an issue of large content deletions, wherein when large amounts of original content are deleted, and it is no longer possible to fit the revised page on a single screen, while at the same time showing all of the existing page content as well as the deleted content, the page extensions showing all of the content including the existing content as well as deleted content.

6. The method according to claim 1, wherein the identification process includes a first step of layout matching, which uses 2D visual fingerprints to identify matching locations in the source document and the revised document, the layout analysis being used to narrow down the candidate matches; and a second step of text scoring to determine a method of highlighting the changes.

7. The method according to claim 6, wherein the layout information is used to identify underlying PDF or XPS content.

8. The method according to claim 6, wherein an original application that created the source document and the revised document is not known, and wherein original files of the source document and revised document are converted into a standard file format, the standard file format being fragmented and optimized for efficient viewing by means of a sequence of drawing commands and lacking the original semantics of content, relations, and edit history.

9. The method according to claim 6, wherein the layout information is used to localize PDF objects that are to be compared between the two files, the localization reducing the number of possible object combination pairs that need to be investigated.

10. An automated system, including at least an electronic processor, configured to detect, highlight changes in a source document and a revised document, and to display the source document and the revised document in a side-by-side aligned view, the system comprising:

a document input system arranged to input the source document and the revised document, wherein each of the source document and the revised document is without an edit history and represents semantic content;

a detector system arranged to detect aspects of the source document and the revised document input via the document input system;

a comparison system arranged to receive and compare the detected aspects of the source document and the revised document;

an identifier arranged to identify at least one of similarities and differences between the compared aspects of the source document and the revised document and to identify corresponding content pairs based on the layout of the content, each including content in the source document and corresponding content in the revised document, wherein the differences are layout differences, including at least one of different widths, different heights, different orientations, different font types and different font sizes between at least some of the detected aspects of the source document and the revised document;

visual indicators configured to automatically maintain consistent and accurate alignment between the source document and the revised document based on output of the comparison system and the identifier, and wherein the visual indicators include (i) an alignment zone in the source document in a form corresponding to an outline pattern of content that has been added to the revised document, wherein the outline pattern of the alignment zone changes in its outline form to match the outline form of content to which it is associated, (ii) an alignment zone in the revised document in a form corresponding to an outline pattern of content deleted from the source document, wherein the outline pattern of the alignment zone changes in its outline form to match the outline form of content to which it is associated, and (iii) page extensions configured to re-direct any content below a visible bottom of a current page or a last page extension to a next page to maintain the side-by-side alignment and a constant 1:1 scaling ratio between the source document and the revised document, wherein the visual indicators further include at least one of rollover zones, wherein the rollover zones indicate content that has been carried over from a previous page into a current page, and wherein the rollover zones mark an identifying boundary of an original page layout; and an output display device to output and display a merged single file containing an aligned side-by-side view of the content in the source document and the revised document, with all differences between the source document and the revised document highlighted in place without disturbing an overall visual layout of the page, wherein the aligned side-by-side view includes the corresponding content of the corresponding content pairs in side-by-side alignment in a vertical direction by use of the visual indicators.

11. The system according to claim 10, wherein the source document and the revised document are rendered as a merged self-contained single output file with the aligned side-by-side display, includes perfectly aligning content in the source document and in the revised document.

12. The method according to claim 1 wherein steps of detecting, comparing, identifying introducing and outputting are configured to operate on a non-hierarchal data structure including but not limited to a business contract.

13. The method according to claim 1, wherein structure of the source document and the revised document exist without input from a user of the method.

* * * * *